United States Patent
Maruyama et al.

(10) Patent No.: US 6,778,489 B1
(45) Date of Patent: Aug. 17, 2004

(54) SUBSCRIBER TERMINATING EQUIPMENT

(75) Inventors: Kazuyoshi Maruyama, Yokohama (JP); Masakazu Oi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 851 days.

(21) Appl. No.: 09/723,581

(22) Filed: Nov. 28, 2000

(30) Foreign Application Priority Data

Mar. 6, 2000 (JP) ........................................ 2000-061266

(51) Int. Cl.[7] .............................................. G01R 31/08
(52) U.S. Cl. ............................ 370/216; 370/217; 714/4
(58) Field of Search ................................ 370/216–217, 370/221, 225, 351; 714/2, 4, 21

(56) References Cited

U.S. PATENT DOCUMENTS

| | | | | |
|---|---|---|---|---|
| 4,730,303 A | * | 3/1988 | Suzuki | .................. 370/58 |
| 6,240,063 B1 | * | 5/2001 | Suzuki | .................. 370/217 |
| 6,570,844 B1 | * | 5/2003 | Deschaine | .................. 370/217 |

FOREIGN PATENT DOCUMENTS

| | | |
|---|---|---|
| DE | 197 54 903 | 1/1999 |
| JP | 55-115786 | 9/1980 |
| WO | 95/24803 | 9/1995 |

* cited by examiner

Primary Examiner—Duc Ho
(74) Attorney, Agent, or Firm—Katten Muchin Zavis Rosenman

(57) ABSTRACT

The invention provides a subscriber terminating equipment wherein a subscriber accommodated in a subscriber terminating package with which a fault occurs is switched to a relief package by constructing the same such that a common section selects a pair of subscriber terminating packages including a first subscriber terminating package and a second subscriber terminating package and allocates, if the first subscriber terminating package fails, the second subscriber terminating package as a bypass package for performing electric connection between a subscriber terminal and the relief package. The subscriber terminating equipment thus allows automatic switching of the relief package without using a switching package for exclusive use and allows replacement of the fault package without interrupting communication of a subscriber accommodated in the fault package.

17 Claims, 60 Drawing Sheets

F I G. 36
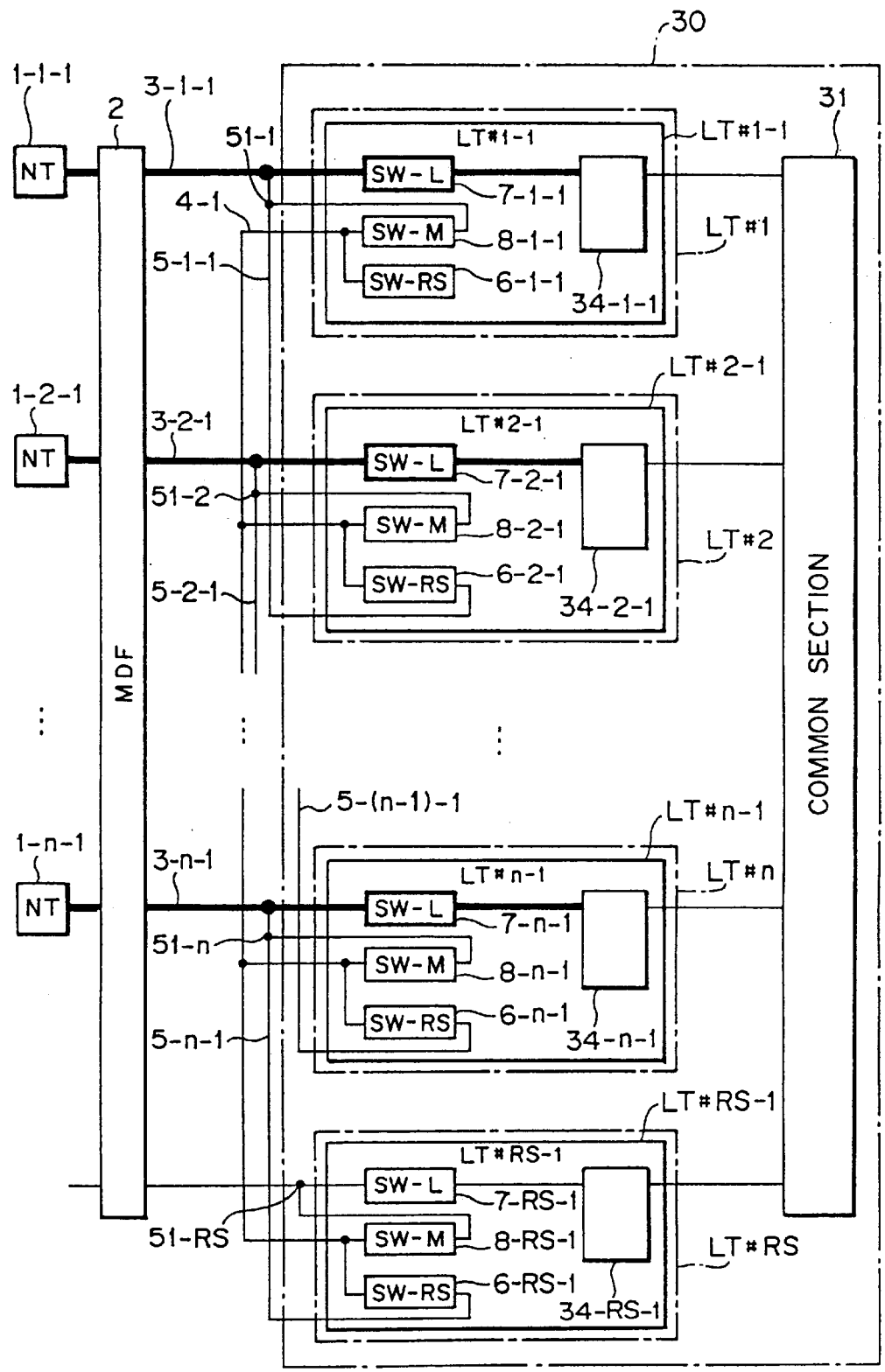

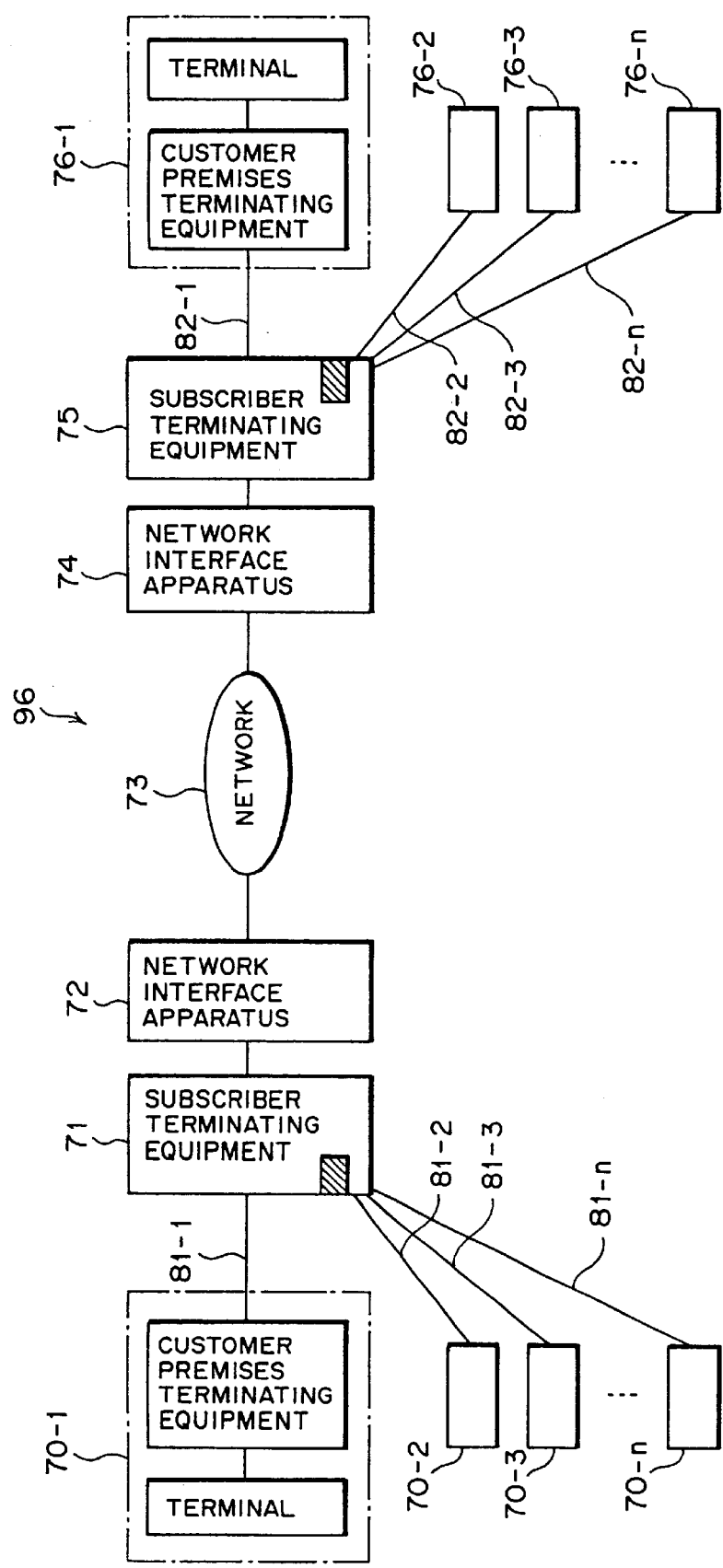

F I G. 50
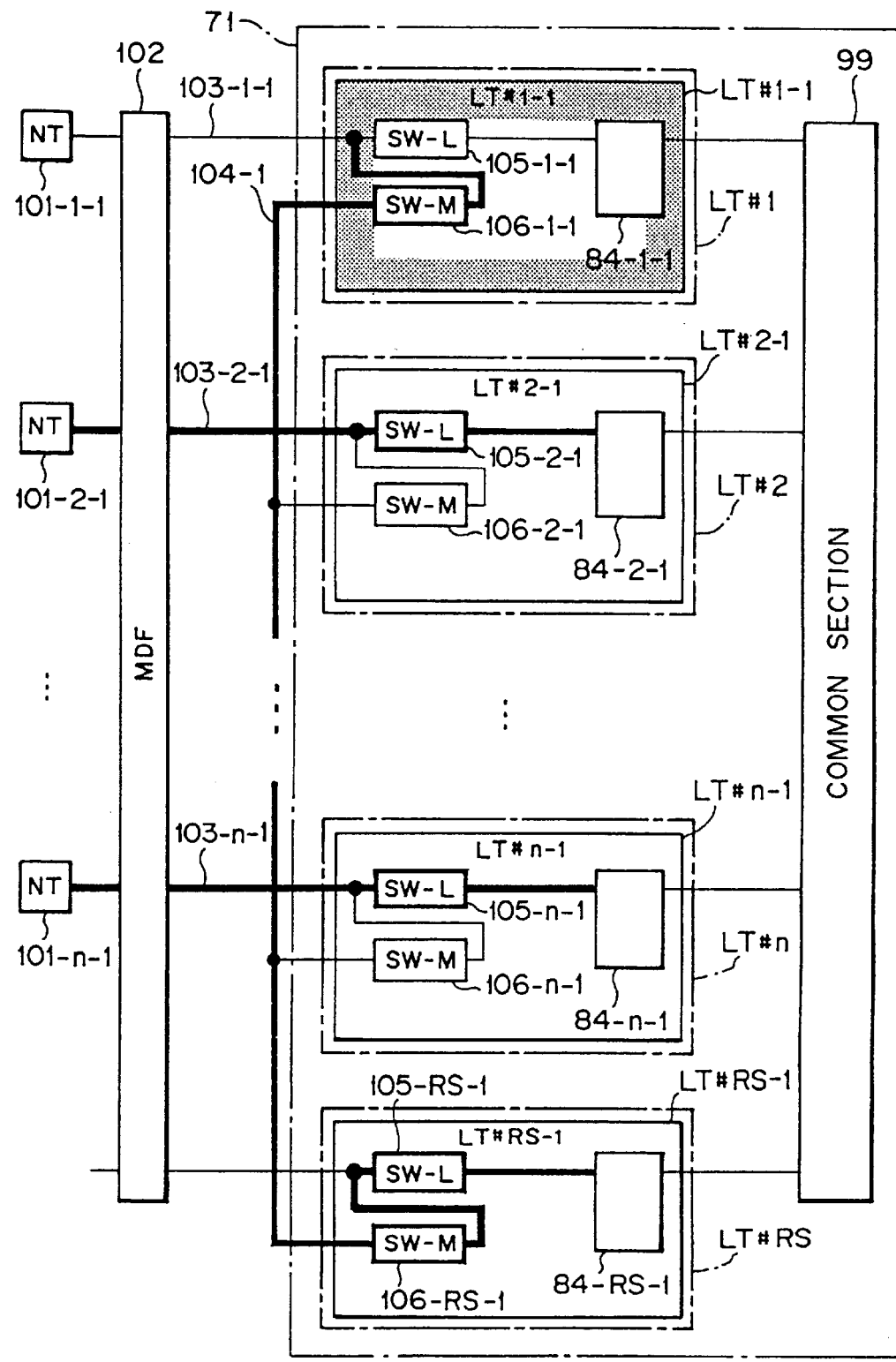

F I G. 54
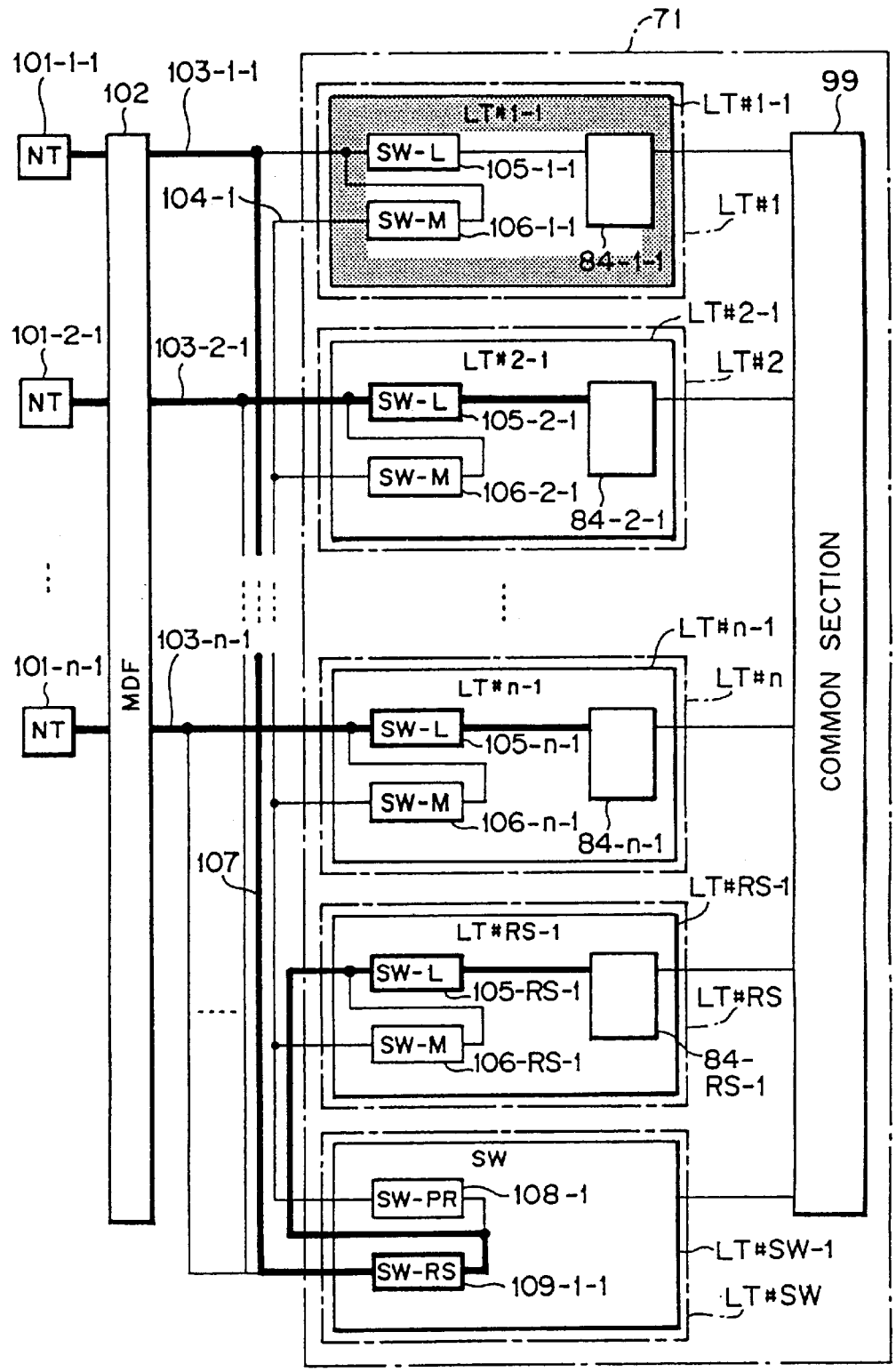

SUBSCRIBER TERMINATING EQUIPMENT

BACKGROUND OF THE INVENTION

1) Field of the Invention

This invention relates to a subscriber terminating equipment suitable for use with a subscriber accommodation system.

2) Description of the Related Art

As a result of remarkable increase in demand for communication in recent years, it is requested for local exchange carriers and so forth to achieve stable signal transmission between subscriber terminals and an exchange, a router or a like equipment.

A signal transmitted from a subscriber terminal is inputted to a subscriber terminating equipment using a metallic subscriber line and terminated by the subscriber terminating equipment. Then, the signal is connected to a network interface apparatus such as an exchange, a router or the like and transmitted to a network interface apparatus of its destination.

In such a communication system as just described, when the subscriber terminating equipment fails or when the subscriber terminating equipment is stopped in order to perform maintenance, checking or the like of it, accommodation subscribers therein must be temporarily moved to another subscriber terminating equipment to perform services to them. For example, in order to perform replacement of a package, subscriber terminals accommodated in the failed package cannot enjoy services until the failed package is replaced.

Accordingly, in order to perform temporary accommodation (temporary relief) during failure of a package or temporarily switching to reserved circuits upon replacement (exchanging) of a package, a relief package (subscriber terminating package for relief) for accommodating reserved circuits is provided in advance.

When such subscriber accommodation or temporary switching is performed by switching the circuits by means of switches, the prepared relief package is used to perform the switching of the switches between the subscribers and the network interface fully automatically (by unattended remote operation) through the switching of a minimum but necessary number of switches and increase of a minimum but necessary number of wiring lines.

FIG. 44 is a diagram showing an example of a system construction of a communication network. Referring to FIG. 44, the communication network 96 shown includes a plurality of subscriber terminals (network terminals; a network terminal (NT) may sometimes be referred to simply as terminal) 70-1 to 70-n and 76-1 to 76-n, a plurality of subscriber lines 81-1 to 81-n and 82-1 to 82-n, subscriber terminating equipments 71 and 75, network interface apparatus 72 and 74, and a network 73. Each of the network interface apparatus 72 and 74 is formed from an exchange, a router or a like equipment and exhibits functions of the same.

A signal from any of the subscriber terminals 70-1 to 70-n is transmitted from the network interface apparatus 72 to the network 73 after an electric connection path therefor is set by the subscriber terminating equipment 71. Also a signal from the network 73 is transmitted in a similar manner to any of the subscriber terminals 76-1 to 76-n.

FIG. 45 is a detailed block diagram of the subscriber terminating equipment 71. Referring to FIG. 45, the subscriber terminating equipment 71 shown includes a plurality of subscriber terminating packages LT#1 to LT#n for connecting/disconnecting the plurality of subscriber terminals 70-1 to 70-n, and a relief package LT#RS.

Each subscriber terminating package LT#i (i is a natural number from 1 to n) individually performs line termination and circuit termination in order to allow the subscriber lines 81-i to be accommodated in the network interface apparatus 72 and includes a subscriber connection/relief switch 85-i and a subscriber circuit 84-i.

Meanwhile, the relief package LT#RS is provided to relieve subscribers accommodated in any of the subscriber terminating packages LT#i when a fault occurs with the subscriber terminating package LT#i (such package is hereinafter referred to as fault package). The relief package LT#RS includes a subscriber connection/relief switch 85-RS and a subscriber circuit 84-RS similarly to the subscriber terminating packages LT#i.

The subscriber connection/relief switch 85-i connects/disconnects the subscriber line 81-i from the subscriber terminal 70-i and performs, when a fault occurs, path switching from the fault package LT#i to the relief package LT#RS and other necessary operation.

The subscriber circuit 84-i processes a signal from the subscriber terminal 70-i connected by the subscriber connection/relief switch 85-i and includes a four-line/two-line conversion circuit 86, a transmission circuit (transmission driver) 87a, a reception circuit (receiver) 87b, a line terminating circuit section 88, a circuit terminating circuit section 89 and an interface section 90.

The four-line/two-line conversion circuit 86 converts a signal transmitted in balance from the subscriber connection/relief switch 85-i into a four-line signal (or vice versa). The transmission circuit 87a transmits the transmission signal produced by the line terminating circuit section 88 to output it to the subscriber line 81-i. The reception circuit 87b receives a signal transmitted thereto from the subscriber terminal 70-i over the subscriber line 81-i through the four-line/two-line conversion circuit 86 and outputs the signal to the line terminating circuit section 88.

The line terminating circuit section 88 shapes the waveform of a signal, which has passed through and thereupon been attenuated and distorted by the subscriber line 81-i, and amplifies the signal of the shaped waveform and extracts a clock signal from the transmission data. In particular, since deterioration attenuation and distortion occur with the transmission data of a digital signal while it is transmitted along a line, the line terminating circuit section 88 shapes the waveform of the transmission data and outputs resulting data to the circuit terminating circuit section 89.

The circuit terminating circuit section 89 performs signal termination processing such as frame synchronizing processing of transmission data, addition/extraction of a signal for transmission of control or information, and error correction. The circuit terminating circuit section 89 performs the signal termination processing by digital processing.

The interface section 90 converts the format for use with the subscriber terminating equipment 71 into another format for allowing the data to be handled by the network interface apparatus 72.

Thus, the subscriber terminal 70-i is physically connected by the subscriber connection/relief switch 85-i, and conversion of a signal from a 2-line signal into a 4-line signal is performed by the four-line/two-line conversion circuit 86. Then, the reception signal is received by the reception circuit 87b, and waveform shaping and amplification of the signal, which has been attenuated and distorted during transmission thereof over the subscriber circuit, are performed by the line terminating circuit section 88. Then, frame processing and so forth of the signal are performed by the circuit terminating circuit section 89. Thereafter, the signal is converted into a signal of the format for use with the network interface apparatus 72 by the interface section 90 and then transmitted to the network interface apparatus 72.

On the other hand, a signal from the network interface apparatus 72 is converted into a signal of the predetermined format by the interface section 90, and frame processing is performed for the signal by the circuit terminating circuit section 89. Then, waveform shaping (conversion) suitable for the signal to be outputted to the subscriber lines 81-i is performed for the signal from the circuit terminating circuit section 89 by the line terminating circuit section 88. Further, the signal is converted from a four-line signal into a two-line signal by the four-line/two-line conversion circuit 86. Then, the two-line signal is transmitted from the subscriber connection/relief switch 85-i to the subscriber terminal 70-i over the subscriber line 81-i.

As a countermeasure against a possible failure (fault), doubling or some other measures are taken for the line from the network 73 to the subscriber terminating equipment 71 in FIG. 44. However, the subscriber terminals 70-i and the subscriber lines 81-i which are connected between the subscriber terminating equipment 71 and the subscriber terminals 70-i are provided usually in a one-by-one connection scheme and therefore require a very high cost if such fault countermeasure as doubling is taken. Therefore, doubling of the subscriber lines 81-i is not used popularly.

Therefore, while disconnection of the subscriber lines 81-1 to 81-n themselves between the subscriber terminals 70-1 to 70-n and the subscriber terminating equipment 71 shown in FIG. 46 cannot be avoided, if a fault occurs with any one subscriber terminating package LT#i in the subscriber terminating packages LT#1 to LT#n shown in FIG. 47, for example, with the subscriber terminating packages LT#1, then the destination of the subscriber terminal 70-1 accommodated in the subscriber terminating package LT#1 with which the fault has occurred is switched to the relief package LT#RS to relieve the subscriber terminal 70-1 which has been accommodated in the fault package LT#1.

In order to switch a circuit when a fault occurs, the subscriber terminating equipment 71 can be constructed and the circuit switching by the subscriber terminating equipment 71 can be performed in the following three manners or methods (i) to (iii).

(i) Only Temporary Relief when a Fault Occurs is Performed without Using a Switch Package for Exclusive Use for Switching (First Method)

FIG. 48 is a diagrammatic view illustrating a connection scheme of subscriber terminals 101-1-1 to 101-n-1 in the subscriber terminating equipment 71 in a normal state. Referring to FIG. 48, the subscriber terminating equipment 71 includes a plurality of subscriber terminating packages LT#1 to LT#n and a multi-connection line 104-1 by which the subscriber terminating packages LT#1 to LT#n are connected to each other.

It is to be noted that, in FIG. 48, elements only for the channel 1 are shown. However, since elements for the other channels 2 to n are similar to those for the channel 1, overlapping illustration in FIG. 48 and overlapping description herein of them are omitted to avoid redundancy.

FIG. 49 is a schematic diagrammatic view of the subscriber terminating equipment 71. Referring to FIG. 49, the subscriber terminating equipment 71 shown includes a backboard 301 serving as a back plate, and a plurality of subscriber terminating packages LT#1 to LT#n and a relief package LT#RS each in the form of a board, all accommodated in an equipment frame 300 in the form of a box. Each channel of the subscriber terminating packages LT#1 to LT#n and the relief package LT#RS includes subscriber terminating circuit LT#i-1 to LT#i-m (m is a natural number) and relief packages LT#RS-1 to LT#RS-m.

In particular, each of the subscriber terminating packages LT#i and the relief package LT#RS includes a plurality of subscriber terminating circuits LT#i-j (j is a natural number from 1 to m) or LT#RS-j and each subscriber terminating circuit LT#i-j or LT#RS-j can accommodate subscriber terminals 101-i-j.

Each of the subscriber terminating packages LT#i and the relief package LT#RS can be removed from or inserted into the backboard 301 of the subscriber terminating equipment 71 if a fault occurs therewith or in a like case. If a fault occurs with the subscriber terminating circuit LT#i-j, then the subscriber terminating package LT#i with which the fault occurs can be replaced by an operator.

Each of the subscriber terminating circuits LT#1-1 and LT#RS-1 includes a subscriber connection switch (SW-L switch) 105-1-1 and a multi-connection switch (SW-M switch) 106-1-1 as shown in FIG. 48.

The subscriber connection switch 105-1-1 is connected to a subscriber line 103-1-1 from the subscriber terminal 101-1-1 and connects or disconnects the subscriber terminal 101-1-1.

Meanwhile, the multi-connection switch 106-1-1 is provided to switch, when a fault occurs with the subscriber terminating package LT#1 to which it belongs, the path from the subscriber terminal 101-1-1 to the relief package LT#RS. One end of the multi-connection switch 106-1-1 is connected to the subscriber line 103-1-1 to which it belongs while the other end of the multi-connection switch 106-1-1 is connected to the multi-connection switches 106-2-1 to 106-n-1 of the other subscriber terminating packages LT#2 to LT#n and the SW-M switch 106-RS-1 of the relief package LT#RS.

Also the other subscriber terminating packages LT#2 to LT#n are connected in a similar manner to the subscriber terminating package LT#1 as described above.

Thus, the subscriber connection switches 105-1-1 to 105-n-1 shown in FIG. 48 are set to a connection state (on) and the multi-connection switches 106-1-1 to 106-n-1 are set to a disconnection state (off) so that signals from the subscriber terminals 101-1-1 to 101-n-1 are connected to a common section 99 through the subscriber connection switches 105-1-1 to 105-n-1 of the corresponding subscriber terminating circuits LT#i-j, respectively. Accordingly, normal transmission is performed along signal paths indicated by thick lines in FIG. 48.

Then, if a fault occurs with the subscriber terminating circuit LT#1-1 (refer to a screened portion in FIG. 50), then the SW-L switch 105-1-1 of the subscriber terminating circuit LT#1-1 of the fault package LT#1 which has the subscriber terminating circuit LT#1-1 is switched off and the SW-M switch 106-1-1 is switched on. Further, the SW-M switch 106-1-1 is switched on, and the SW-M switch 106-RS-1 and the SW-L switch 105-RS-1 of the subscriber terminating circuit LT#RS-1 of the relief package LT#RS are switched on. Consequently, the subscriber terminal 101-1-1 which has been accommodated in the subscriber terminating circuit LT#1-1 is relieved by the subscriber terminating circuit LT#RS-1 of the relief package LT#RS.

As described hereinabove, each of the subscriber terminating packages LT#i and the relief package LT#RS has subscriber terminating circuits LT#i-j for a plurality of channels. Further, each of the subscriber terminating circuits LT#i-j and LT#RS-j has an SW-L switch (refer to the reference character 105-i-j of FIG. 48) and an SW-M switch (refer to the reference character 106-i-j of FIG. 48) shown in FIG. 51 and are connected to one another by a multi-connection line (refer to reference character 104-1 of FIG. 48). Thus, each of the subscriber terminating circuits LT#i-1 and LT#RS-1 operates similarly to the subscriber terminating circuits LT#i-1 and LT#RS-1 of the channel 1.

It is to be noted that, in FIG. 51, each arrow mark indicates a direction of connection. Further, while such arrow marks are omitted for the other channels 2 to m, they are similar to those of the channel 1. Thus, the subscriber terminating packages LT#i are relieved for each channel.

In this instance, however, if the operator removes the fault package LT#1 in order to replace it, since a path for bypassing (path upon relief) passes in the fault package LT#1 to be removed, the communication is interrupted.

(ii) Method which Uses an External Connection Cable (Second Method)

FIGS. 52 to 54 are diagrammatic views illustrating operation of the method which uses an external connection cable. Particularly, FIG. 52 illustrates normal operation of the method. Referring to FIG. 52, similarly as in the method wherein only temporary relief upon fault is performed without using a switch package for exclusive use for switching, the subscriber terminating equipment 71 includes a plurality of subscriber terminating packages LT#1 to LT#n, a relief package LT#RS, and a multi-connection line 104-1 as well as a switch package LT#SW.

The switch package LT#SW includes a temporary relief switch (SW-PR) 108-1 and an SW-RS switch 109-1-1. The temporary relief switch 108-1 is connected to multi-connection switches 106-1-1 to 106-n-1 of the subscriber terminating circuit LT#1-1 and an SW-M switch 106-RS-1 of the subscriber terminating circuit LT#RS-1 of the relief package LT#RS by the multi-connection line 104-1.

If the subscriber terminating circuit LT#1-1 shown in FIG. 53 fails, then the subscriber terminating equipment 71 controls so that the SW-L switch 105-1-1 of the subscriber terminating circuit LT#1-1 of the failed package LT#1 is switched off and the SW-M switch 106-1-1 is switched on while the SW-L switch 105-RS-1 and the SW-M switch 106-RS-1 of the subscriber terminating circuit LT#RS-1 of the relief package LT#RS are switched on. Accordingly, a signal from the subscriber terminal 101-1-1 accommodated in the failed package LT#1 is introduced into and temporarily relieved by the relief package LT#RS.

Here, since the path switching upon temporary relief measure is performed using the SW-M switch 106-1-1 of the fault package LT#1, if replacement of the fault package LT#1 is performed directly in this state, then the path for relief is interrupted similarly as with the first method.

Therefore, the subscriber terminating equipment 71 shown in FIGS. 55(a) and 55(b) includes a connector for external connection provided on the equipment frame (BWB) thereof so that any of the subscriber terminating packages LT#1 to LT#n and the switch package LT#SW can be connected to each other using an external connection cable 107.

The length of the external connection cable 107 is set based on the distance between the switch package LT#SW and that one of the subscriber terminating packages LT#i which provides the greatest distance from the switch package LT#SW so that the external connection cable 107 can connect any of the subscriber terminating packages LT#1 to LT#n to the switch package LT#SW.

When the fault package LT#1 shown in FIG. 54 is to be replaced, in order to extract a relief path from within the fault package LT#1, the operator will perform manual operation to connect the fault package LT#1 and the switch package LT#SW using the external connection cable 107 and switch the SW-M switch 106-1-1 of the subscriber terminating circuit LT#1-1 of the fault package LT#1 off and switch the SW-RS switch 109-1 of the switch package LT#SW on and further switch the temporary SW-PR switch 108-1 of the switch package LT#SW off. Consequently, as seen from a path indicated by a thick line in FIG. 54, a signal from the subscriber terminal 101-1-1 is connected to the relief package LT#RS without passing the fault package LT#1.

Accordingly, even if the fault package is removed, the relief path is not interrupted at all. Consequently, the fault package LT#1 can be replaced without interruption of communication of the relieved subscriber.

It is to be noted that, also in this instance, the subscriber terminating packages LT#1 to LT#n, the relief package LT#RS and the switch package LT#SW shown in FIG. 56 have switches similar to those for the channel 1 also for the channels 2 to m. Also the switches for the channels 2 to m operate similarly to those for the channel 1.

In this instance, however, since the operator connects a connector of the switch package LT#SW and a connector of the fault package LT#1 on the equipment frame 300 by manual operation, connectors which can be connected to each other physically and so forth are required. Further, since the external connection cable 107 is connected by manual operation, connection in error, incomplete connection or the like occurs likely.

Further, for the external connection cable 107, a single external connection cable having a wiring line length of a ((margin for connection operation)+(package number−1)× (thickness of package)) may be prepared. However, there is the possibility that soiling, dust or the like may cause incomplete connection of a connector. Further, depending upon the position of the subscriber terminating package LT#i, when a fault occurs, deterioration in characteristic may possibly occur because the wiring line length of the external connection cable 107 is excessively long.

(iii) Method wherein Wiring Lines Corresponding to an External Connection Cable Are Wired in Advance on the Backboard (Third Method)

This method is a modification to the second method, and according to the present method, wiring lines corresponding to the external connection cable 107 are wired in advance between the subscriber terminating packages LT#i and the switch package LT#SW and are switched by means of a switch in the switch package LT#SW.

Referring to FIGS. 57 to 59, the subscriber terminating equipment 71 shown is different from the subscriber terminating equipment 71 of the second method in that it includes SW-RS switches 109-1-1 to 109-n-1 provided corresponding to the subscriber terminating packages LT#1 to LT#n in the switch package LT#SW and wiring lines (jumper wiring lines) 110-1-1 to 110-n-1 which correspond to the external connection cable 107 are wired between the subscriber terminating packages LT#i and the switch package LT#SW in advance.

When the subscriber terminating equipment 71 operates normally as seen in FIG. 57, similarly as in the second method, the SW-L switches 105-1-1 to 105-n-1 of the subscriber terminating packages LT#1 to LT#n are set to an on-state while the SW-M switches 106-1-1 to 106-n-1 are set to an off-state in accordance with a control signal from the outside. Consequently, signals from the subscriber terminals 101-1-1 to 101-n-1 are individually transmitted along paths indicated by thick lines in FIG. 57.

Then, if the subscriber terminating package LT#1 shown in FIG. 58 fails, then similarly as in the methods described in the paragraphs (i) and (ii) above, the subscriber terminating equipment 71 controls the subscriber connection switch 105-1-1 of the subscriber terminating circuit LT#1-1 of the fault package LT#1 to an off-state and controls the SW-M switch 106-1-1 of the subscriber terminating circuit LT#1-1 to an on-state, and further controls the SW-L switch 105-RS-1 of the relief package LT#RS to an on-state and controls the SW-PR switch 108-1-1 of the-switch package LT#SW to an on-state. Consequently, relief of the fault package is performed through paths of thick lines in FIG. 58. It is to be noted that such operation as illustrated in FIG. 58 is called temporary relief.

When the fault package LT#1 shown in FIG. 59 is to be replaced, the SW-RS switch 109-1-1 of the switch package LT#SW corresponding to the fault package LT#1 is switched on and the SW-PR switch 108-1 is switched off. Consequently, a signal from the subscriber terminal 101-1-1 is transmitted to the relief package LT#RS through the switch package LT#SW and thus follows such a path as indicated by a thick line in FIG. 59. Such operation as seen in FIG. 59 is called reserved switching.

FIG. 60 is a diagrammatic view illustrating flows of signals where a plurality of channels are used in the subscriber terminating equipment 71. Also in this instance, the subscriber terminating equipment 71 performs operation for the channels 2 to m similar to that for the channel 1.

Further, in the present method, the processing for the reserved relief is not necessarily required, and when a fault occurs, only processing for the temporary switching may be performed. Since switching to the relief package LT#RS is performed without using a switch in the fault package LT#1, communication is not interrupted also when the subscriber terminating package LT#1 is replaced.

This method, however, requires the switch package LT#SW for exclusive use and further requires a complicated wiring scheme.

Such subscriber terminating circuits of (i) to (iii) as described above have the following subjects.

(1) Subject to the Method wherein Only Temporary Relief Upon Fault Is Performed Without Using a Switch Package for Exclusive Use for Switching The method of (i) has a subject in that, as described hereinabove, if a fault package LT#i is removed in order to replace it, then since the bypassing path (path upon relief) passes in the fault package to be removed, communication is interrupted.

(2) Subject to the Method wherein an External Connection Cable Is Used

Also the method of (ii) requires physically connectable connectors, the external connection cable 107 and so forth on the outside of the subscriber terminating packages LT#i and the relief package LT#RS.

Further, for replacement of the fault package LT#1, an operator who performs the operation is required at a site for operation, and there is the possibility that an artificial miss such as wrong connection or incomplete connection of the external connection cable 107 may take place.

Furthermore, the external connection cable 107 for mere connection must be stored and managed in the proximity of the equipment, and besides there is the possibility that deterioration in characteristic may be caused by deterioration of a marginal portion of the external connection cable 107.

Besides, the external connection cable must be stored and managed in the proximity of the equipment and occupies a space of an equipment frame, and it is difficult to keep the security of the wiring lines.

Also it is a subject that the switch package LT#SW for exclusive use is required.

(3) Subjects to the Method wherein Wiring Lines Corresponding to an External Connection Cable Are Wired in Advance on a Backboard In the method of (iii), the circuit construction is complicated as described above. Further, since an increased wiring line length is required, the wiring lines are complicated when subscriber lines and the subscriber terminating circuit LT#i-j are connected to each other and become liable to suffer from an influence which causes deterioration in characteristic such as crosstalk.

Further, while an increased number of subscriber lines are wired on the backboard, since there are limitations to the number of switches which can be mounted on the switch package LT#SW, the number of subscriber lines which can be connected to the connectors and the number of subscribers which can be accommodated, the method of (iii) can be applied only to a limited number of subscriber apparatus.

Furthermore, where the distance from the subscriber terminating packages LT#i to the switch package LT#SW is great, since the wiring line length between them is added to the subscriber line 103-i-j, there is the possibility that this may give rise to deterioration in characteristic.

Further, since a great number of wiring lines are laid over long distances on the backboard, there is a high degree of possibility that noise may be provided to another signal system or noise may be provided from another signal system.

Also it is a subject that an increased cost is required.

The subscriber terminating equipments 71 of the methods (i) to (iii) described above, however, cannot solve all of such subjects as described above simultaneously.

SUMMARY OF THE INVENTION

It is an object of the present invention to provide a subscriber terminating equipment wherein switching operation of a circuit upon fault can be performed fully automatically.

It is another object of the present invention to provide a subscriber terminating equipment wherein, when a fault occurs with a subscriber terminating package, it can be replaced without disconnection of a circuit.

It is a further object of the present invention to provide a subscriber terminating equipment which is simplified in circuit configuration and wiring scheme.

In order to attain the object described above, according to an aspect of the present invention, there is provided a subscriber terminating equipment which includes a plurality of subscriber terminating packages connected between a plurality of subscriber terminals side and a network interface apparatus side, the network interface apparatus being connected to a network and capable of transferring a signal to a desired destination for accommodating the subscriber terminals, and a relief package having the same construction as that of the plurality of subscriber terminating packages for accommodating the subscriber terminals accommodated in a fault package which has failed from among the plurality of subscriber terminating packages, comprising a multi-connection line disposed in the proximity of the plurality of subscriber terminals and connected to each of the plurality of subscriber terminating packages, and a common section connected to each of the plurality of subscriber terminating packages for outputting switching signals to perform switching of a path between the subscriber terminals and the network interface apparatus, the plurality of subscriber terminating packages including multi-connection switches connected to the subscriber terminals and the multi-connection line for connecting/disconnecting electric signals between the subscriber terminals and the multi-connection line, subscriber connection switches connected to the subscriber terminals for connecting/disconnecting electric signals between the subscriber terminals and the network interface apparatus in response to connection conditions of the multi-connection switches, and relief switches connected to the subscriber connection switches, the relief package including a relief switch connected to the multi-connection line for connecting/disconnecting an electric signal between the multi-connection line and the network interface apparatus, a subscriber connection switch connected to the relief switch, and a multi-connection switch provided on a circuit board or a plurality of circuit boards, the common section selecting a pair of packages including a first package and a second package from among the plurality of subscriber terminating packages and allocating, if the first package fails, the second package as a bypass package for performing electric connection between the subscriber terminals and the relief package, the relief package and the subscriber terminating packages having the same circuit pattern for connection of the three kinds of switches.

In the subscriber terminating equipment, if a fault occurs with any one of the first and second subscriber terminating packages, the other of them functions as a bypass package for the one subscriber terminating package in accordance with switching signals from the common section and automatically accommodates the subscriber terminals of the fault package without passing the inside of the fault package. Consequently, the fault package can be replaced without disconnecting communication of the subscriber lines which have been accommodated in the fault package, and the circuit construction and the wiring line scheme can be simplified. Further, the subscriber terminating packages and the relief package can be formed with the same circuit configuration. Consequently, there is an advantage that reduction of the production cost can be anticipated because the number of parts can be reduced upon manufacture of the packages.

The common section may be constructed such that it controls, in normal operation, the subscriber connection switches in the subscriber terminating packages to a connection state and controls the three kinds of switches in the relief package to a disconnection state, but connects, when failure occurs, the subscriber terminals accommodated in the fault package with which the fault has occurred to the network interface apparatus through the multi-connection line and the bypass package.

As an alternative, the common section may be constructed such that it controls, when a fault occurs, the subscriber connection switch in the fault package to a disconnection state, controls the multi-connection switch in the bypass package to a connection state and controls the relief switch of the relief package to a connection state.

In the subscriber terminating equipments, if a fault occurs with any of the subscriber terminating packages, the subscriber terminals accommodated in the fault package are connected to the relief package without passing through the fault package. Consequently, there is an advantage that replacement of the fault package can be performed without disconnection of communication.

As another alternative, the common section may be constructed such that it allocates, when a fault occurs, one of the subscriber terminating packages which is adjacent the fault package as the bypass package, and sets the subscriber connection switch in the fault package to a disconnection state, sets the multi-connection switch in the bypass package to a connection state and controls the relief switch in the relief package to a connection state.

In the subscriber terminal equipment, if a fault occurs with any of the subscriber terminating packages, the subscriber terminals accommodated in the fault package are connected to the relief package without passing through the fault package. Consequently, even if the fault package is removed for replacement, communication is not disconnected, and accordingly, there is an advantage that the stability of the system is augmented.

As a further alternative, the common section may be constructed such that it selects one of the subscriber terminating packages which is disposed on the right side of the fault package and allocates the selected subscriber terminating package as the bypass package. Otherwise, the common section may be constructed such that it selects one of the subscriber terminating packages which is disposed on the left side of the fault package and allocates the selected subscriber terminating package as the bypass package.

In the subscriber terminating equipments, since a subscriber terminating package which is adjacent the fault package is allocated as a bypass package for it, the wiring lines are shortened and simplified. Consequently, there is an advantage that the transfer characteristic is augmented.

Otherwise, the common section may be constructed such that it establishes, when failure occurs, a self relief mode wherein the multi-connection switch in the fault package is set to a connection state and the subscriber connection switch and the multi-connection switch in the relief package are set to a connection state.

The subscriber terminating equipment is advantageous in that, when a fault occurs, the subscriber terminals can be relieved without the necessity for a package for bypassing.

Further, the common section may establish, when a fault occurs, a circuit switching mode wherein the three kinds of switches at least in the fault package are set to a disconnection state and the subscriber connection switch and the relief switch in the adjacent subscriber terminating package are set to a disconnection state while the multi-connection switch and the subscriber connection switch in the relief package are set to a connection state.

The subscriber terminating equipment is advantageous in that, since the circuit switching mode is set when a fault occurs, the fault package can be replaced without disconnection of communication of any of the subscriber terminals accommodated in the fault package.

Alternatively, the common section may establish, when a fault occurs, a self relief mode wherein the multi-connection switch at least in the fault package is set to a connection state and the subscriber connection switch in the fault package is set to a disconnection state while the subscriber connection switch in the adjacent subscriber terminating package is set to a connection state and the multi-connection switch and the subscriber connection switch in the relief package are set to a connection state.

The subscriber terminating equipment is advantageous in that, when a fault occurs, the subscriber terminals can be relieved without the necessity for a package for bypassing.

Otherwise, the common section establishes, when a fault occurs, a circuit switching mode wherein the three kinds of switches at least in the fault package are set to a disconnection state and the subscriber connection switch and the relief switch in the adjacent subscriber terminating package are set to a disconnection state while the multi-connection switch in the relief package is set to a connection state.

In the subscriber terminating equipment, the subscriber terminals accommodated in the fault package are connected to the relief package without passing through the switches in the fault package. Consequently, there is an advantage that, also when the fault package is replaced, it can be replaced without disconnection of communication of the subscriber terminals.

The packages may be formed such that at least ones of L/M points indicative of connection points of the subscriber terminals and the multi-connection switches, M/RS points indicative of connection points between the multi-connection line and the relief switches and RS/L points indicative of connection points between the relief switches and the subscriber connection switches are provided outside the subscriber terminating packages.

With the subscriber terminating equipment, there is an advantage that the number of circuit patterns for the subscriber terminating packages and the relief package can be reduced upon manufacture of the subscriber terminating packages and the relief package. Further, where the connection points are provided within the subscriber terminating packages, the wiring line lengths are reduced. Consequently, there is an advantage that the transmission characteristic can be augmented.

The subscriber terminating packages and the subscriber terminals may communicate with each other using a communication system which employs a two-line type subscriber line. Alternatively, the subscriber terminating packages, the subscriber terminals and the network interface apparatus may communicate with each other using a communication system which employs a four-line type subscriber line.

The subscriber terminating equipment is advantageous in that it can be applied irrespective of the transmission system used.

According to another aspect of the present invention, there is provided a subscriber terminating equipment which includes a plurality of subscriber terminating packages connected between a plurality of subscriber terminals and a network interface apparatus connected to a network and capable of transferring a signal to a desired destination for accommodating the subscriber terminals, and a relief package for accommodating the subscriber terminals accommodated in a fault package which has failed from among the plurality of subscriber terminating packages, comprising a multi-connection line disposed in the proximity of and connectable to the plurality of subscriber terminating packages, and a common section for controlling a plurality of connection/disconnection switches carried on the plurality of subscriber terminating packages, the plurality of subscriber terminating packages including multi-connection switches connected to the subscriber terminals and the multi-connection line for connecting/disconnecting electric signals between the subscriber terminals and the multi-connection line, and subscriber connection switches connected to the subscriber terminals and the network interface apparatus for connecting/disconnecting electric signals between the subscriber terminals and the network interface apparatus in response to connection conditions of the multi-connection switches, the relief package including a relief switch connected to the multi-connection line and the network interface apparatus for connecting/disconnecting electric signals between the multi-connection line and the network interface apparatus.

In the subscriber terminating equipment, if a fault occurs with any of the subscriber terminating packages, then the subscriber terminals accommodated in the fault package are automatically accommodated into the relief package in accordance with switching signals from the common section. Consequently, there is an advantage that subscriber terminals which have been accommodated in a fault package can be relieved without the necessity for manual operation for relief switching upon occurrence of a fault.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 36 is a block diagram illustrating operation of a subscriber terminating equipment according to a sixth modification to the second embodiment of the present invention in normal operation;

FIG. 44 is a block diagram showing an example of a construction of a system of a communication network;

FIG. 50 is a block diagram illustrating operation of the subscriber terminating equipment according to the first method when a fault occurs;

FIG. 54 is a block diagram illustrating operation of the subscriber terminating equipment according to the second method upon replacement for a spare package;

DESCRIPTION OF THE PREFERRED EMBODIMENTS (a) Description of the First Embodiment of the Invention FIG. 1 is a block diagram of a subscriber accommodation system in which a subscriber terminating equipment according to the present invention is incorporated. Referring to FIG. 1, the subscriber accommodation system 200 shown includes a plurality of subscriber terminals 1-1-1 to 1-n-1, a main distributing frame (MDF) 2, a plurality of subscriber lines 3-1-1 to 3-n-1, a subscriber terminating equipment 30 including a plurality of subscriber terminating packages LT#1 to LT#n and a relief package LT#RS as well as a common section 31, and a network interface apparatus 32. A control section 33 is connected to the subscriber accommodation system 200.

The subscriber terminating equipment 30 is on one hand connected to the subscriber terminals 1-1-1 to 1-n-1 through the subscriber lines 3-1-1 to 3-n-1 and the MDF 2 and on the other hand connected to the network interface apparatus 32.

The subscriber terminals 1-1-1 to 1-n-1 are terminals which are individually used by subscribers such as, for example, telephone sets or facsimile apparatus or may be ISDN terminals connected by an NT1 (Network Terminal 1; not shown) or an NT2.

The MDF 2 concentrates wiring lines from the subscriber terminals 1-1-1 to 1-n-1.

The subscriber lines 3-1-1 to 3-n-1 interconnect the subscriber terminals 1-i-1 and the subscriber terminating equipment 30 through the MDF 2.

The common section 31 is connected to each of the plurality of subscriber terminating packages LT#1 to LT#n and outputs a switching signal for switching a path between the subscriber terminals 1-i-1 (i is a natural number from 1 to n) and the network interface apparatus 32 in accordance with a control signal from the control section 33.

The subscriber terminating packages LT#1 to LT#n are connected to the subscriber terminals 1-1-1 to 1-n-1 and the network interface apparatus 32 which is connected to a network and can transfer a signal to a desired destination, and terminates the subscriber terminals 1-1-1 to 1-n-1.

The relief package (subscriber terminating package for relief) LT#RS has the same construction as that of the subscriber terminating packages LT#1 to LT#n and accommodates subscriber terminals 1-1-1 to 1-n-1 accommodated in that one of the plurality of subscriber terminating packages LT#1 to LT#n which has failed.

The relief package LT#RS thus accommodates the subscriber terminals 1-i-1 accommodated in a fault package LT#i from among the plurality of subscriber terminating packages LT#1 to LT#n into the network interface apparatus 32.

The network interface apparatus 32 is connected to the network and can transfer a signal from a subscriber terminal 1-i-1 to a desired destination. The network interface apparatus 32 is formed from an exchange or a router to exhibit its function.

The control section 33 performs control regarding accommodation of subscribers and supervision of another or other networks. As hereinafter described, the control section 33 detects a fault of the subscriber terminating packages LT#1 to LT#n and transmits an instruction for switching a switch to the common section 31.

Figure 1:
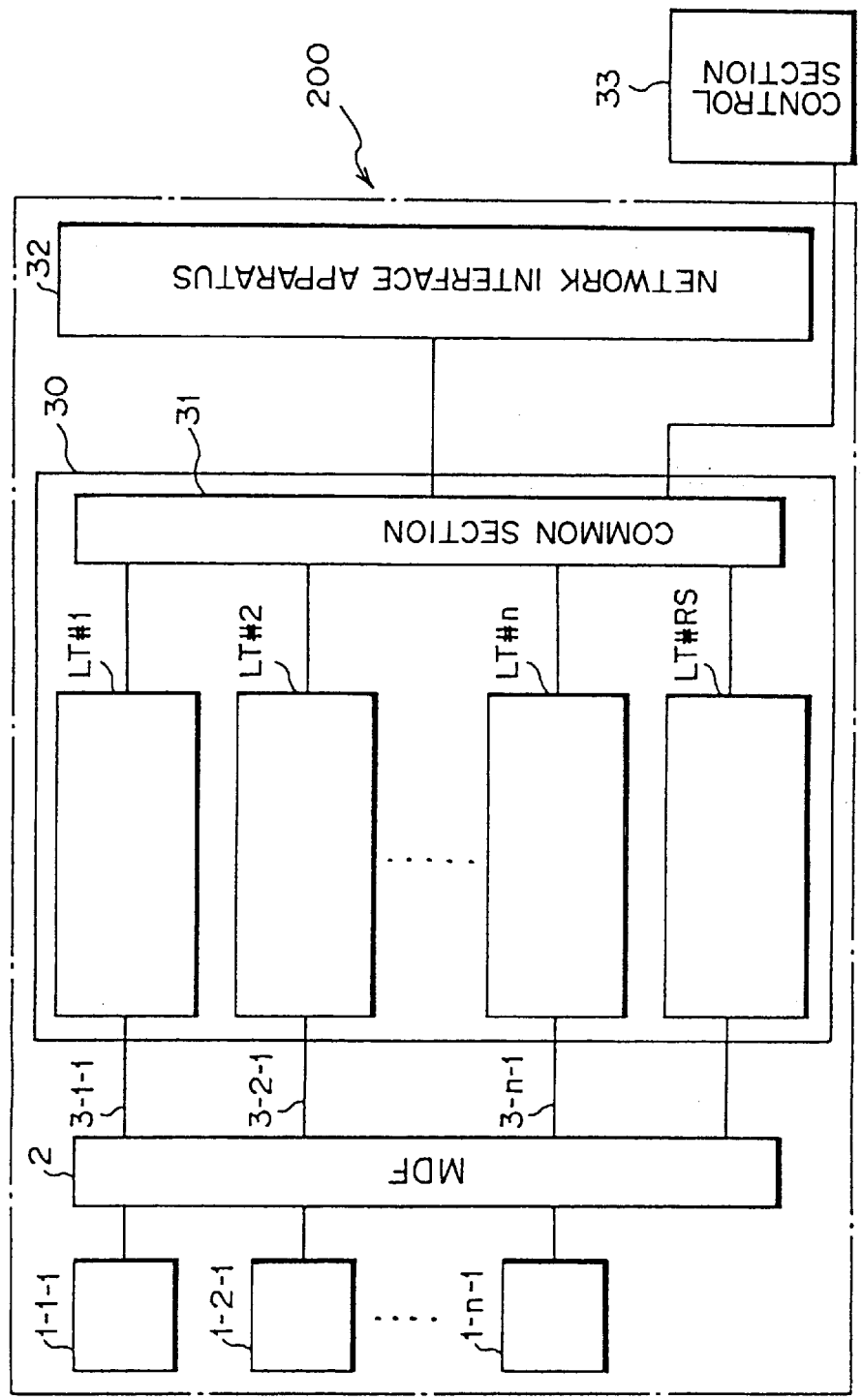
FIG. 1 is a block diagram of a subscriber accommodation system in which a subscriber terminating equipment according to a first embodiment of the present invention is incorporated.

The system construction of FIG. 1 is common to various embodiments and modifications hereinafter described.

Figure 2:
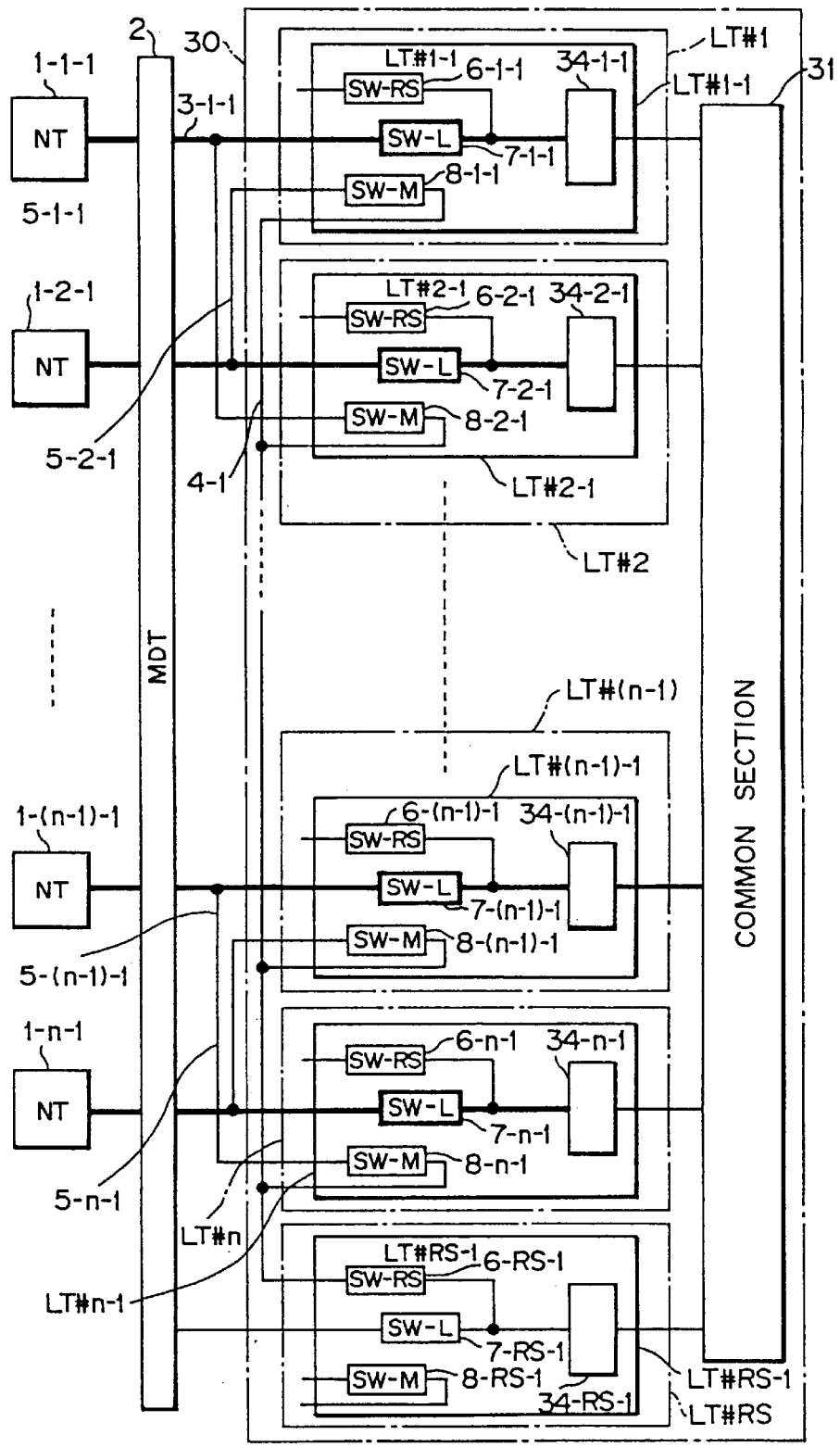
FIG. 2 is a block diagram illustrating operation of a subscriber terminating equipment according to the first embodiment of the present invention in normal operation.
Figure 3:
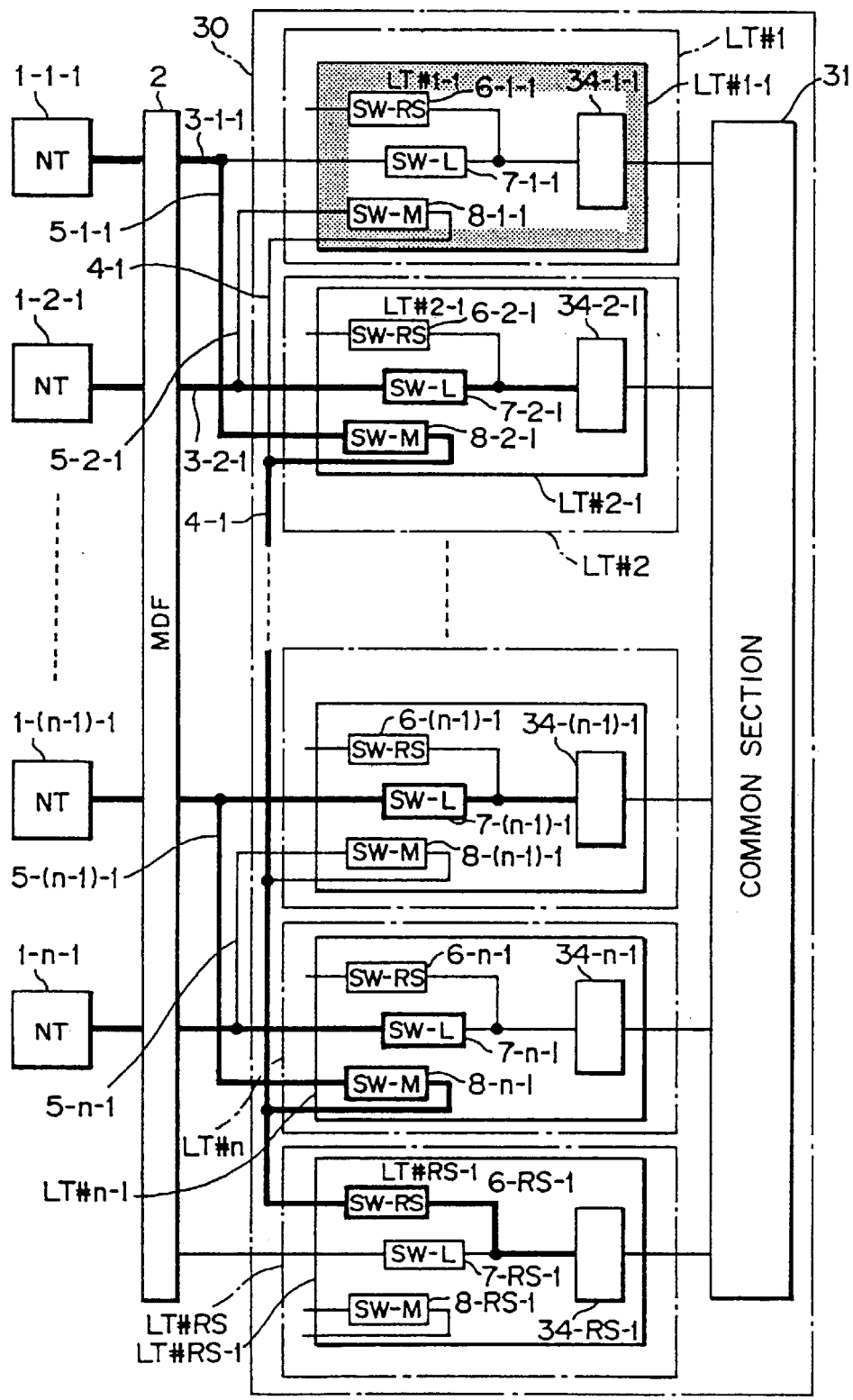
FIG. 3 is a block diagram illustrating operation of the subscriber terminating equipment according to the first embodiment of the present invention when a fault occurs.

FIG. 2 is a block diagram illustrating operation of the subscriber terminating equipment 30 according to the first embodiment of the present invention when it is in a normal operation condition, and FIG. 3 is a similar view but illustrating operation of the subscriber terminating equipment 30 when a fault occurs therewith. Referring first to FIG. 2, a subscriber terminating circuit LT#1-1 of the subscriber terminating package LT#1 includes a multi-connection switch (SW-M switch) 8-1-1, a subscriber connection switch (SW-L switch) 7-1-1, a relief switch (SW-RS switch) 6-1-1, and a subscriber circuit 34-1-1.

Also a subscriber terminating circuit LT#RS-1 of the relief package LT#RS similarly includes a SW-M switch 8-RS-1, a SW-L switch 7-RS-1, a SW-RS switch 6-RS-1, and a subscriber circuit 34-RS-1.

Also each of subscriber terminating circuits LT#2-1 to LT#n-1 of the subscriber terminating packages LT#2 to LT#n includes an SW-M switch 8-i-1 (i is a natural number from 1 to n), an SW-L switch 7-i-1, an SW-RS switch 6-i-1, and a subscriber circuit 34-i-1. The relief package LT#RS and the subscriber terminating packages LT#1 to LT#n have the same circuit pattern for connecting the three kinds of switches.

A multi-connection line 4-1 is disposed in the proximity of subscriber terminals 1-1-1 to 1-n-1 and connected to the subscriber terminating packages LT#1 to LT#n.

Each of the SW-L switches 7-1-1 to 7-n-1 is provided to establish or cut connection to a corresponding one of the subscriber terminals 1-1-1 to 1-n-1 and is connected at one end thereof to a corresponding one of the subscriber lines 3-1-1 to 3-n-1 and at the other end thereof to a corresponding one of the subscriber circuits 34-1-1 to 34-n-1.

The SW-M switches 8-1-1 to 8-n-1 are provided to connect/disconnect electric signals between the subscriber terminals 1-1-1 to 1-n-1 and the multi-connection line 4-1 and are each connected to one of the subscriber lines 3-1-1 to 3-n-1 and the multi-connection line 4-1.

The SW-RS switches 6-1-1 to 6-n-1 of the subscriber terminating packages LT#1 to LT#n are connected to the SW-L switches 7-1-1 to 7-n-1, respectively.

The SW-L switches 7-1-1 to 7-n-1 of the subscriber terminating circuits LT#1-1 to LT#n-1 of the subscriber terminating packages LT#1 to LT#n are connected to the subscriber terminals 1-1-1 to 1-n-1 and the subscriber circuits 34-1-1 to 34-n-1 and connect/disconnect electric signals between the subscriber terminals 1-1-1 to 1-n-1 and the subscriber circuits 34-1-1 to 34-n-1 in response to connection conditions of the SW-M switches 8-1-1 to 8-n-1.

The relief package LT#RS performs exchanging between the subscriber terminals 1-i-1 accommodated in a fault package LT#i and the network interface apparatus 32 and has the same construction as that of the subscriber terminating packages LT#1 to LT#n. Thus, the relief package LT#RS includes an SW-M switch 8-RS-1, an SW-L switch 7-RS-1, an SW-RS switch 6-RS-1 and a subscriber circuit 34-RS-1.

The SW-RS switch 6-RS-1 of the relief package LT#RS connects/disconnects an electric signal between the multi-connection line 4-1 and the network interface apparatus 32 (refer to FIG. 1; not shown in the figures which show the embodiments described below). The SW-RS switch 6-RS-1 is concentrated by the common section 31 through the multi-connection line 4-1 and the subscriber circuit 34-RS-1 and connected to the network interface apparatus 32.

The SW-L switch 7-RS-1 of the relief package LT#RS is connected to the SW-RS switch 6-i-1 and can accommodate the subscriber terminals 1-i-1 similarly to the other subscriber terminating packages LT#i.

The SW-M switch 8-RS-1 of the relief package LT#RS is provided on a circuit board or a plurality of circuit boards (relief package LT#RS) of the relief package LT#RS.

The SW-M switches 8-1-1 to 8-n-1 of the subscriber terminating circuits LT#1-1 to LT#n-1 of the subscriber terminating packages LT#1 to LT#n and the SW-RS switch 6-RS-1 of the relief package LT#RS are connected to each other outside the subscriber terminating packages LT#1 to LT#n and the relief package LT#RS by the multi-connection line 4-1.

The common section 31 selects a pair of subscriber terminating packages (LT#1 and LT#2) including the first subscriber terminating package (LT#1) and the second subscriber terminating package (LT#2) from among the subscriber terminating packages LT#1 to LT#n, and allocates, if the first subscriber terminating package (LT#1) fails, the second subscriber terminating package (LT#2) as a bypass package which is to perform electric connection between the subscriber terminal 1-1-1 and the relief package LT#RS.

Further, if a package (LT#1) fails, then the common section 31 allocates the subscriber terminating package (LT#2) which is adjacent the fault package (LT#1) as a bypass package, sets the SW-L switch 7-1-1 in the fault package (LT#1) to a disconnection state, sets the SW-M switch 8-2-1 in the bypass package (LT#2) to a connection state, and then sets the SW-RS switch 6-RS-1 in the relief package LT#RS to a connection state.

More particularly, for example, the SW-M switch 8-1-1 in the subscriber terminating circuit LT#1-1 of the subscriber terminating package LT#1 and the subscriber line 3-2-1 connected to the subscriber terminating circuit LT#2-1 of the subscriber terminating package LT#2 are connected to each other by the bypass line 5-2-1. Further, the SW-M switch 8-2-1 of the subscriber terminating circuit LT#2-1 of the subscriber terminating package LT#2 and the subscriber line 3-1-1 connected to the subscriber terminating circuit LT#1-1 of the subscriber terminating package LT#1 are connected to each other by the bypass line 5-1-1.

Also the subscriber terminating circuits LT#1-2 to LT#1-m and LT#2-2 to LT#2-m of the other channels 2 to m of the subscriber terminating packages LT#1 and LT#2 are connected similarly.

Each two subscriber terminating packages LT#i, i-1 which are adjacent each other such as the subscriber terminating package LT#1 and the subscriber terminating package LT#2, ..., and the subscriber terminating package LT#(n-1) and the subscriber terminating package LT#n are paired with each other. Further, the SW-M switch 8-i-1 of each of the subscriber terminating packages LT#i and the subscriber line 3-i-1 of the subscriber terminating package LT#i paired with the subscriber terminating package LT#i are connected to each other by the subscriber line 5-i-1.

Further, if a package LT#i fails, then the common section 31 sets the SW-L switch 7-i-1 in the fault LT#i to a disconnection state, sets the SW-M switch 8-i-j in the bypass package to a connection state, and sets the SW-RS switch 6-RS-1 of the relief package LT#RS to a connection state.

More particularly, if a fault occurs with the subscriber terminating package LT#1 shown in FIG. 3, then the common section 31 switches on the SW-L switch 7-1-1 in the fault package LT#1, switches on the SW-M switch 8-1-1, switches on the SW-M switch 8-1-1 of the subscriber terminating package LT#1 allocated so as to be paired with the fault package LT#1 and switches on the SW-RS switch 6-RS-1 in the relief package LT#RS so that a signal from the subscriber terminal 1-i-1 which has been accommodated in the fault package LT#i is extracted from the fault package LT#i and connected to the relief package LT#RS and consequently is transmitted to the network interface apparatus 32 through the common section 31.

Figure 4:
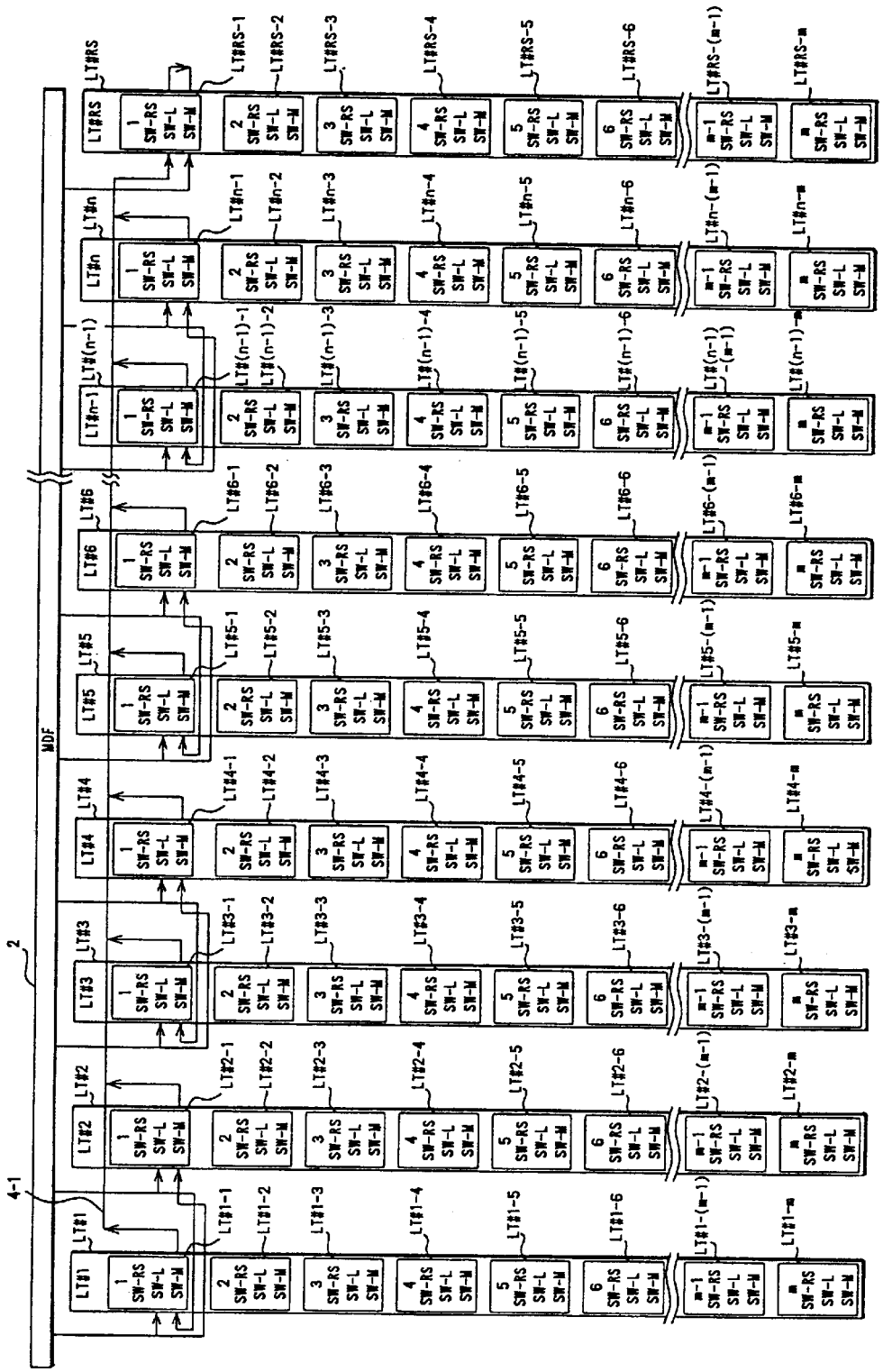
FIG. 4 is a block diagram showing flows of signals when a plurality of channels are used in the subscriber terminating equipment.

FIG. 4 is a block diagram showing flows of signals where a plurality of channels are used in the subscriber terminating equipment 30. Also for the channels 2 to m of the subscriber terminating packages LT#1 to LT#n and the relief package LT#RS, however, the subscriber terminating circuits LT#1-2 to LT#1-M have similar constructions to those of the subscriber terminating circuits LT#1-1 to LT#n-1 and LT#RS-1 for the channel 1 described above and operate similarly as with the channel 1.

Also the subscriber accommodation system 200 includes a plurality of subscriber terminals 1-i-2 to 1-i-m (not shown) for channel 2 to m respectively. Hereinafter these subscriber terminals 1-i-2 to 1-i-m are also called as 1-i-j.

Accordingly, the subscriber terminating equipment 30 which includes a plurality of subscriber terminating packages LT#i connected between a plurality of subscriber terminals 1-i-1 and a network interface apparatus 32 for accommodating the subscriber terminals 1-i-j in the network interface apparatus 32, and a relief package LT#RS for temporarily accommodating the subscriber terminals 1-i-1 accommodated in a fault package which has failed from among the plurality of subscriber terminating packages LT#i is constructed such that the subscriber terminating equipment 30 comprises a multi-connection line 4-1 disposed in the proximity of and connected to the plurality of subscriber terminating packages LT#i, and a common section 31 connected to the plurality of subscriber terminating packages LT#i for outputting switching signals to perform switching of a path between the subscriber terminals 1-i-j and the interface apparatus 32, that the plurality of subscriber terminating packages LT#i include multi-connection switches 8-i-j connected to the subscriber terminals 1-i-j and the multi-connection line 4-1 for-connecting/disconnecting electric signals between the subscriber terminals 1-i-j and the multi-connection line 4-1, and subscriber connection switches 7-i-j connected to the subscriber terminals 1-i-j and the common section 31 for connecting/disconnecting electric signals between the subscriber terminals 1-i-j and the network interface apparatus 32 in response to connection conditions of the multi-connection switches 8-i-j, and that the relief package LT#RS includes a relief switch 6-RS-j connected to the multi-connection line 4-1 and the network interface apparatus 32 for connecting/disconnecting an electric signal between the multi-connection line 4-1 and the network interface apparatus 32.

Figure 5:
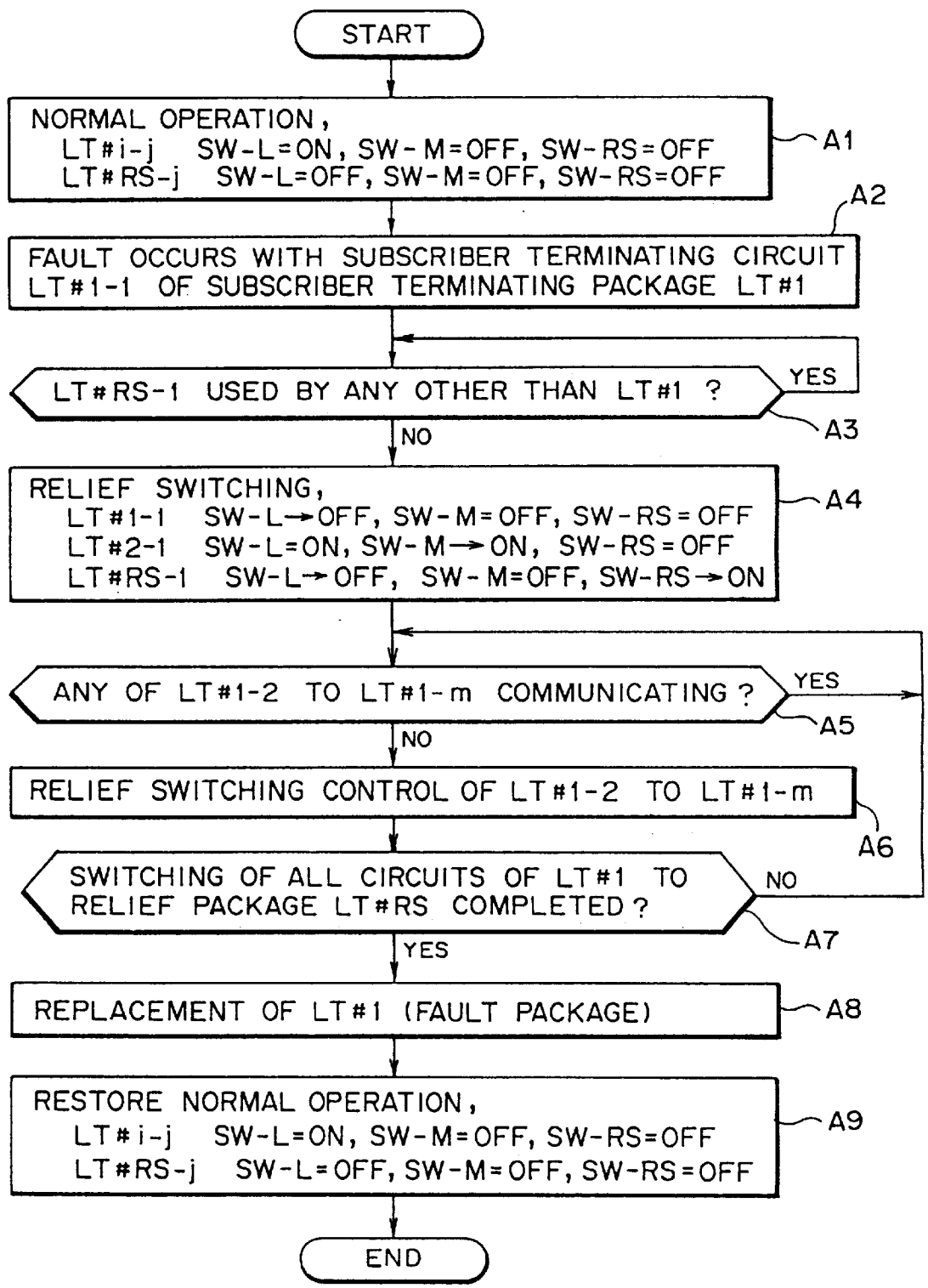
FIG. 5 is a flowchart illustrating operation of the subscriber terminating equipment according to the first embodiment of the present invention.

In the following, operation of the subscriber terminating equipment of the present embodiment having the construction described above is described in detail with reference to a flowchart of FIG. 5.

(i) Normal Operation

When the subscriber terminating equipment operates normally, in step A1, the SW-L switches 7-1-1 to 7-n-1 of the subscriber terminating packages LT#1 to LT#n are set to an on-state and the SW-RS switches 6-1-1 to 6-n-1 and the SW-M switches 8-1-1 to 8-n-1 are set to an off-state in accordance with switching signals from the common section 31 shown in FIG. 2.

The SW-L switch 7-RS-1, the SW-RS switch 6-RS-1 and the SW-M switch 8-RS-1 of the relief package LT#RS are set to an off-state.

Also in the subscriber terminating circuits LT#i-2 to LT#i-m of the subscriber terminating packages LT#i other than those for the channel 1, the SW-L switches 7-i-2 to 7-i-m are set to an on-state and the SW-RS switches 6-i-2 to 6-i-m and the SW-M switches 8-i-2 to 8-i-m are set to an off-state while the SW-L switches 7-RS-2 to 8-RS-m, the SW-RS switches 6-RS-2 to 6-RS-m and the SW-M switches 8-RS-2 to 8-RS-m are set to an off-state in accordance with switching signals from the common section 31.

In this manner, electric signals from the subscriber terminals 1-1-1 to 1-n-1 pass through the subscriber lines 3-1-1 to 3-n-1 and the MDF 2 and then through the SW-L switches 7-1-1 to 7-n-1 of the subscriber terminating circuits LT#1-1 to LT#n-1 and are outputted to the subscriber circuits 34-1-1 to 34-n-1 as seen from the paths indicted by thick lines in FIG. 2.

(ii) When a fault occurs

In step A2, if a fault occurs with the subscriber terminating circuit LT#1-1 of the subscriber terminating package LT#1 shown in FIG. 3, then the control section 33 detects that a fault occurs with the subscriber terminating circuit LT#1-1 of the subscriber terminating package LT#1.

Then, the control section 33 discriminates whether or not the relief package LT#RS is used by any of the other subscriber terminating packages LT#2 to LT#n (step A3). If the relief package LT#RS is used, then the processing follows the YES route of step A3, and consequently, the processing in step A3 is repeated. In other words, the used state of the relief package LT#RS is supervised.

Then, if the control section 33 discriminates in step A3 that the relief package LT#RS is not used by any of the other subscriber terminating packages LT#2 to LT#n, then the processing follows the NO route of step A3 and advances to step A4.

In step A4, based on the result of the discrimination of the control section 33, the common section 31 outputs a switching signal for switching off the SW-L switch 7-1-1 of the subscriber terminating circuit LT#1-1 of the fault package LT#1, a switching signal for switching on the SW-M switch 8-2-1 of the subscriber terminating circuit LT#2-1 of the subscriber terminating package LT#2 allocated as a bypass package for the subscriber terminating package LT#1 and a switching signal for switching on the SW-RS switch 6-RS-1 of the subscriber terminating circuit LT#RS-1 of the relief package LT#RS. Consequently, switching of the pertaining switches of the subscriber terminating package LT#1, the subscriber terminating package LT#2 and the relief package LT#RS is performed in accordance with the switching signals.

Then, an electric signal from the subscriber terminal 1-1-1 follows the path indicated by a thick line in FIG. 3. In particular, the electric signal passes through the SW-M switch 8-2-1 of the subscriber terminating circuit LT#2-1 of the bypass package LT#2 and further through the multi-connection line 4-1 and the SW-RS switch 6-RS-1 of the relief package LT#RS and is outputted to the network interface apparatus 32 through the subscriber circuit 34-RS-1.

It is to be noted, however, that, in this instance, the SW-L switches 7-2-1 to 7-n-1 in the subscriber terminating circuits LT#2-1 to LT#n-1 of the other subscriber terminating packages LT#2 to LT#n which do not suffer from a fault remain in an on-state, and consequently, the SW-L switches 7-2-1 to 7-n-1 individually operate similarly as in normal operation of the subscriber terminating equipment.

Also the SW-L switches 7-1-2 to 7-1-m in the subscriber terminating circuits LT#1-2 to LT#1-m of the other channels (channels 2 to m) of the fault package LT#1 which do not suffer from a fault remain in an on-state similarly, and in this stage, they operate similarly as in normal operation of the subscriber terminating equipment.

Then in step A5, the control section 33 discriminates whether or not at least one of the subscriber terminating circuits LT#1-2 to LT#1-m of the subscriber terminating package LT#1 is communicating in order to prevent data being communicated by any of the subscriber terminating circuits LT#1-2 to LT#1-m from being instantaneously disconnected upon switching of any switch.

If no communication is proceeding in step A5, then the processing follows the NO route of step A5 and advances to step A6. In step A6, the common section 31 outputs switching signals to the subscriber terminating package LT#1 and the relief package LT#RS. Consequently, switching similar to that of the subscriber terminating circuit LT#1-1 in step A4 is performed also with the subscriber terminating circuits LT#1-2 to LT#1-m of the subscriber terminating package LT#1 which do not suffer from a fault.

In particular, the SW-L switches 7-1-2 to 7-1-m of the subscriber terminating circuits LT#1-2 to LT#1-m are switched off and the SW-M switches 8-1-2 to 8-1-m of the subscriber terminating circuits LT#2-2 to LT#2-m are switched on, and the SW-RS switches 6-RS-2 to 6-RS-m in the subscriber terminating circuits LT#RS-2 to LT#RS-m of the relief package LT#RS are switched on. Consequently, the electric signal from the subscriber terminal 1-1-1 passes through the bypass package LT#2 and is transmitted from the relief package LT#RS to the network interface apparatus 32.

Thus, if any of the subscriber terminating circuits LT#1-2 to LT#1-m of the subscriber terminating package LT#1 is communicating in step A5, then the processing follows the YES route, and consequently, the processing in step S5 is repeated. In other words, supervision of the communication condition of the subscriber terminating circuits LT#1-2 to LT#1-m is performed by the control section 33.

In steps A5 and A6, after communication of any of the subscriber terminating circuits LT#1-2 to LT#1-m of the subscriber terminating package LT#1 which do not suffer from a fault is completed, the subscriber terminals 1-1-2 to 1-1-m accommodated in the subscriber terminating circuits LT#1-2 to LT#1-m are switched to the subscriber terminating circuits LT#RS-2 to LT#RS-m.

It is to be noted that, if each of the subscriber terminating circuits LT#i-j of the subscriber terminating packages LT#1 to LT#n and the relief package LT#RS includes a memory (buffer) for preventing instantaneous disconnection by switching of a switch, then switching of all of the subscriber terminating circuits LT#1-1 to LT#1-m of the subscriber terminating package LT#1 can be performed simultaneously in step A4. In this instance, the steps A5 and A6 are not required.

Then in step A7, it is discriminated whether or not the switching of the subscriber terminals 1-1-1 to 1-n-1 which have been accommodated in the fault package LT#1 to the relief package LT#RS is completed. If the switching is completed, then the processing follows the YES route of step A7 and advances to step A8, in which replacement of the fault package LT#1 is performed by an operator.

On the other hand, if the switching from the fault package LT#1 to the relief package LT#RS is not completed in step A7, then the processing follows the NO route of step A7 and advances to step A5.

Then, if the replacement of the subscriber terminating package LT#1 is completed in step A8, then the subscriber terminating packages LT#1 and LT#2 and the relief package LT#RS switch the subscribers accommodated in the relief package LT#RS to the subscriber terminating package LT#1 in response to switching signals from the common section 31.

In particular, in response to instructions of the control section 33, the common section 31 switches off the SW-M switches 8-1-1 to 8-1-m and switches on the SW-L switches 7-1-1 to 7-1-m of the subscriber terminating circuits LT#1-1 to LT#1-m of the subscriber terminating package LT#1, switches off the SW-M switches 8-2-1 to 8-2-m of the subscriber terminating circuits LT#2-1 to LT#2-m of the subscriber terminating package LT#2, and switches off the SW-RS switches 6-RS-1 to 6-RS-m of the subscriber terminating circuits LT#RS-1 to LT#RS-m of the relief package LT#RS to restore a normal operation mode in which such normal operation as described hereinabove with reference to FIG. 2 is performed, thereby ending the processing.

As described, with the subscriber terminating equipment 30 of the present embodiment, if a fault occurs with a subscriber terminating package LT#i, an electric signal is connected to the relief package LT#RS through a bypass package LT#i allocated to the fault package LT#i. Consequently, relief of the subscriber terminals 1-i-1 to 1-i-m accommodated in the fault package LT#i is performed automatically by remote operation. Further, since the path upon the relief does not passes the fault package LT#i, there is an advantage that communication is not interrupted at all even when the fault package LT#i is removed or replaced.

Further, since a bypass package LT#i is allocated between two adjacent subscriber terminating packages LT#i in this manner, a switch package for exclusive use is not necessary. Further, since the length of the wiring line between a fault package LT#i and a bypass package LT#i for the fault package LT#i can be minimized, augmentation of the transmission characteristic and suppression of the possibility of crosstalk can be achieved, and the physical space can be utilized effectively.

Furthermore, since the plurality of subscriber terminating packages LT#i and the relief package LT#RS have the same construction in this manner, upon manufacture, they can be produced as products of the same configuration, and consequently, there is an advantage that the production cost can be reduced.

Figure 49:
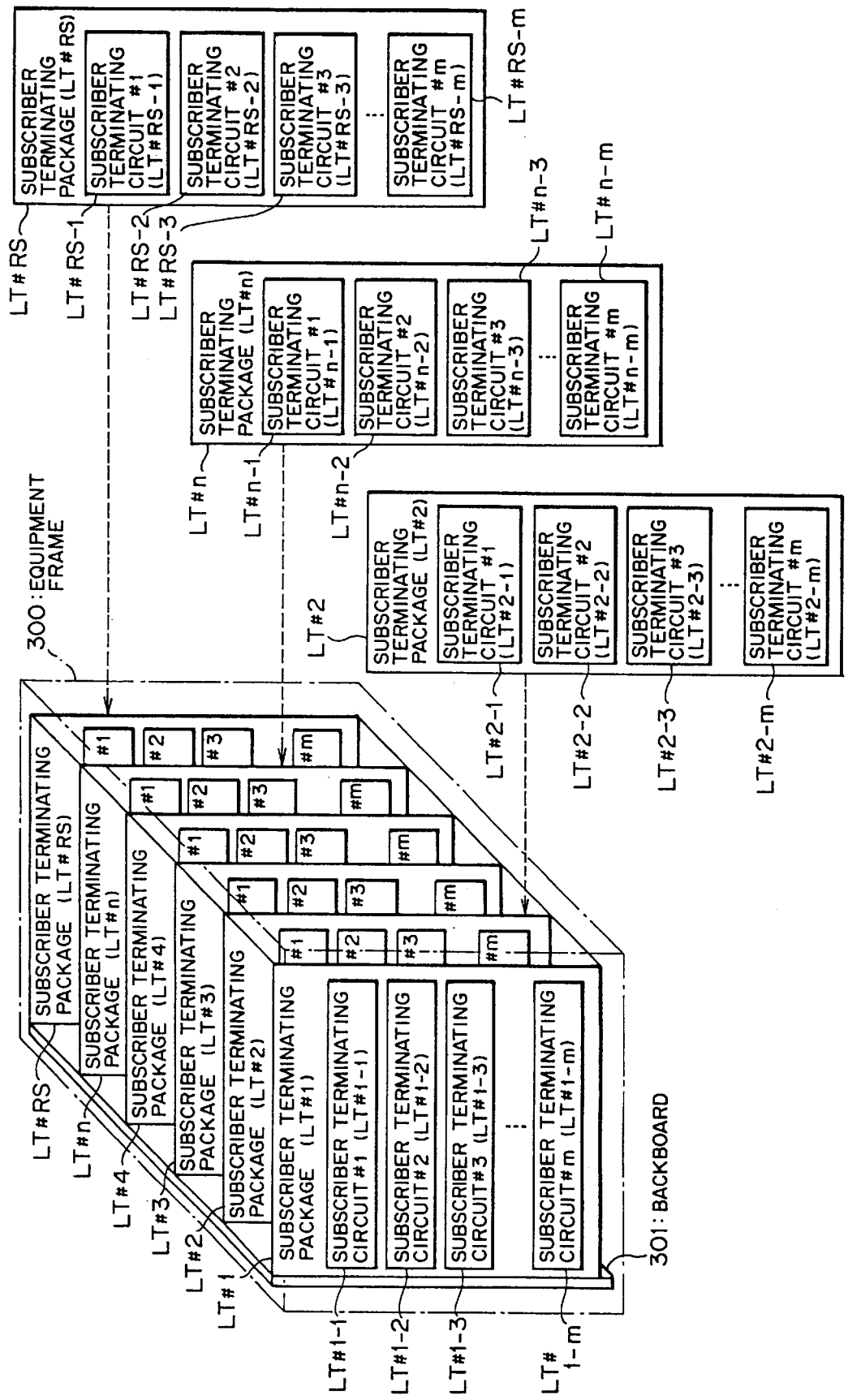
FIG. 49 is a schematic view of the subscriber terminating equipment.
Figure 51:
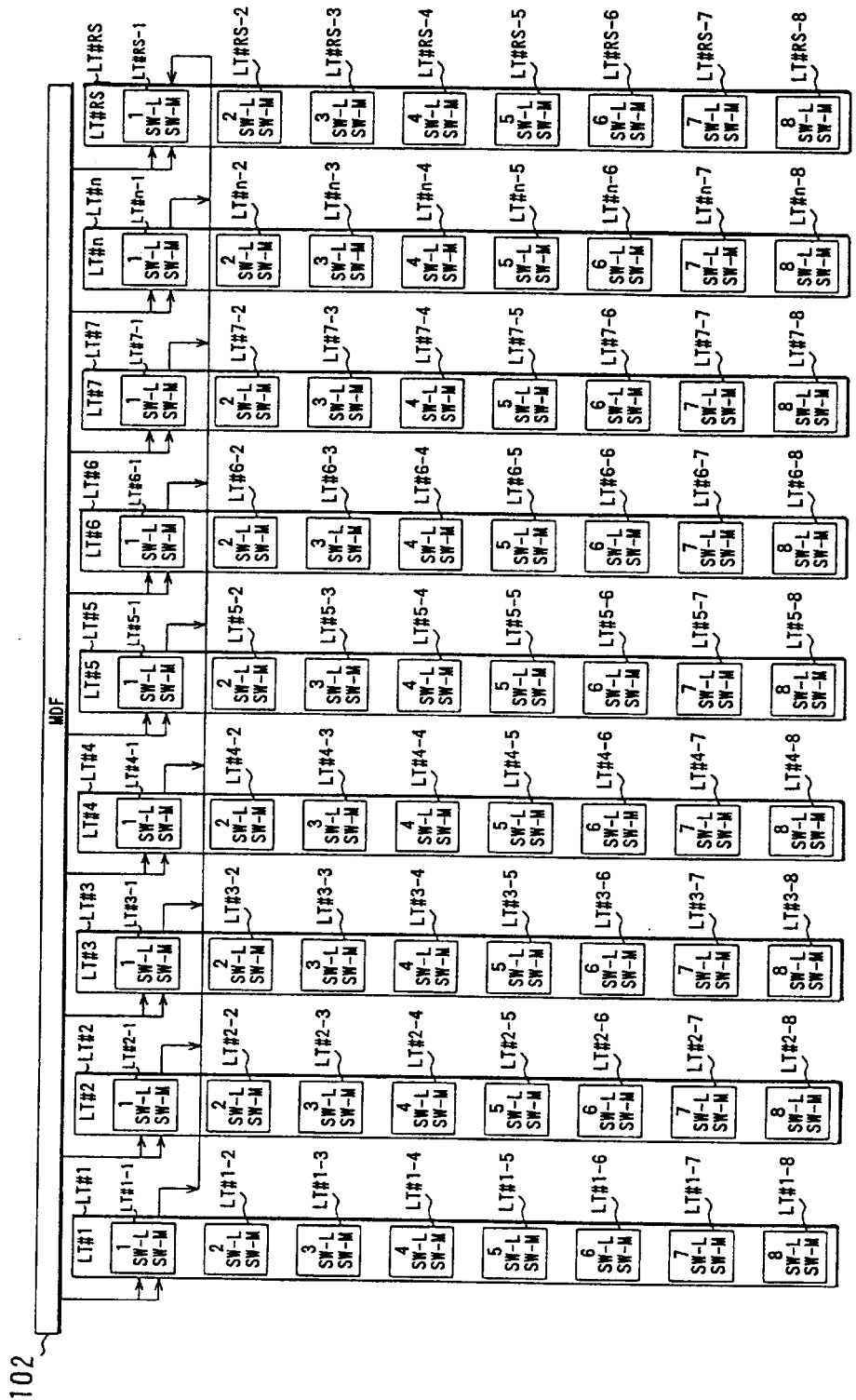
FIG. 51 is a block diagram showing flows of signals when a plurality of channels are used in the subscriber terminating equipment according to the first method.
Figure 52:
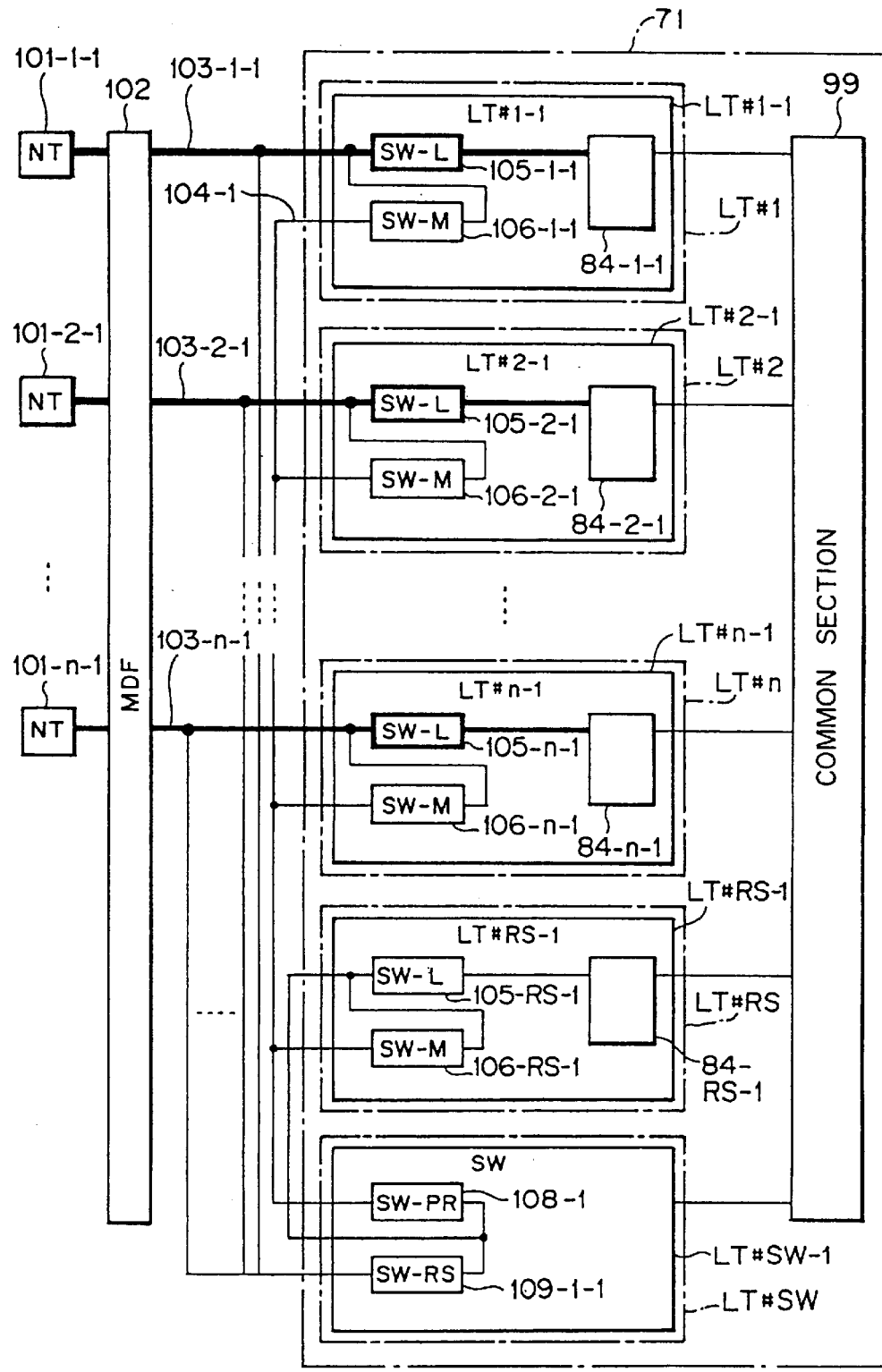
FIG. 52 is a block diagram illustrating operation of the subscriber terminating equipment according to a second method in normal state.
Figure 53:
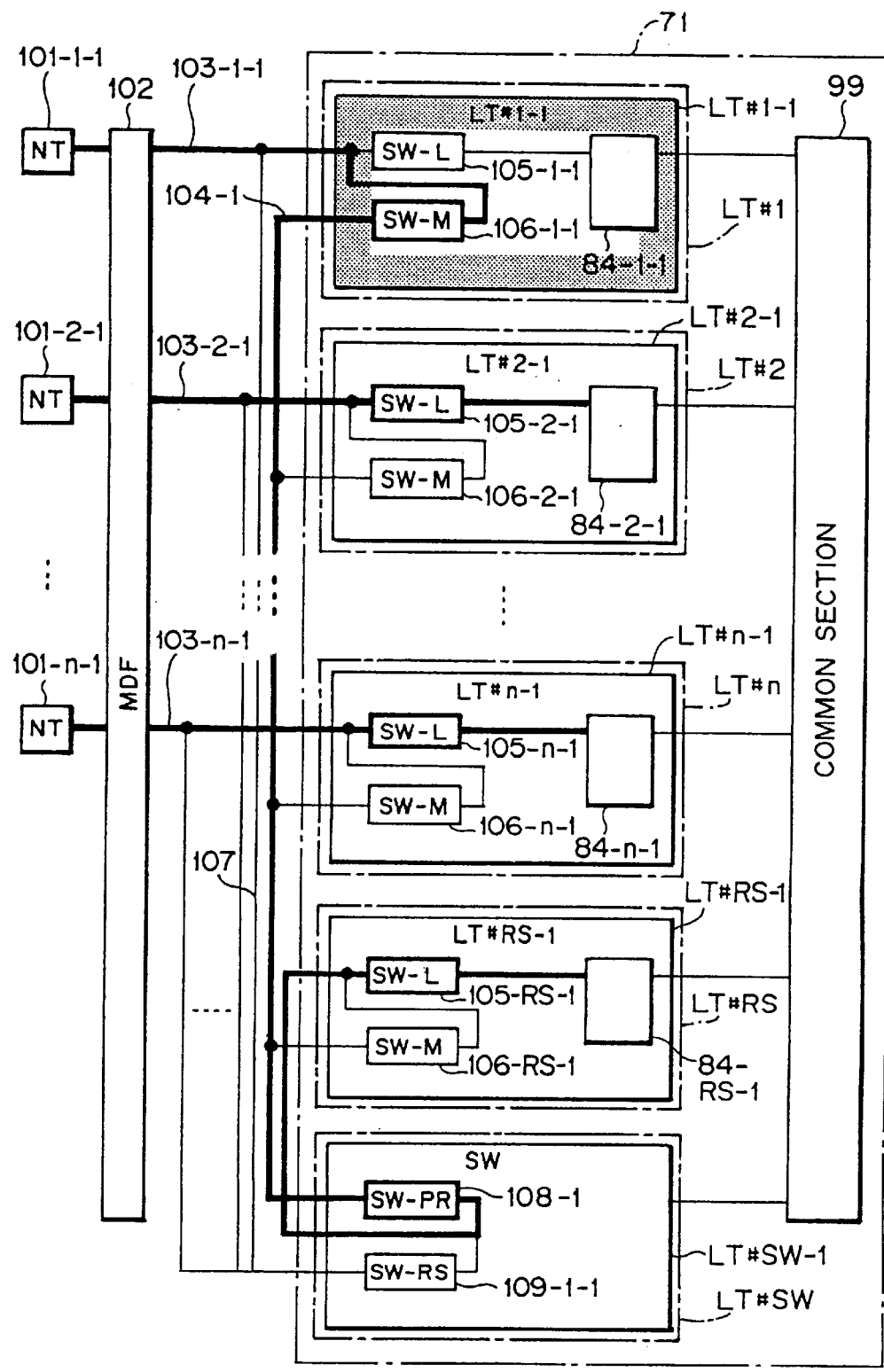
FIG. 53 is a block diagram illustrating operation of the subscriber terminating equipment upon temporal relief by the second method.
Figure 55A:
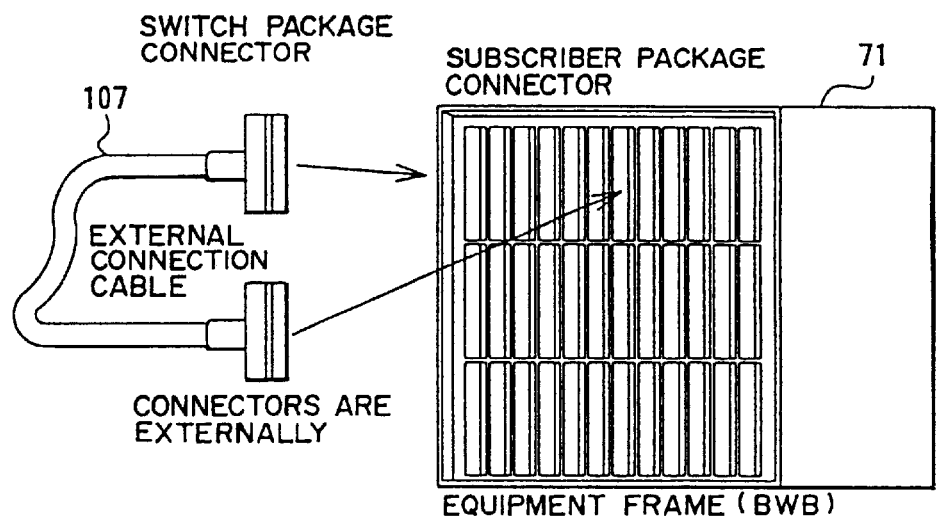
FIG. 55(a) is a schematic view of a connector of a subscriber terminating equipment and an external connection cable.
Figure 55B:
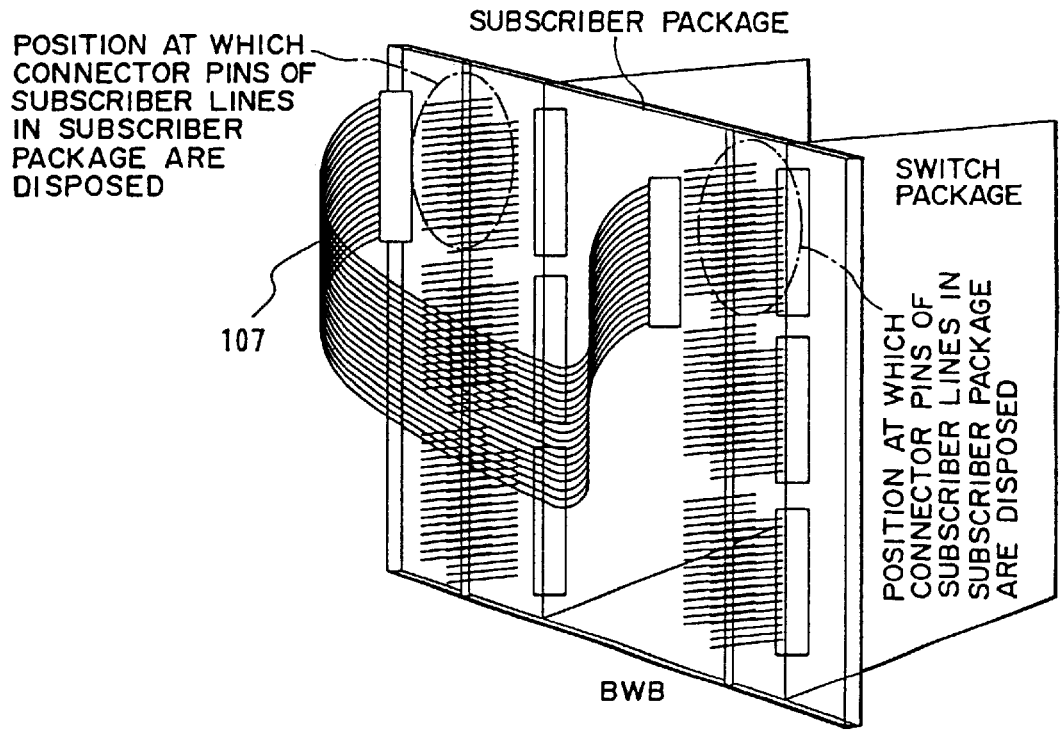
FIG. 55(b) is a schematic view illustrating a manner of connection by the outer portion connecting cable.
Figure 56:
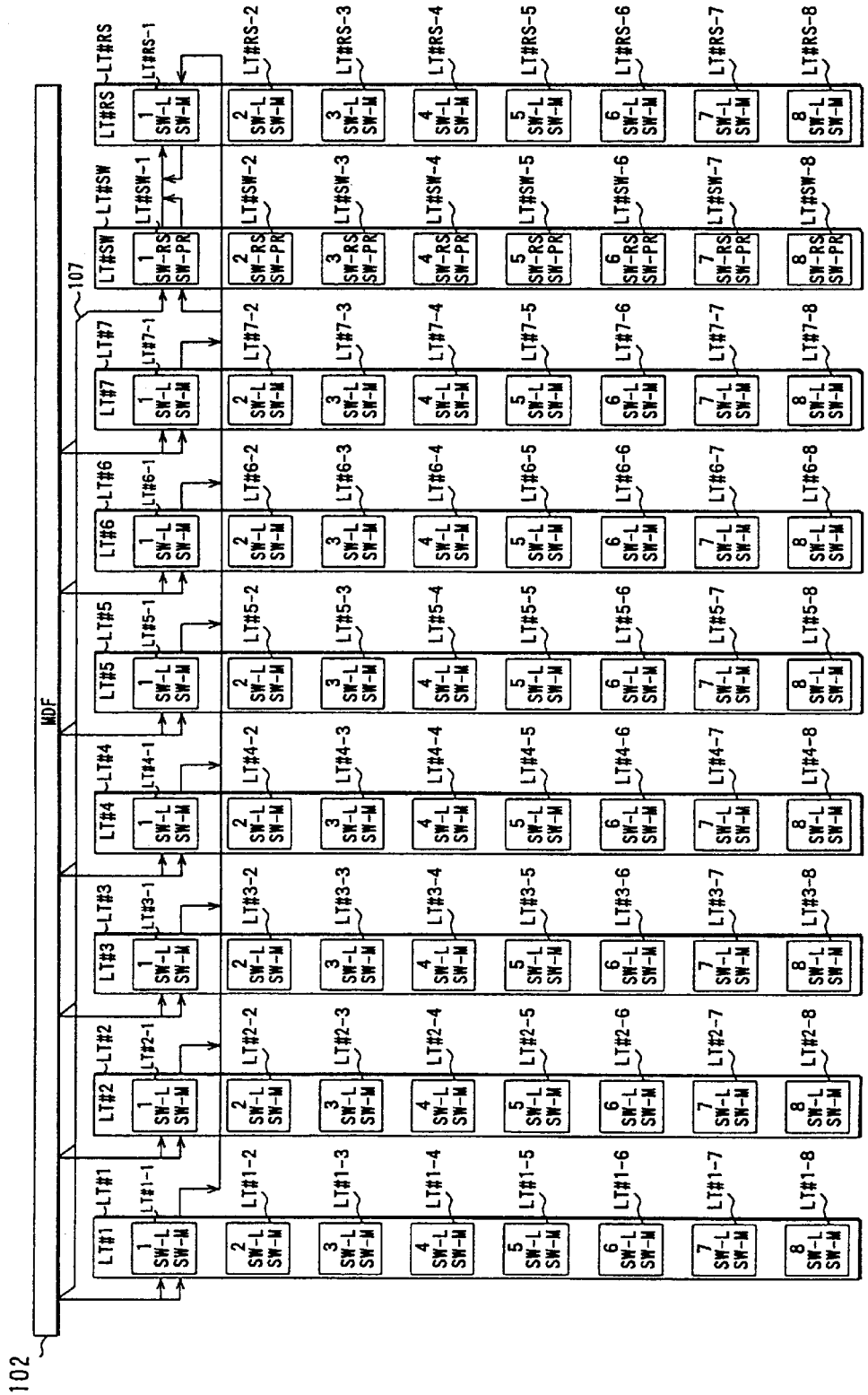
FIG. 56 is a block diagram showing flows of signals when a plurality of channels are used in the subscriber terminating equipment according to the second method.
Figure 57:
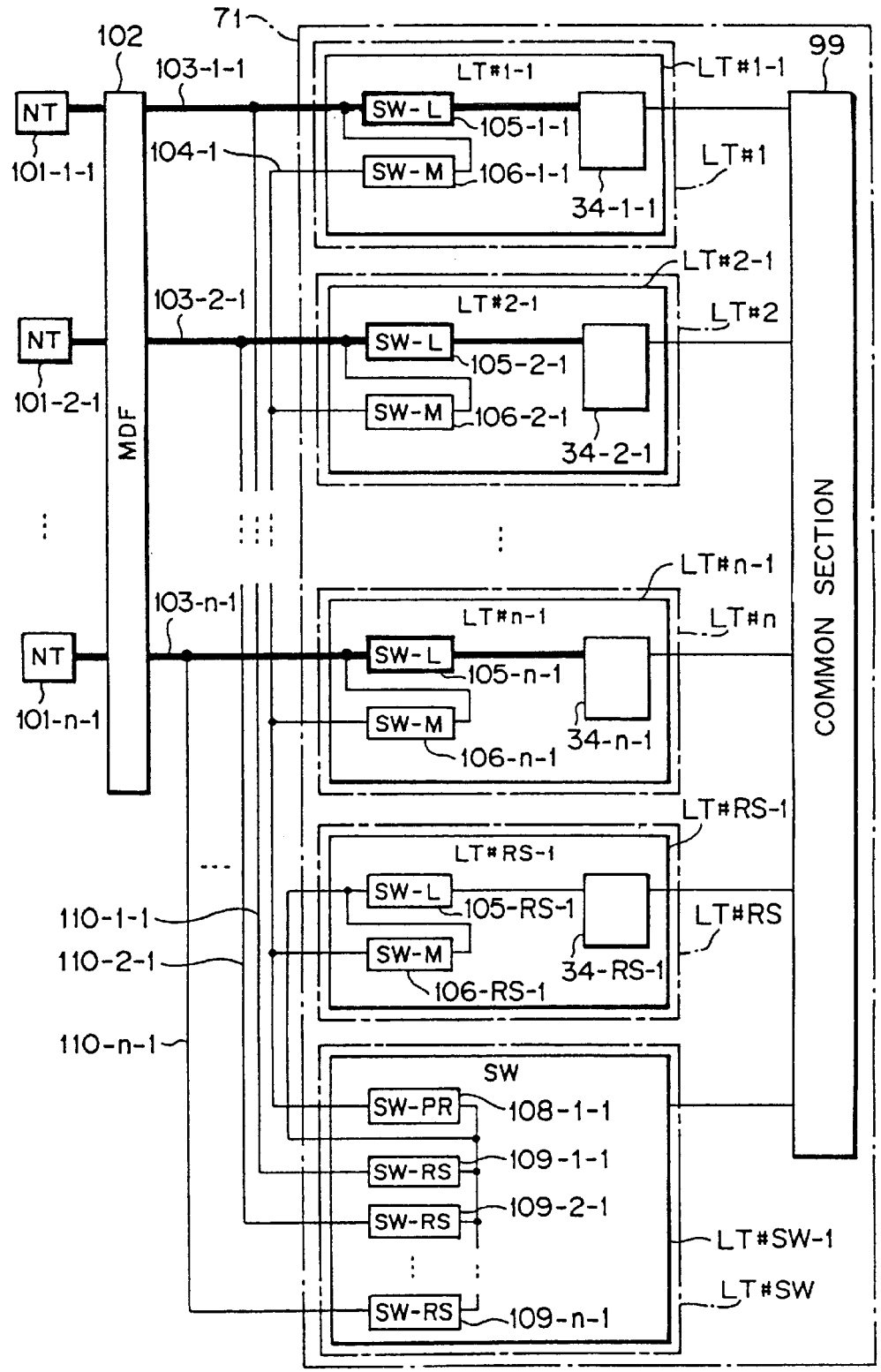
FIG. 57 is a block diagram illustrating operation of the subscriber terminating equipment according to a third method in normal state.
Figure 58:
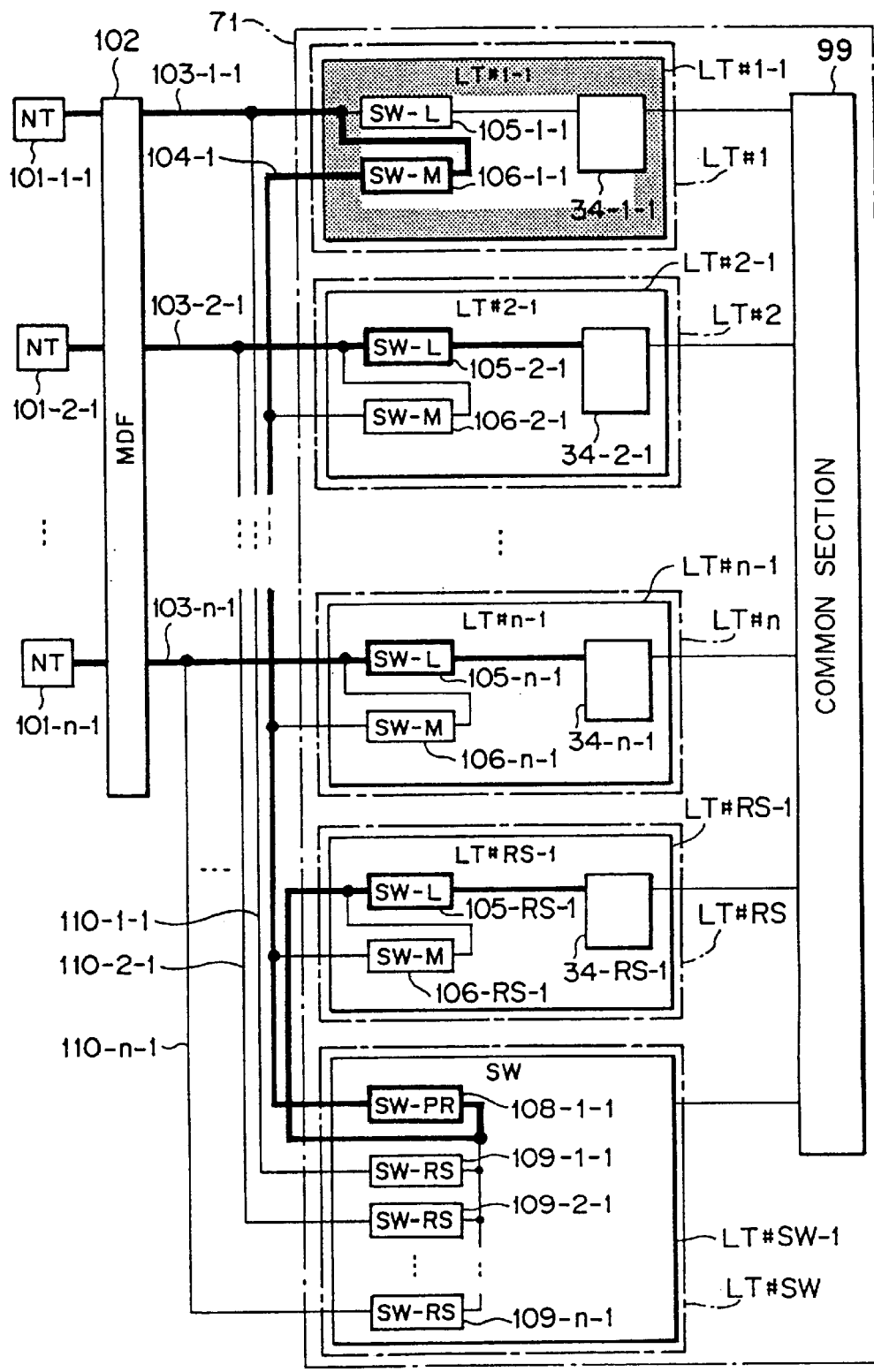
FIG. 58 is a block diagram illustrating operation of the subscriber terminating equipment according to the third method upon temporary relief.
Figure 59:
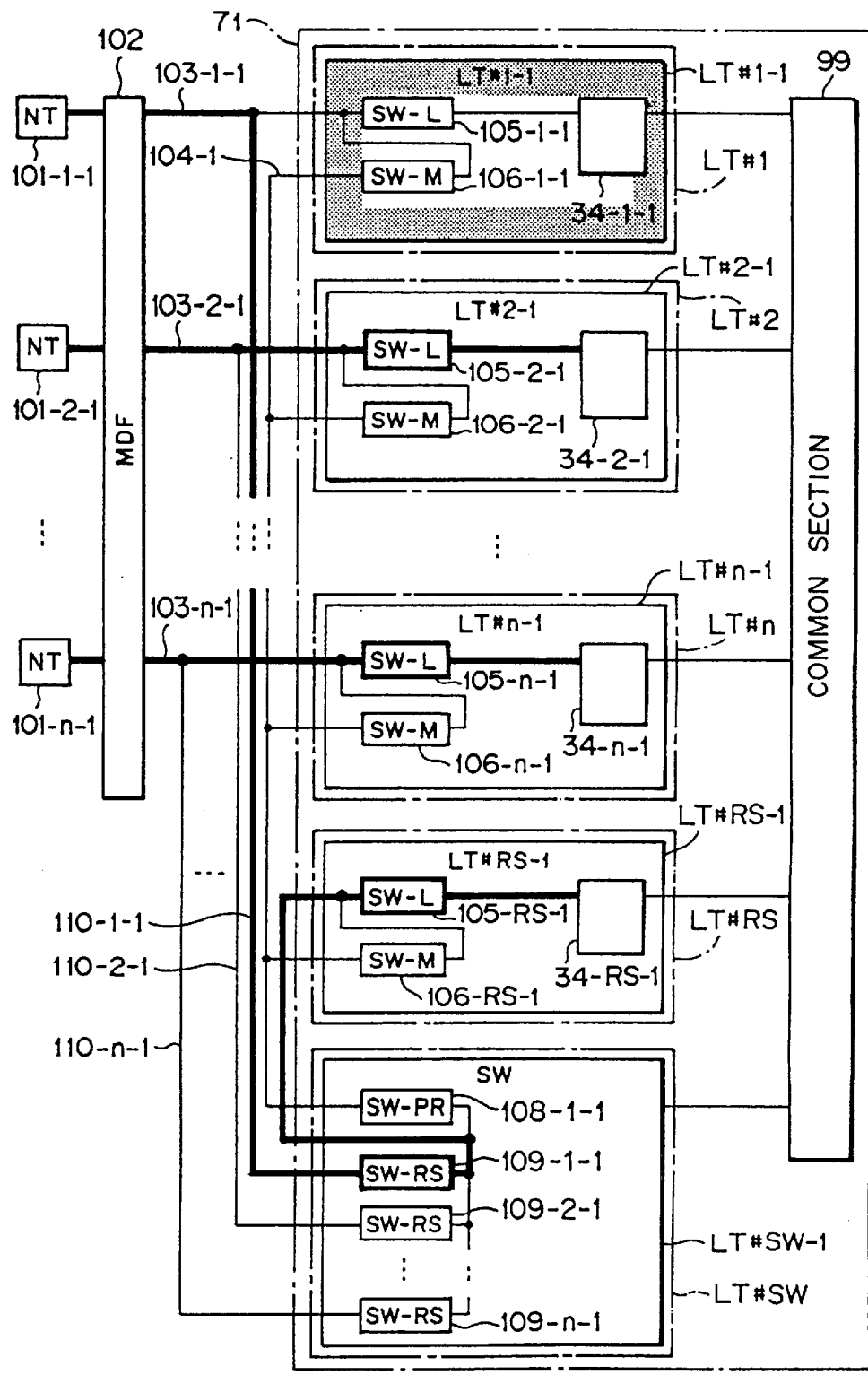
FIG. 59 is a block diagram illustrating operation of the subscriber terminating equipment according to the third method upon replacement for a spare package.
Figure 60:
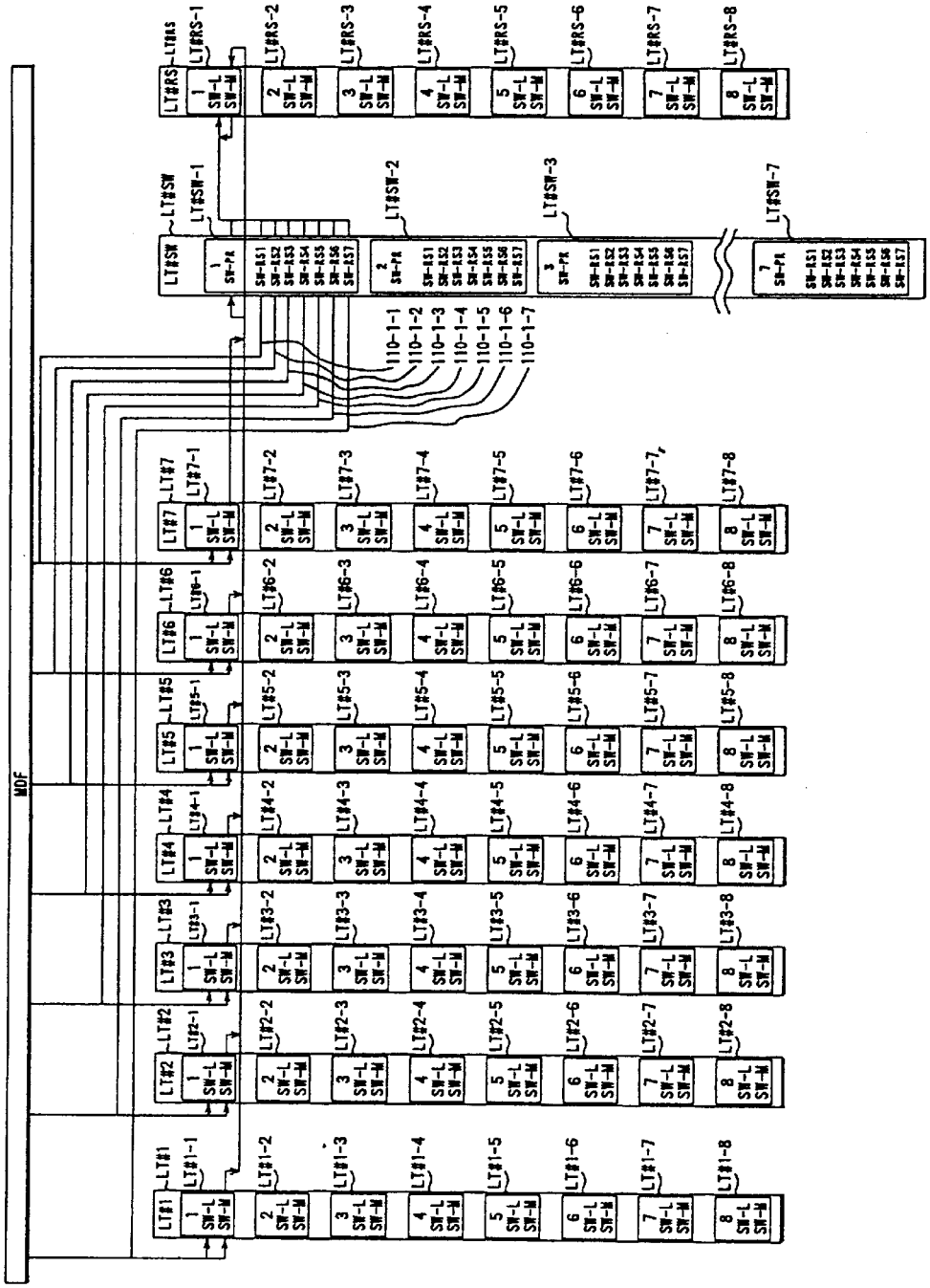
FIG. 60 is a block diagram showing flows of signals when a plurality of channels are used in the subscriber terminating equipment according to the third method.

In addition, since connection between switches in subscriber terminating packages can be performed even on the backboard 301 (refer to FIG. 49) in this manner, the number of circuit patterns of the subscriber terminating packages can be reduced. Consequently, there is an advantage that reduction of the cost can be anticipated.

Figure 6:
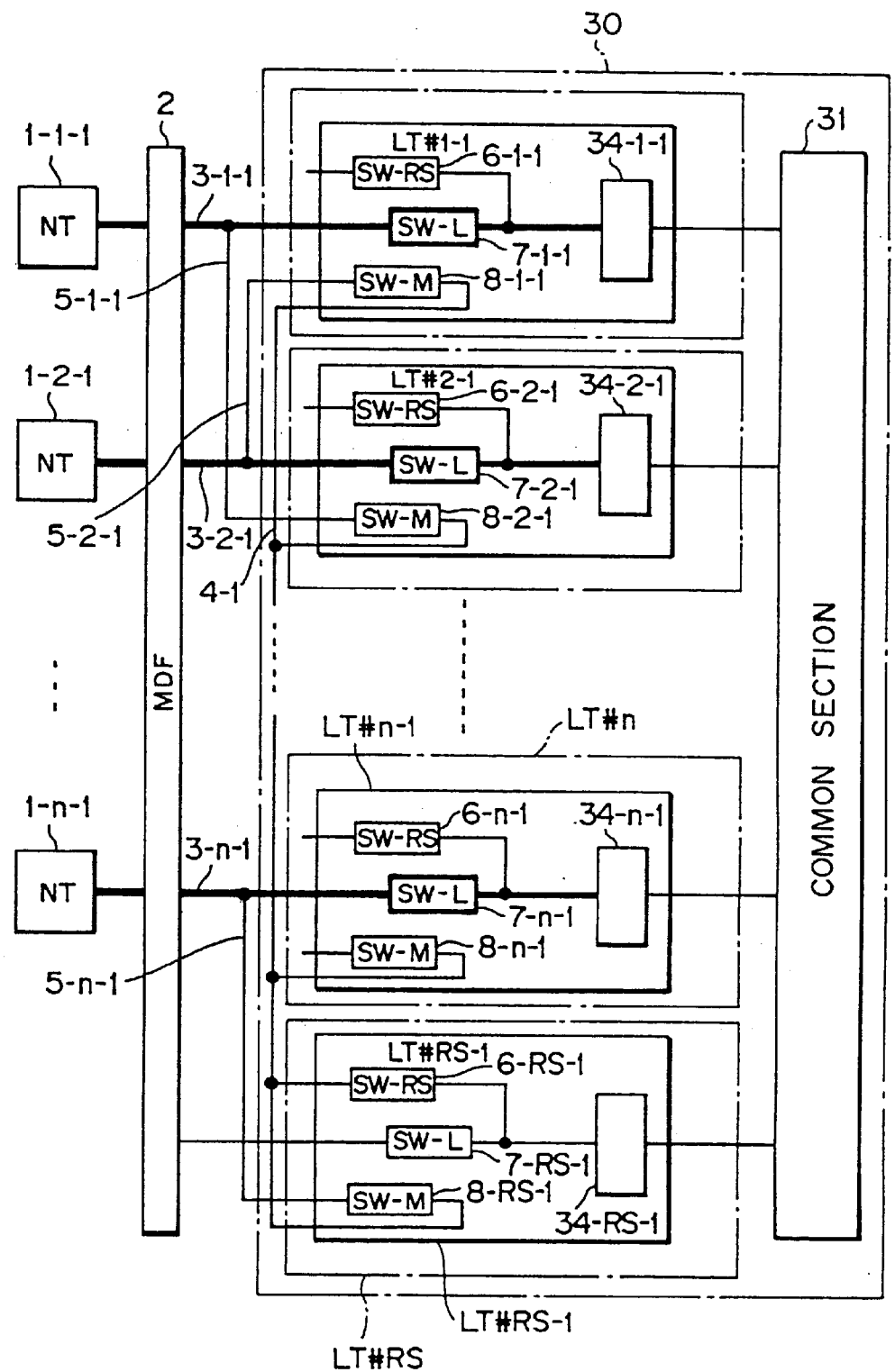
FIG. 6 is a block diagram illustrating operation of a subscriber terminating equipment according to a first modification to the first embodiment of the present invention in normal operation.
Figure 7:
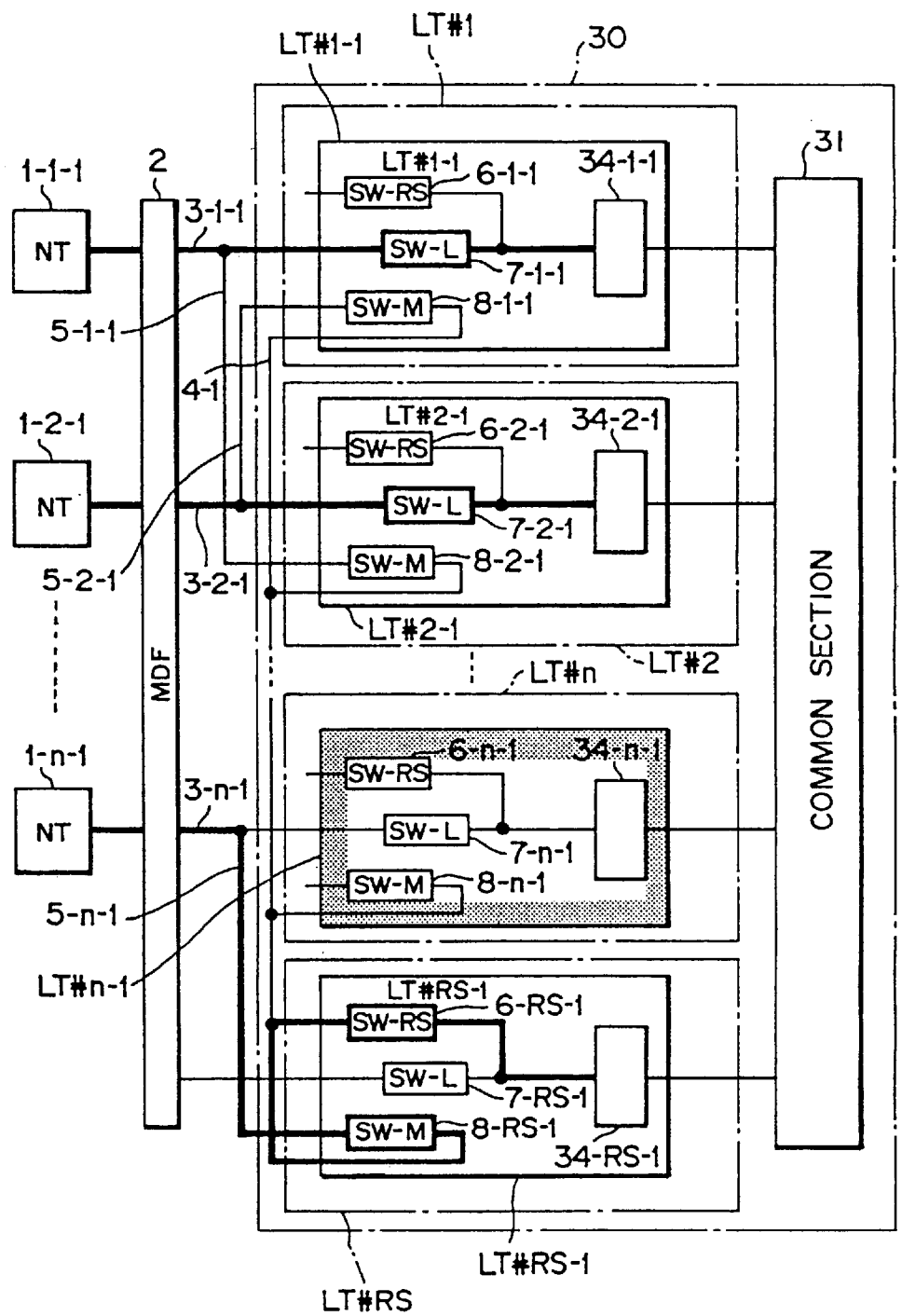
FIG. 7 is a block diagram illustrating operation of the subscriber terminating equipment according to the first modification to the first embodiment of the present invention when a fault occurs.

(a1) Description of the First Modification to the First Embodiment of the Present Invention FIG. 6 is a block diagram illustrating operation of the subscriber terminating equipment 30 according to a first modification to the first embodiment of the present invention when it operates normally, and FIG. 7 is a block diagram illustrating operation of the subscriber terminating equipment 30 according to the first modification when a fault occurs. The modified subscriber terminating equipment 30 is similar to but is different from the subscriber terminating equipment 30 of the first embodiment described hereinabove in that the sum of the number of subscriber terminating packages LT#i and the number of relief packages LT#RS is an even number, that is, the number of subscriber terminating packages LT#i is an odd number.

Thus, since the number of subscriber terminating packages LT#i is an odd number, if the subscriber terminating packages LT#i are allocated so as to be paired, then the n-th subscriber terminating package LT#n remains without being paired. Thus, in the present modification, the relief package LT#RS is allocated as a bypass package for the remaining subscriber terminating package LT#n.

More particularly, the SW-M switch 8-RS-1 of the subscriber terminating circuit LT#RS-1 of the relief package LT#RS shown in FIG. 6 and the subscriber line 3-n-1 connected to the subscriber terminating circuit LT#n-1 of the subscriber terminating package LT#n are connected to each other by a bypass line 5-n-1.

Also for the channels 2 to m, SW-M switches 8-RS-2 to 8-RS-m of the subscriber terminating circuits LT#RS-2 to LT#RS-m of the relief package LT#RS and the subscriber lines 3-n-2 to 3-n-m (not shown) connected to the subscriber terminating circuit LT#n-1 of the subscriber terminating package LT#n are connected to each other. As a result, the relief package LT#RS has functions not only as the relief package LT#RS but also as a bypass package for the subscriber terminating package LT#n.

Operation in this instance is such that, if a fault occurs with the subscriber terminating package LT#n shown in FIG. 7 (refer to a screened portion in FIG. 7), then a signal from the subscriber terminal 1-n-1 is introduced into the relief package LT#RS through the subscriber line 3-n-1 and the bypass line 5-n-1. Further, the signal is transmitted to the subscriber circuit 34-RS-1 through the SW-M switch 8-RS-1, which has been switched on, and the SW-RS switch 6-RS-1, which has been switched on.

Figure 8:
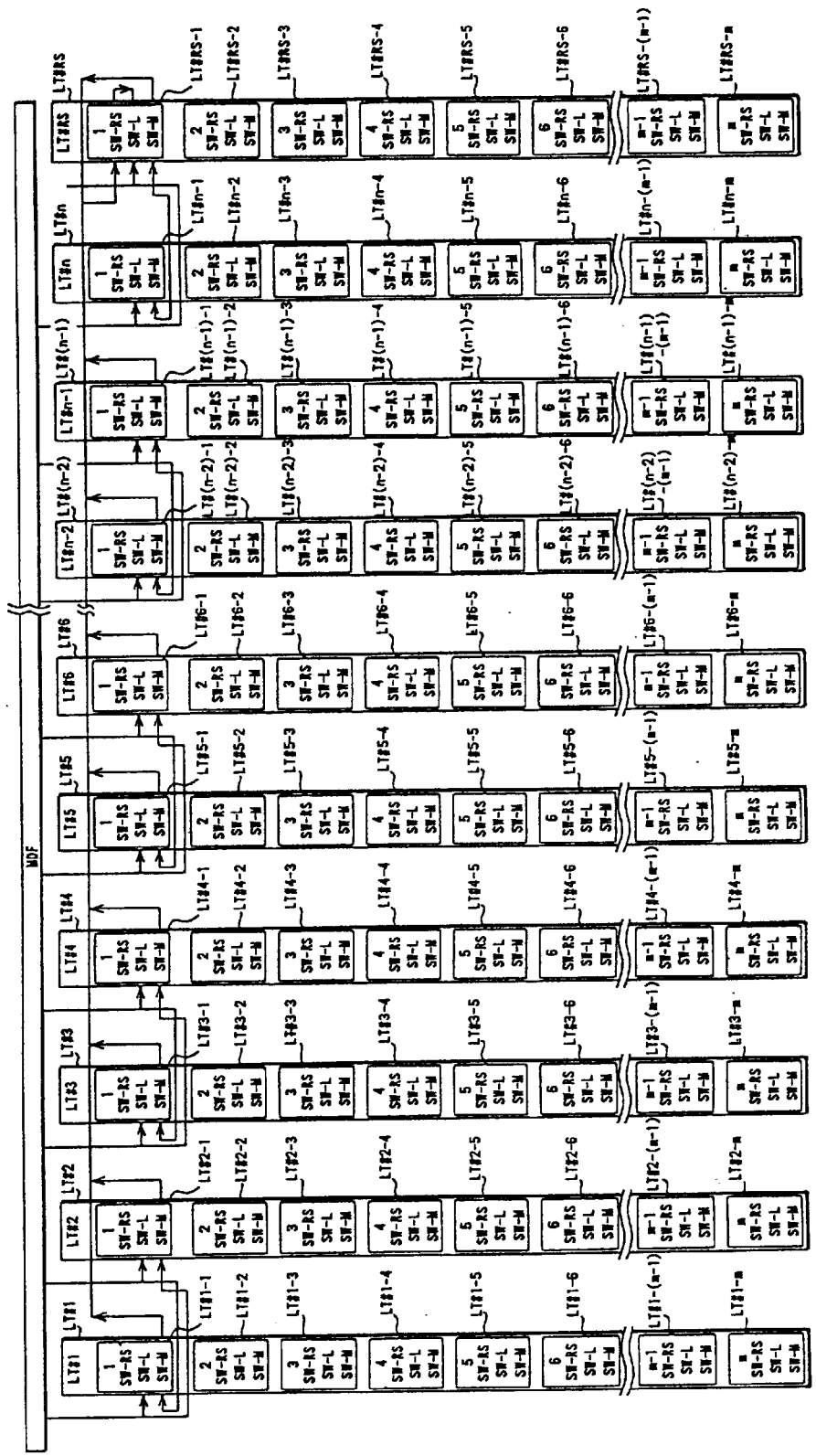
FIG. 8 is a block diagram showing flows of signals when a plurality of channels are used in the subscriber terminating equipment according to the first modification to the first embodiment of the present invention.

FIG. 8 is a block diagram showing flows of signals where a plurality of channels are used in the subscriber terminating equipment 30. Similarly as in FIG. 4, a plurality of channels can be accommodated.

Consequently, similar effects to those of the subscriber terminating equipment 30 of the first embodiment can be achieved with the subscriber terminating equipment 30 of the present modification.

Further, since the relief package LT#RS performs bypassing and relief in this manner, a switch package for exclusive use is not required, and the mounting efficiency of packages is further augmented.

Figure 9:
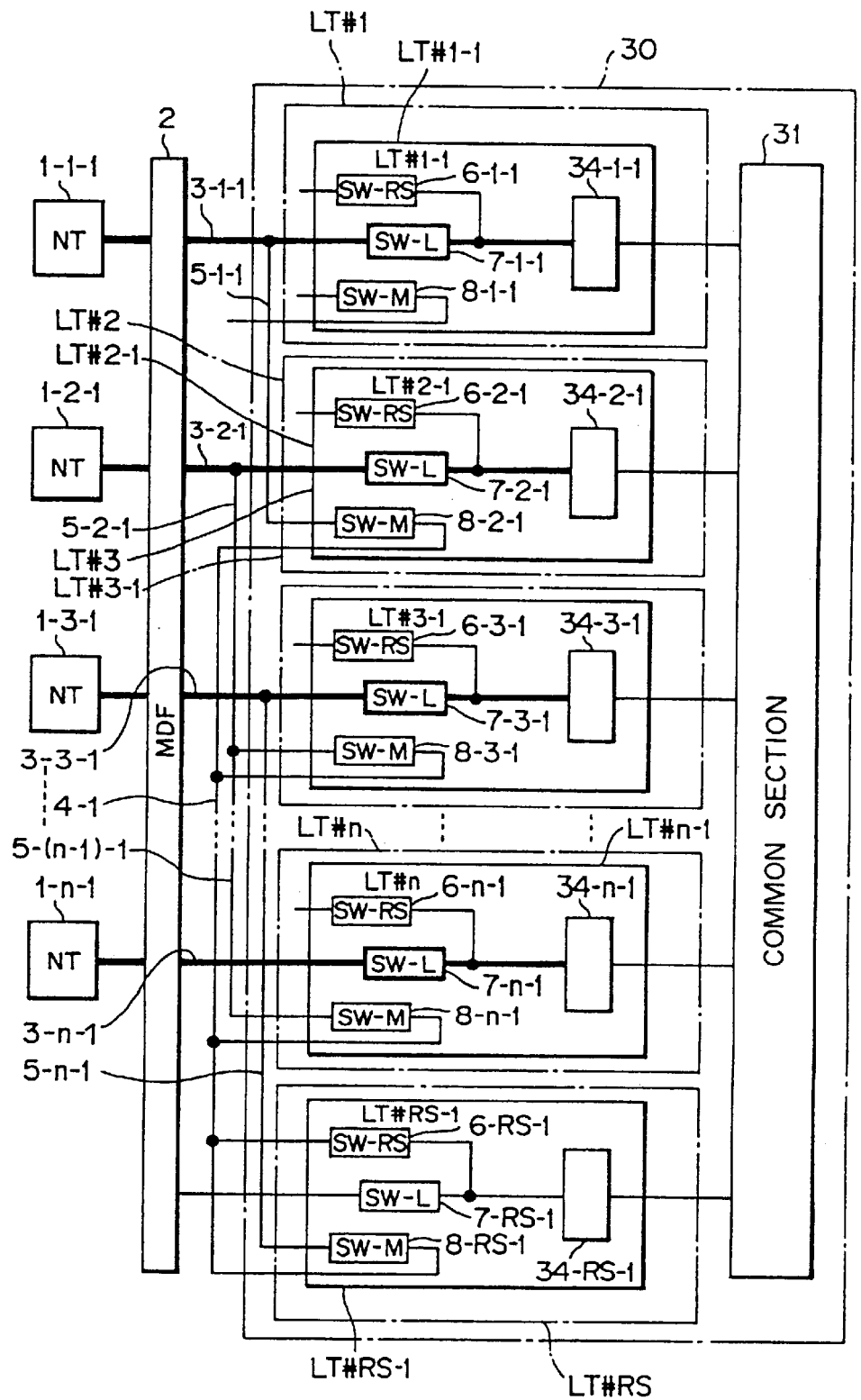
FIG. 9 is a block diagram illustrating operation of a subscriber terminating equipment according to a second modification to the first embodiment of the present invention in normal operation.
Figure 10:
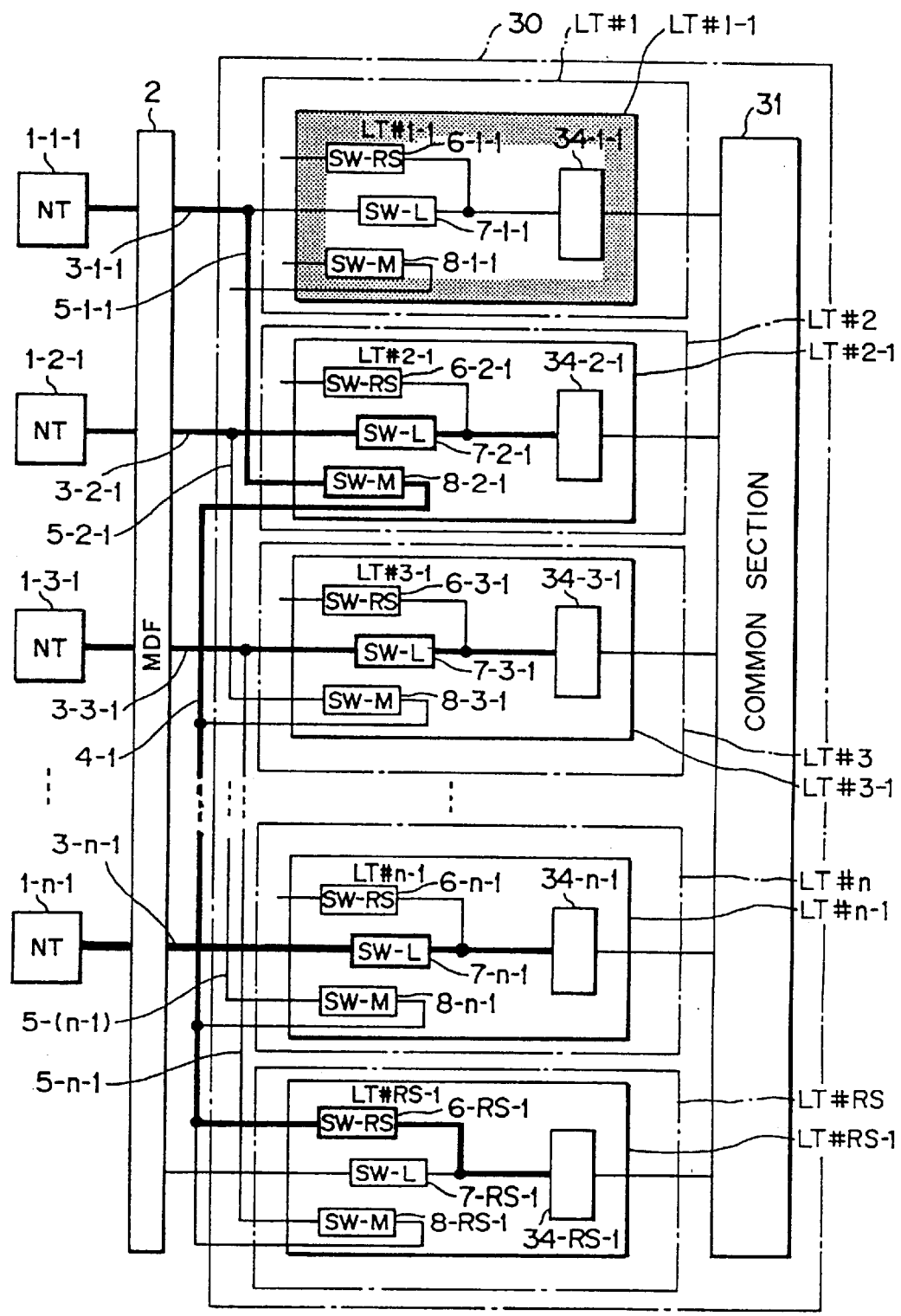
FIG. 10 is a block diagram illustrating operation of the modified subscriber terminating equipment according to the second modification to the first embodiment of the present invention when a fault occurs.
Figure 11:
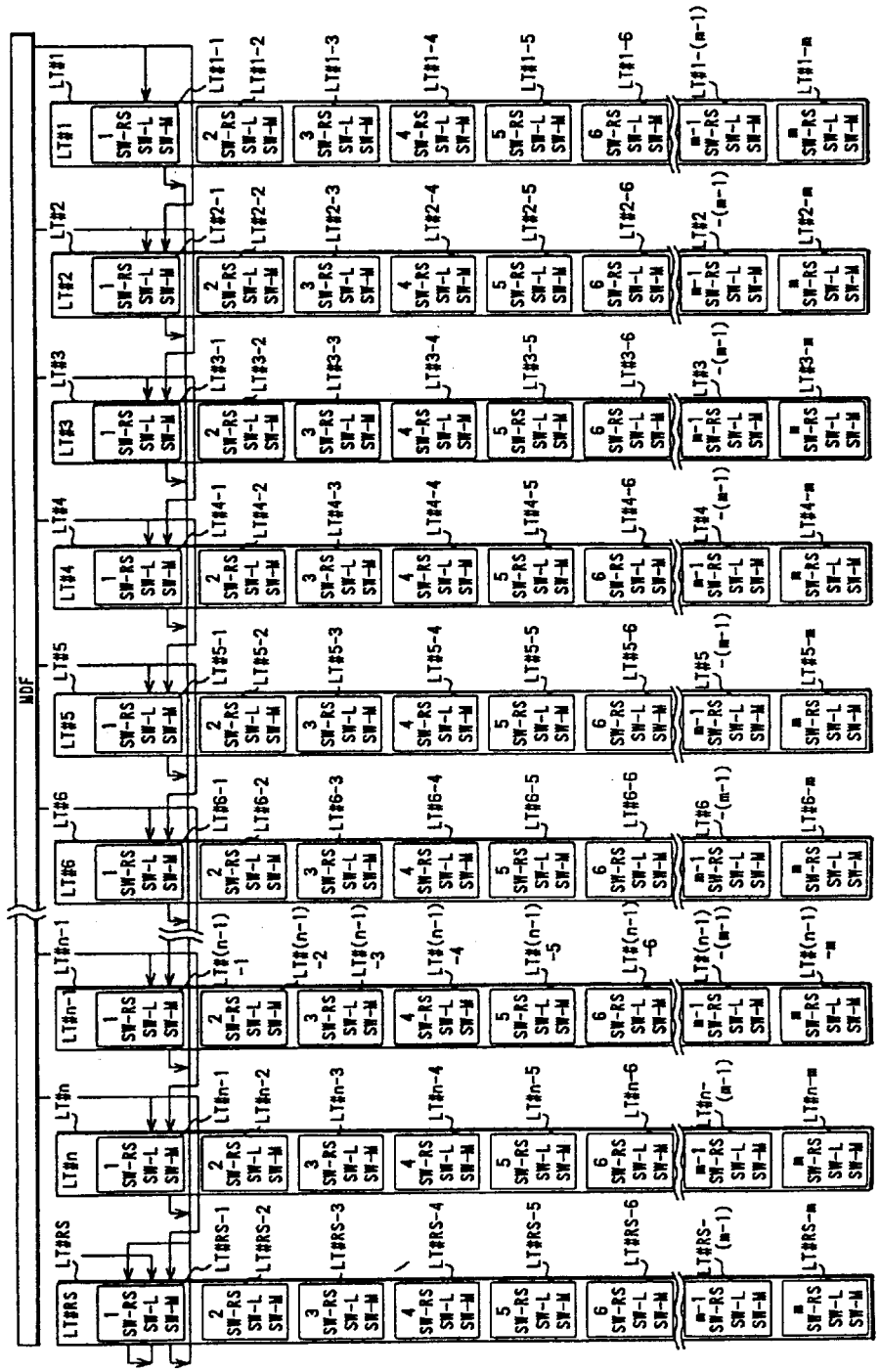
FIG. 11 is a block diagram showing flows of signals when a plurality of channels are used in the subscriber terminating equipment according to the second modification to the first embodiment of the present invention.

(a2) Description of the Second Modification to the First Embodiment of the Present Invention FIGS. 9 and 10 are block diagrams illustrating operation of a subscriber terminating equipment 30 according to a second modification to the first embodiment of the present invention when it operates normally and when a fault occurs, respectively, and FIG. 11 is a block diagram showing flows of signals where a plurality of channels are used in the subscriber terminating equipment 30. As seen from FIGS. 9 to 11, the subscriber terminating equipment 30 of the present modification is similar to but is different from the subscriber terminating equipment 30 of the first modification in that the common section 31 selects one of those subscriber terminating packages LT#i disposed on the right side of a fault package LT#i and allocates the selected subscriber terminating package LT#i as a bypass package for the fault package LT#i. Herein, the right (or left) side means the right (or left) from the view of the vertical backboard 301 (see FIG. 49)

In particular, the subscriber terminating package LT#2 is allocated as a bypass package for the subscriber terminating package LT#1, the subscriber terminating package LT#3 is allocated as a bypass package for the subscriber terminating package LT#2, and each of the other subscriber terminating packages LT#i is allocated successively in this manner until the relief package LT#RS is allocated as a bypass package for the subscriber terminating package LT#n. It is to be noted that the direction for such allocation may be any of the rightward direction and the leftward direction.

After such allocation of the bypass packages, the subscriber terminating equipment 30 of the present modification operates in such a manner as described hereinabove in connection with subscriber terminating equipment 30 of the first embodiment with reference to the flowchart of FIG. 5.

Thus, similar effects to those of the subscriber terminating equipment 30 of the first embodiment can be achieved with the subscriber terminating equipment 30 of the present modification.

Further, since a switch package for exclusive use for bypassing is unnecessary, production of packages of the same configuration is allowed, and the universal use of parts is augmented and contribution to reduction of the cost can be anticipated.

Furthermore, since the bypass distance is equal to the distance between adjacent packages, deterioration of a signal can be prevented.

Figure 12:
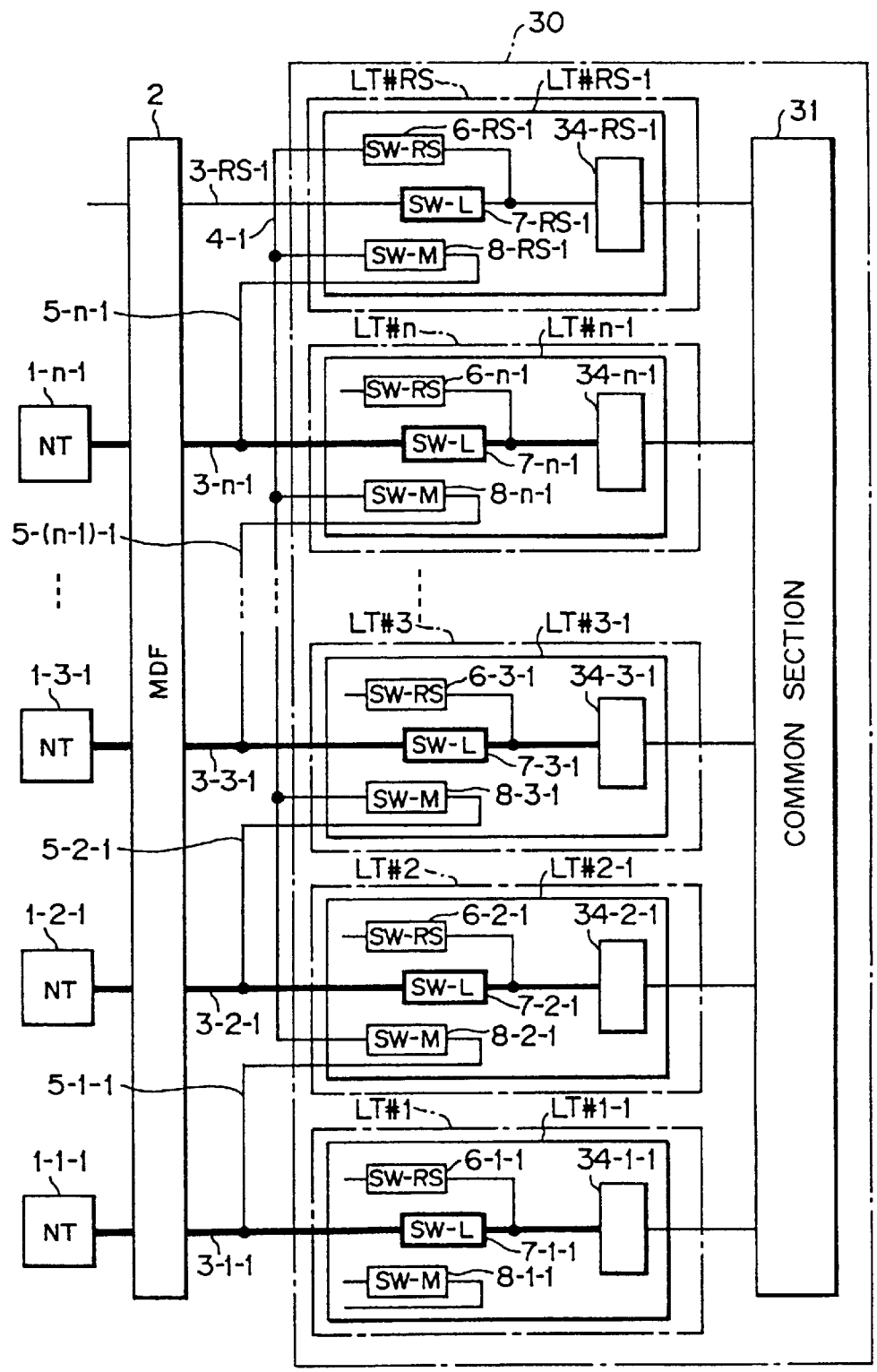
FIG. 12 is a block diagram illustrating operation of a subscriber terminating equipment according to a third modification to the first embodiment of the present invention in normal operation.
Figure 13:
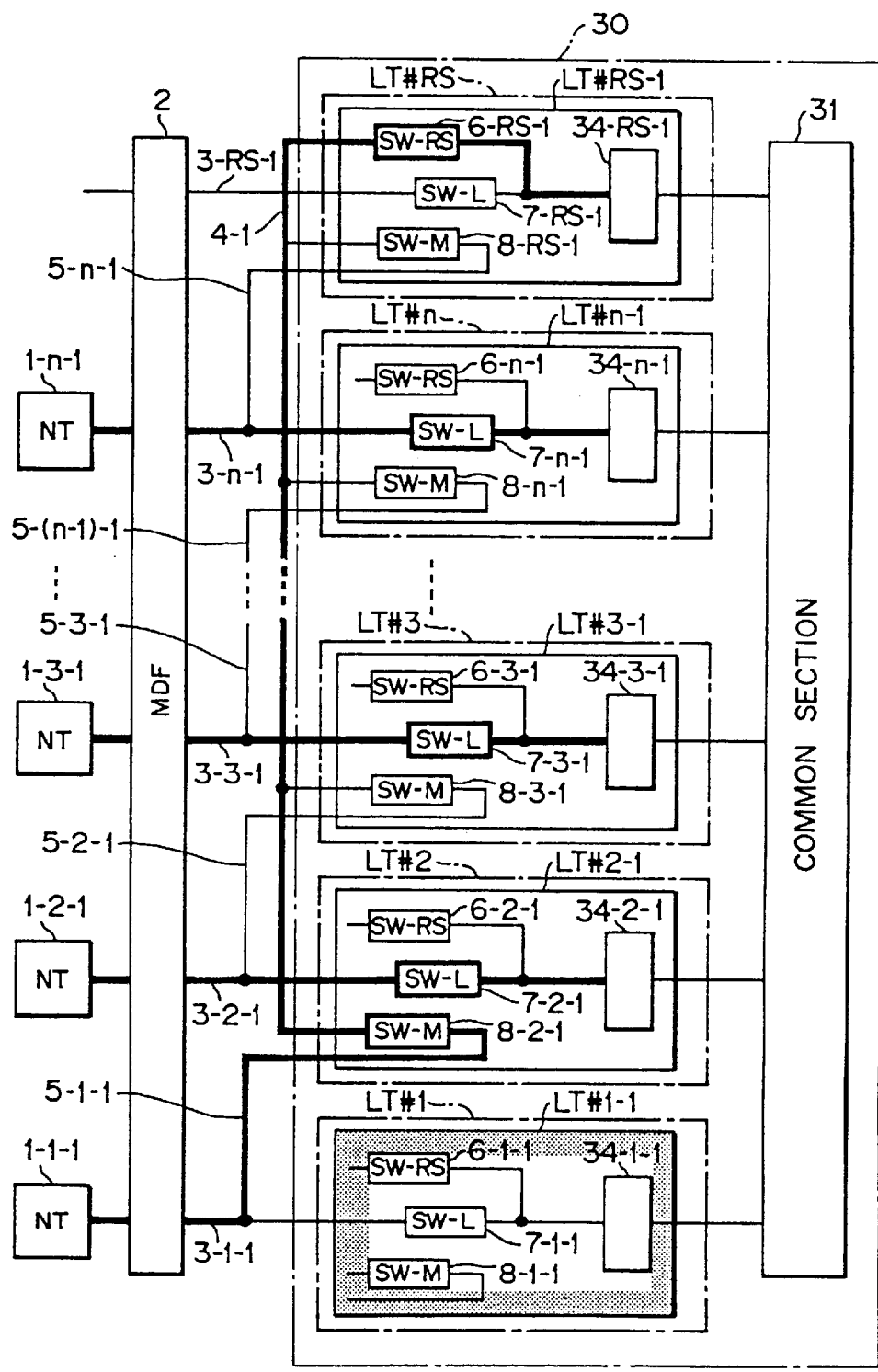
FIG. 13 is a block diagram illustrating operation of the subscriber terminating equipment according to the third modification to the first embodiment of the present invention when a fault occurs.
Figure 14:
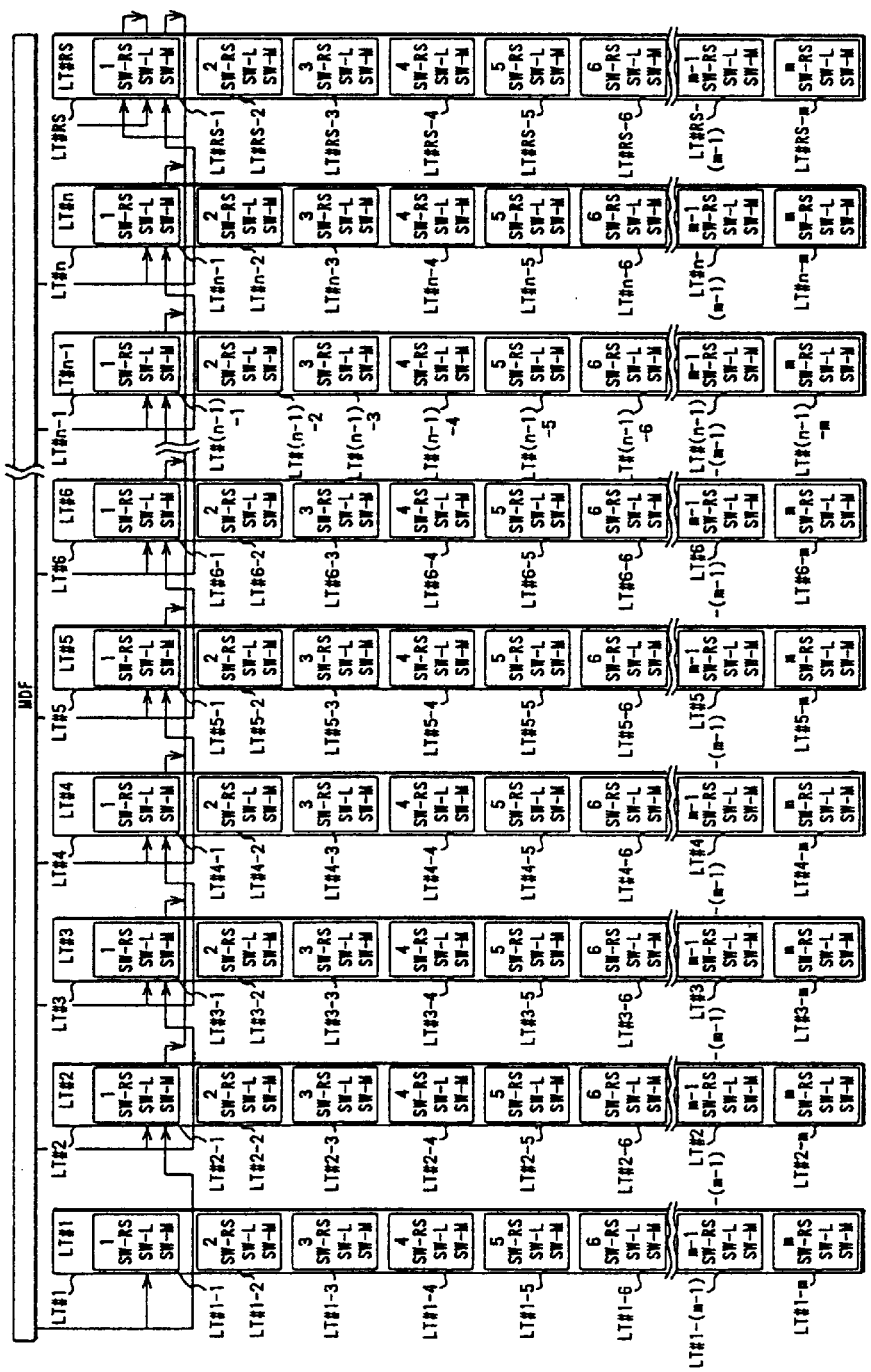
FIG. 14 is a block diagram showing flows of signals when a plurality of channels are used in the subscriber terminating equipment according to the third modification to the first embodiment of the present invention.

(a3) Description of the Third Modification to the First Embodiment of the Present Invention FIGS. 12 and 13 are block diagrams illustrating operation of a subscriber terminating equipment 30 according to a third modification to the first embodiment of the present invention when it operates normally and when a fault occurs, respectively, and FIG. 14 is a block diagram showing flows of signals where a plurality of channels are used in the subscriber terminating equipment 30. As seen from FIGS. 12 to 14, the subscriber terminating equipment 30 of the present modification is similar to but is different from the subscriber terminating equipment 30 of the second modification to the first embodiment in that the common section 31 selects one of those subscriber terminating packages LT#i disposed on the left side of a fault package LT#i and allocates the selected subscriber terminating package LT#i as a bypass package for the fault package LT#i.

In particular, the arrangement of the subscriber terminating packages LT#1 to LT#n and the relief package LT#RS in the vertical direction is reverse to that in the subscriber terminating equipment 30 of the second modification to the first embodiment described hereinabove (the arrangement in the leftward and rightward directions in FIG. 14 is opposite). In other words, the subscriber terminating packages LT#1 to LT#n and the relief package LT#RS are arranged in this order from below in FIGS. 12 and 13.

Accordingly, each of the subscriber terminating packages LT#i and the relief package LT#RS is allocated as a bypass passage for the subscriber terminating package LT#i positioned below in FIG. 12 the same (on the left side in FIG. 14) such that the relief package LT#RS operates as a bypass package for the subscriber terminating package LT#n, . . . , the subscriber terminating package LT#3 operates as a bypass package for the subscriber terminating package LT#2, and the subscriber terminating package LT#2 operates as a bypass package for the subscriber terminating package LT#1.

The subscriber terminating equipment 30 of the present modification operates similarly to the subscriber terminating equipment 30 of the first embodiment described hereinabove with reference to the flowchart of FIG. 5 except that, from the difference in manner of allocation of a bypass package, a different subscriber terminating package LT#i operates when a fault occurs.

Thus, similar effects to those of the subscriber terminating equipments 30 of the first embodiment and the first and second modifications to the first embodiment can be achieved with the subscriber terminating equipment 30 of the present modification.

Figure 15:
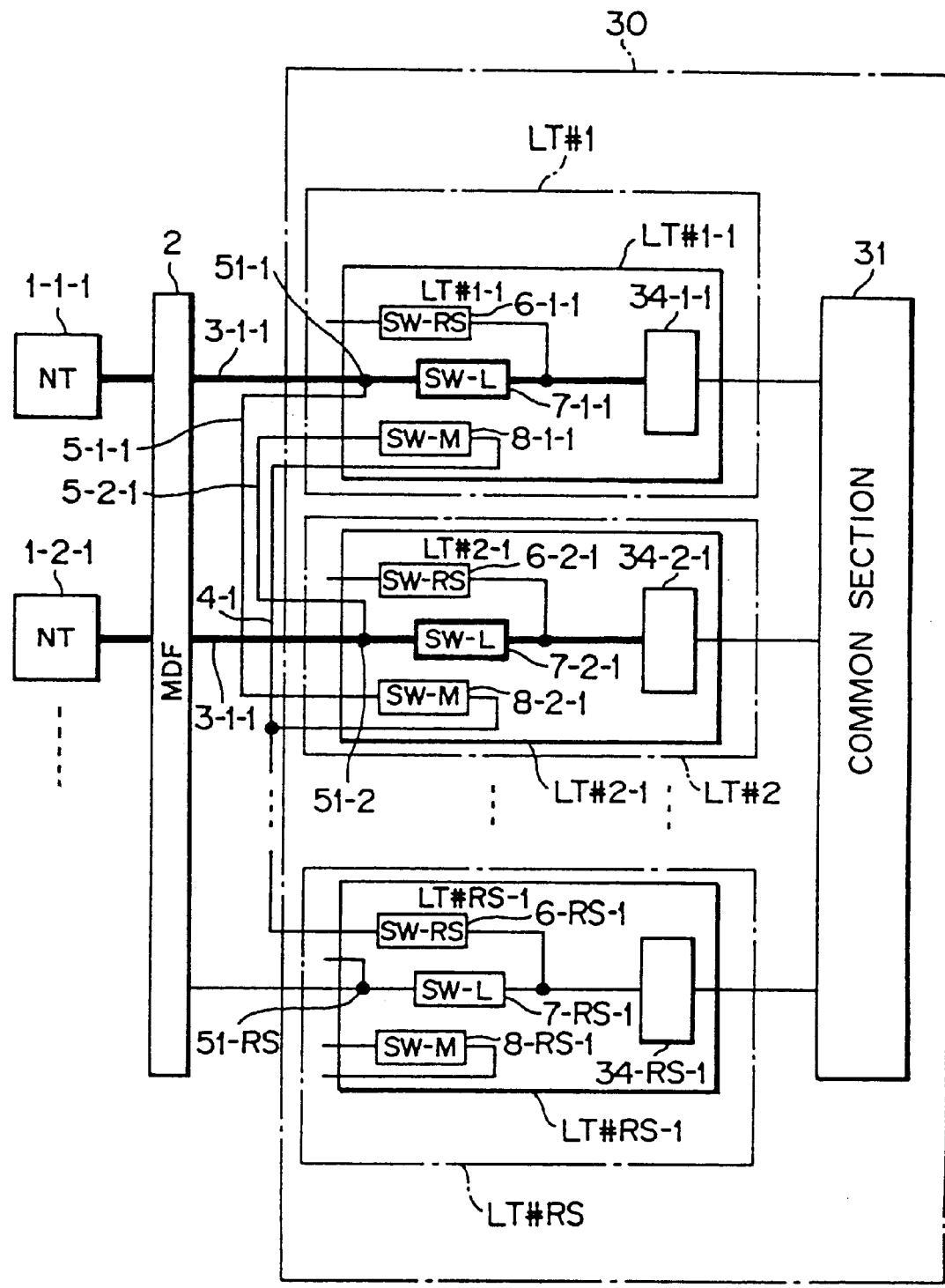
FIG. 15 is a block diagram illustrating operation of a subscriber terminating equipment according to a fourth modification to the first embodiment of the present invention.

(a4) Description of the Fourth Modification to the First Embodiment of the Present Invention FIG. 15 is a block diagram illustrating operation of a subscriber terminating equipment 30 according to a fourth modification to the first embodiment of the present invention when it operates normally and when a fault occurs. As seen from FIG. 15, the subscriber terminating equipment 30 of the present modification is similar to but is different from the subscriber terminating equipment 30 of the second modification to the first embodiment shown in FIG. 9 in that an L/M point 51-1 indicative of a connection point between the SW-L switch 7-1-1 of the subscriber terminating circuit LT#1-1 of the subscriber terminating package LT#1 and the SW-M switch 8-2-1 of the subscriber terminating circuit LT#2-1 of the subscriber terminating package LT#2 is provided within the subscriber terminating package LT#1.

Also connection points for the other channels 2 to m of the subscriber terminating packages LT#1 and LT#2 are provided within the subscriber terminating packages LT#1 and LT#2, respectively.

Furthermore, also with regard to the other subscriber terminating packages LT#2 to LT#n and the relief package LT#RS, L/M points 51-2 to 51-m are provided within the subscriber terminating packages LT#2 to LT#n and the relief package LT#RS similarly as in the subscriber terminating packages LT#1 and LT#2. The subscriber terminating equipment 30 of the present modification thus operates similarly to the subscriber terminating equipment 30 of the first modification to the first embodiment when it is in a normal state and when a fault occurs therewith.

Thus, similar effects to those of the subscriber terminating equipments 30 of the first embodiment and the first and second modifications to the first embodiment can be achieved with the subscriber terminating equipment 30 of the present modification.

Figure 16:
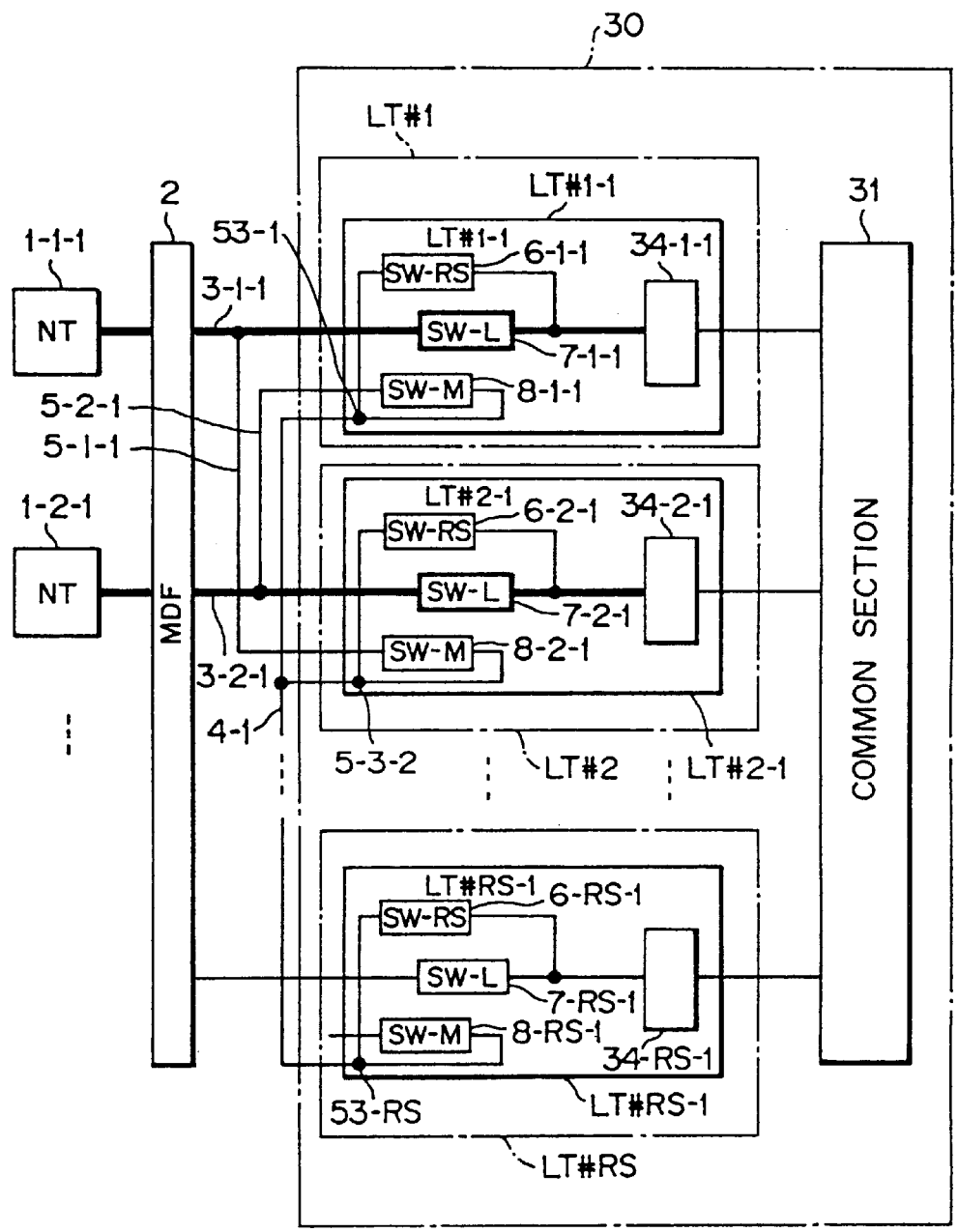
FIG. 16 is a block diagram illustrating operation of a subscriber terminating equipment according to a fifth modification to the first embodiment of the present invention.

(a5) Description of the Fifth Modification to the First Embodiment of the Present Invention FIG. 16 is a block diagram illustrating operation of a subscriber terminating equipment 30 according to a fifth modification to the first embodiment of the present invention when it operates normally and when a fault occurs. As seen from FIG. 16, the subscriber terminating equipment 30 of the present modification is similar to but is different from the subscriber terminating equipment 30 of the second modification to the first embodiment shown in FIG. 9 in that the SW-RS switch 6-1-1 and the SW-M switch 8-1-1 of the subscriber terminating circuit LT#1-1 of the subscriber terminating package LT#1 are connected to each other at an M/RS point 53-1 indicative of a connection point of the subscriber terminating package LT#1.

Also the subscriber terminating packages LT#2 to LT#n have M/RS points 53-2 to 53-n similarly, and except this, the subscriber terminating equipment 30 of the present modification operates similarly to the subscriber terminating equipment 30 of the first modification to the first embodiment.

Thus, similar effects to those of the subscriber terminating equipments 30 of the first embodiment and the first and second modifications to the first embodiment can be achieved with the subscriber terminating equipment 30 of the present modification.

(b) Description of the Second Embodiment of the Present Invention

Figure 17:
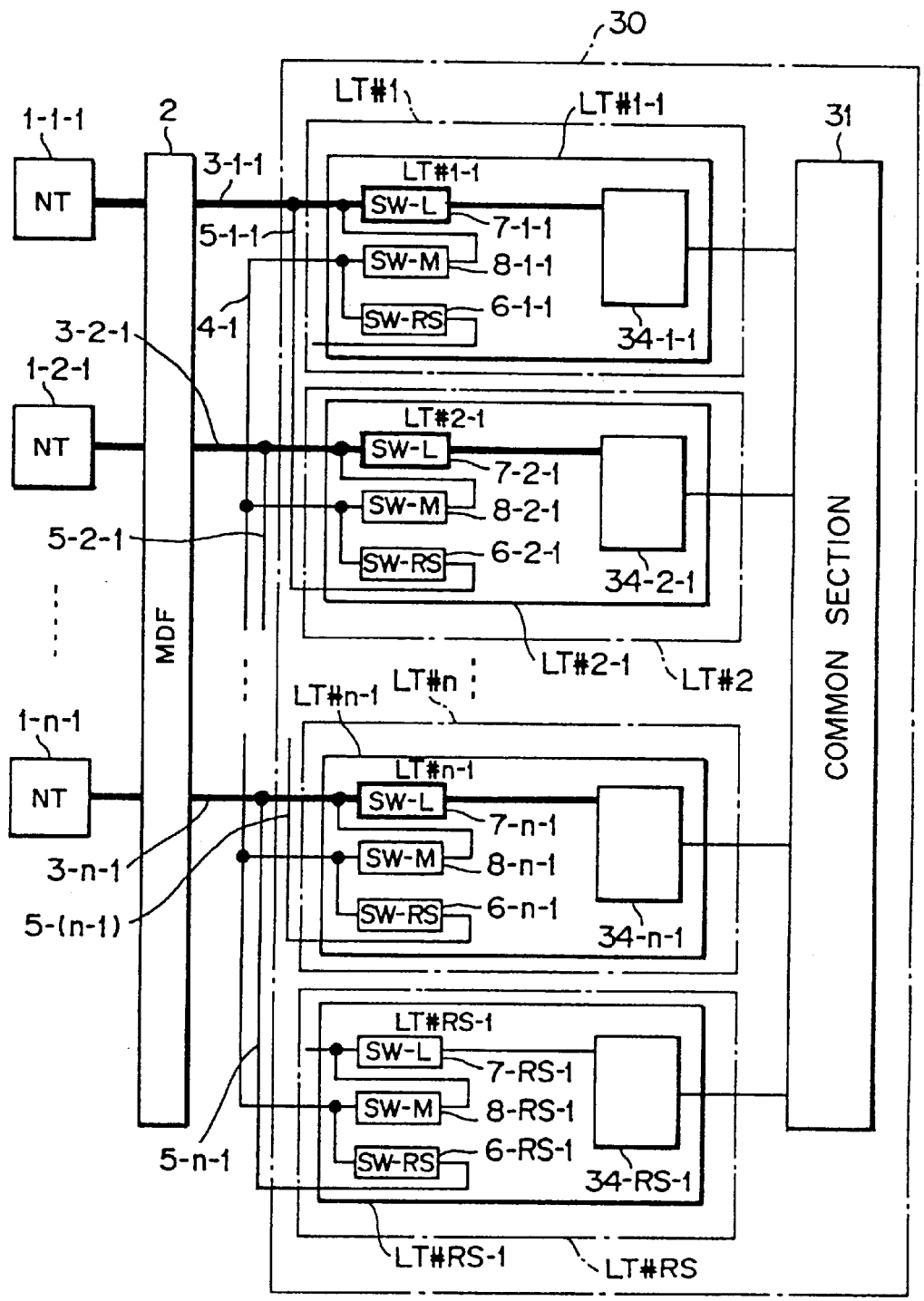
FIG. 17 is a block diagram illustrating operation of a subscriber terminating equipment according to a second embodiment of the present invention in normal operation.

FIG. 17 is a block diagram illustrating operation of a subscriber terminating equipment 30 according to a second embodiment of the present invention when it operates normally. Referring to FIG. 17, the subscriber terminating equipment 30 shown includes, similarly to the subscriber terminating equipment 30 of the first embodiment, an MDF 2, a plurality of subscriber terminating packages LT#1 to LT#n and a relief package LT#RS, a multi-connection line 4-1, and a plurality of bypass lines 5-1-1 to 5-n-1.

Figure 18:
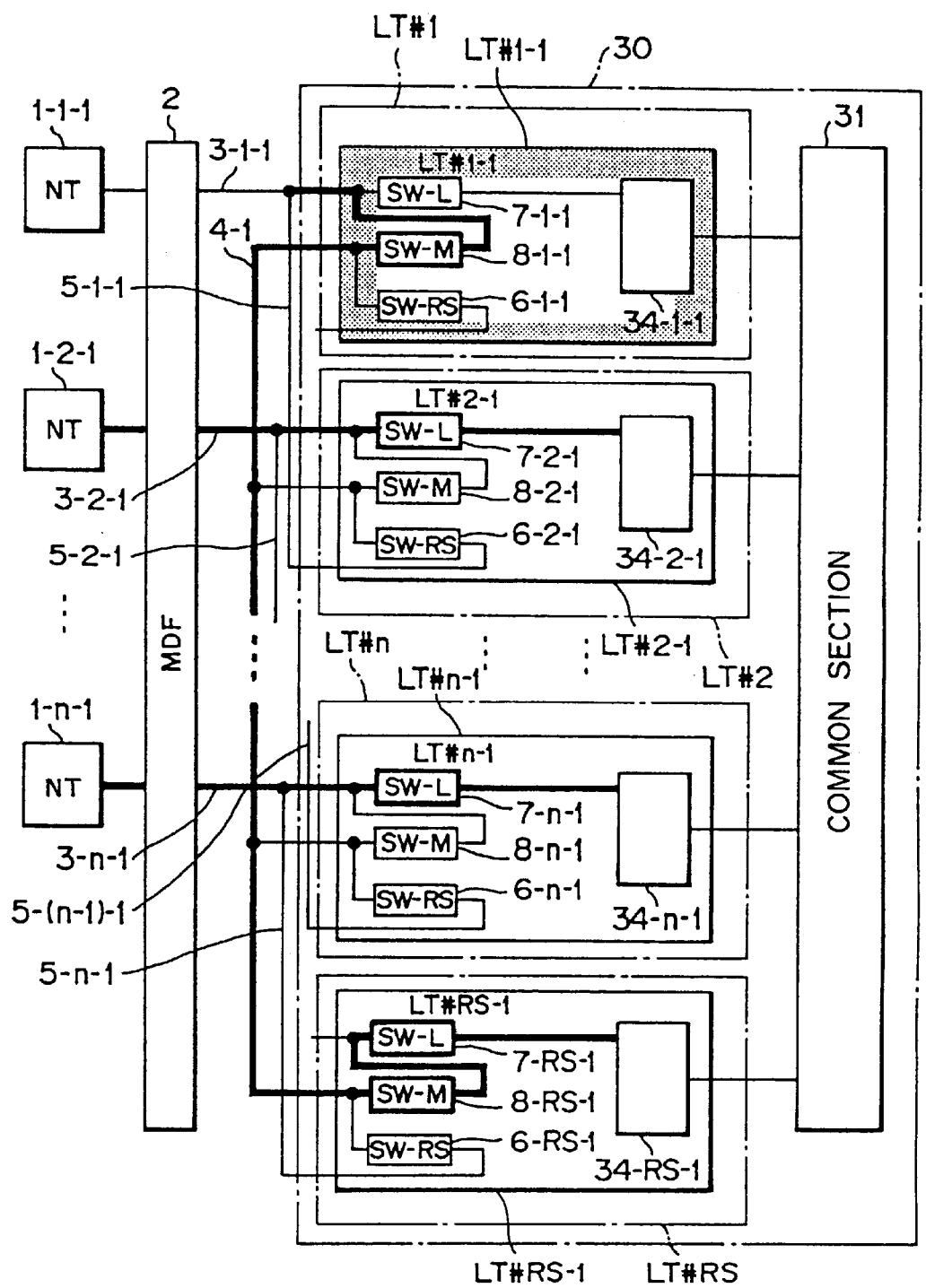
FIG. 18 is a block diagram illustrating operation of the subscriber terminating equipment according to the second embodiment of the present invention upon self relief.
Figure 19:
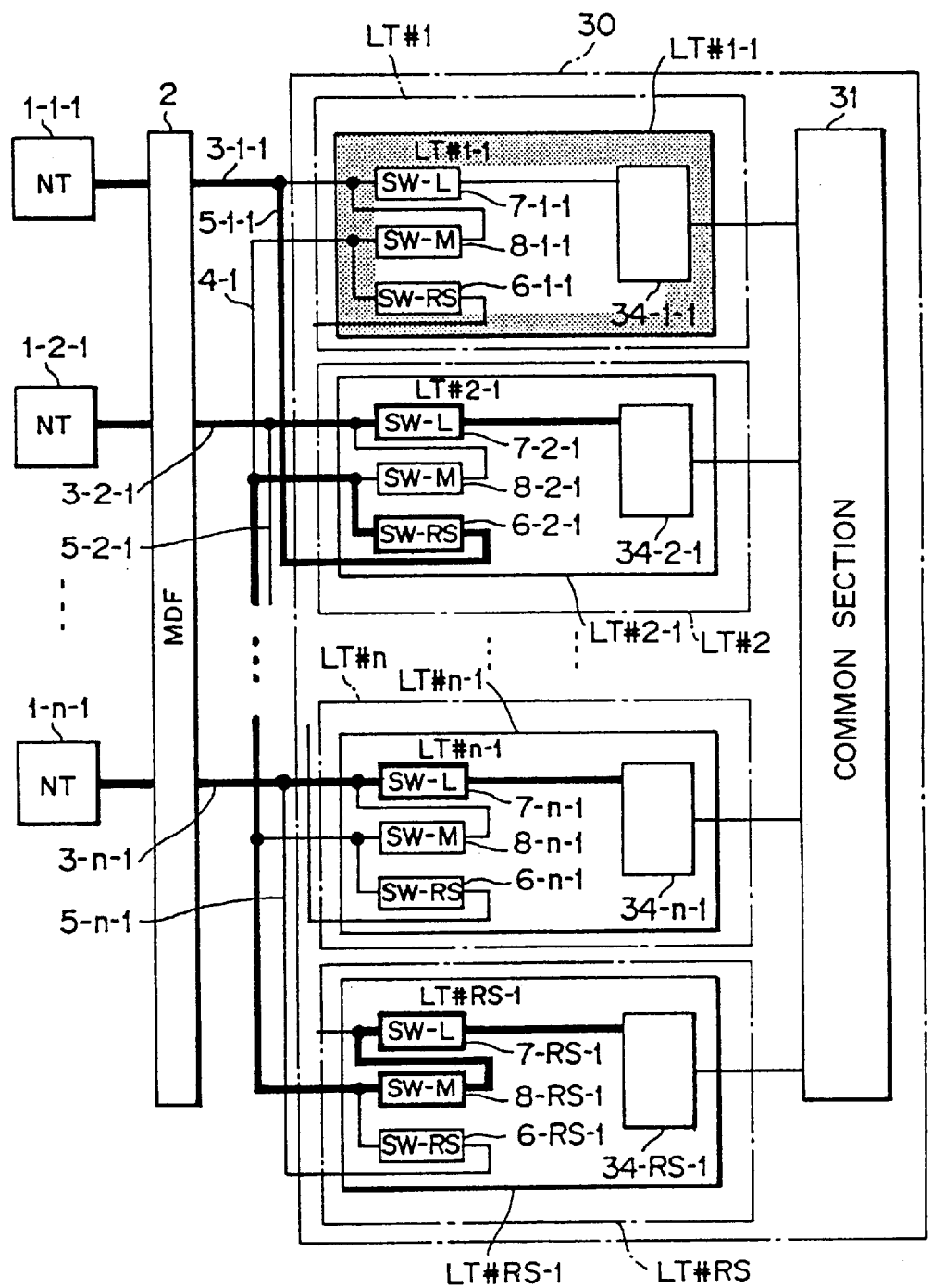
FIG. 19 is a block diagram illustrating operation of the subscriber terminating equipment according to the second embodiment of the present invention upon circuit switching.

Also in the subscriber terminating equipment 30 of the present embodiment, each of the subscriber terminating packages LT#i and the relief package LT#RS shown in FIG. 20 (as described later) has a plurality of channels and includes subscriber terminating circuits LT#i-j or LT#RS-j for each channel. Here, however, description is given of the channel 1, and the subscriber terminating circuit LT#i-1 is shown in FIGS. 17 to 19.

Further, similarly as in the subscriber terminating equipment 30 of the first embodiment, the subscriber terminating packages LT#1 to LT#n include SW-L switches 7-1-1 to 7-n-1, SW-M switches 8-1-1 to 8-n-1, and SW-RS switches 6-1-1 to 6-n-1, respectively. Meanwhile, the relief package LT#RS has the same construction as that of the subscriber terminating packages LT#1 to LT#n and includes an SW-L switch 7-RS-1, an SW-M switch 8-RS-1 and an SW-RS switch 6-RS-1. However, the subscriber terminating packages LT#1 to LT#n and the relief package LT#RS are different in locations of switches from those in the subscriber terminating equipment 30 of the first embodiment.

In particular, the SW-M switches 8-1-1 to 8-n-1 of the subscriber terminating circuits LT#1-1 to LT#n-1 of the subscriber terminating packages LT#1 to LT#n and the subscriber terminating circuit LT#RS-1 of the relief package LT#RS are connected to each other outside the subscriber terminating packages LT#i by the multi-connection line 4-1.

Further, to each of the subscriber terminating packages LT#1 to LT#n, a subscriber terminating package which operates as a bypass package when a fault occurs with the subscriber terminating package is allocated. In particular, bypass packages are allocated in the rightward direction (upward direction in FIGS. 17 to 19) such that the subscriber terminating package LT#n is allocated as a bypass package for the subscriber terminating package LT# (n-1) , . . . , and the subscriber terminating package LT#2 is allocated as a bypass package for the subscriber terminating package LT#1.

For example, the subscriber line 3-1-1 connected to the subscriber terminating circuit LT#1-1 of the subscriber terminating package LT#1 and the SW-RS switch 6-2-1 of the subscriber terminating circuit LT#2-1 of the subscriber terminating package LT#2 are connected to each other by the bypass line 5-1-1.

In FIG. 17, like reference characters to those described above denote like elements or elements having like functions, and overlapping description of them is omitted herein to avoid redundancy.

In the subscriber terminating equipment 30 having such a construction as described above, the SW-L switch 7-1-1 in the subscriber terminating circuit LT#1-1 of the subscriber terminating package LT#1 shown in FIG. 17 is set to an on-state while the SW-M switch 8-2-1 and the SW-RS switch 6-1-1 are set to an off-state, and the subscriber terminal 1-1-1 is connected to the network interface apparatus 32 through the subscriber circuit 34-1-1 and the common section 31.

FIG. 18 is a block diagram illustrating operation of the subscriber terminating equipment 30 according to the second embodiment of the present invention when a fault occurs (upon self relief). If a fault occurs, then the common section 31 establishes a self relief mode wherein the SW-M switch 8-i-j in the fault package LT#i is set to a connection state and the SW-L switch 7-RS-j and the SW-M switch 8-RS-j in the relief package LT#RS are set to a connection state.

Further, when a fault occurs, the self relief mode is established wherein the SW-M switch 8-i-j in the fault packages LT#i is set to a connection state and the SW-L switch 7-i-j in the fault packages LT#i is set to a disconnection state while the SW-L switch 7-i-j in the adjacent subscriber terminating packages LT#i is set to a connection state and the SW-M switch 8-RS-j and the SW-L switch 7-RS-j in the relief package LT#RS are set to a connection state.

Further, when a fault occurs, the common section 31 establishes a circuit switching mode wherein the three kinds of switches in the fault package are set to a connection state and the SW-L switch 7-i-j and the SW-RS switch 6-i-j in the adjacent subscriber terminating packages LT#i are set to a connection state while the SW-M switch 8-RS-j in the relief package LT#RS is set to a connection state.

More particularly, if a fault occurs with the subscriber terminating circuit LT#1-1 of the subscriber terminating package LT#1, then the SW-L switch 7-1-1 of the subscriber terminating circuit LT#1-1 of the fault package LT#1 is switched off and the SW-M switch 8-1-1 is switched on, and the SW-RS switch 6-RS-1 of the subscriber terminating circuit LT#RS-1 of the relief package LT#RS is switched off and the SW-L switch 7-RS-1 and the SW-M switch 8-RS-1 are switched on.

FIG. 19 is a block diagram illustrating operation of the subscriber terminating equipment 30 according to the second embodiment of the present invention when a fault occurs (upon circuit switching). If a fault occurs, then in order to replace the fault package LT#1, the common section 31 establishes a circuit switching mode wherein the three kinds of switches in the fault package LT#i are set to a disconnection state and the SW-L switch 7-i-j and the SW-RS switch 6-i-j in the adjacent subscriber terminating packages LT#i are set to a disconnection state while the SW-M switch 8-RS-j in the relief package LT#RS is set to a connection state.

More particularly, the SW-L switch 7-1-1 of the subscriber terminating circuit LT#1-1 of the fault package LT#1 shown in FIG. 19 is switched on and the SW-M switch 8-2-1 of the subscriber terminating package LT#2 which functions as a bypass package for the fault package LT#i is switched on, and further, the SW-RS switch 6-RS-1 in the relief package LT#RS is switched off.

Since, when the fault package LT#1 is to be replaced, relief is performed by means of the SW-RS switch 6-i-1 of the subscriber terminating circuit LT#i-1 of the bypass packages LT#i, the mode described is called circuit switching mode.

It is to be noted that, in this instance, the SW-L switch 7-2-1 of the subscriber terminating package LT#2 which functions as a bypass package is in a connection state and has a function also as the subscriber terminating package LT#2 which accommodates the subscriber terminal 1-2-1 in the network interface apparatus 32.

Similarly, a bypass package is allocated also to each of the other subscriber terminating packages LT#3 to LT#n such that the subscriber terminating package LT#4 is allocated as a bypass package for the subscriber terminating package LT#3, . . . , and the subscriber terminating package LT#n is allocated as a bypass package for the subscriber terminating package LT#(n-1). Also the subscriber terminating packages LT#3 to LT#n are connected similarly to the subscriber terminating packages LT#1 and LT#2.

Figure 20:
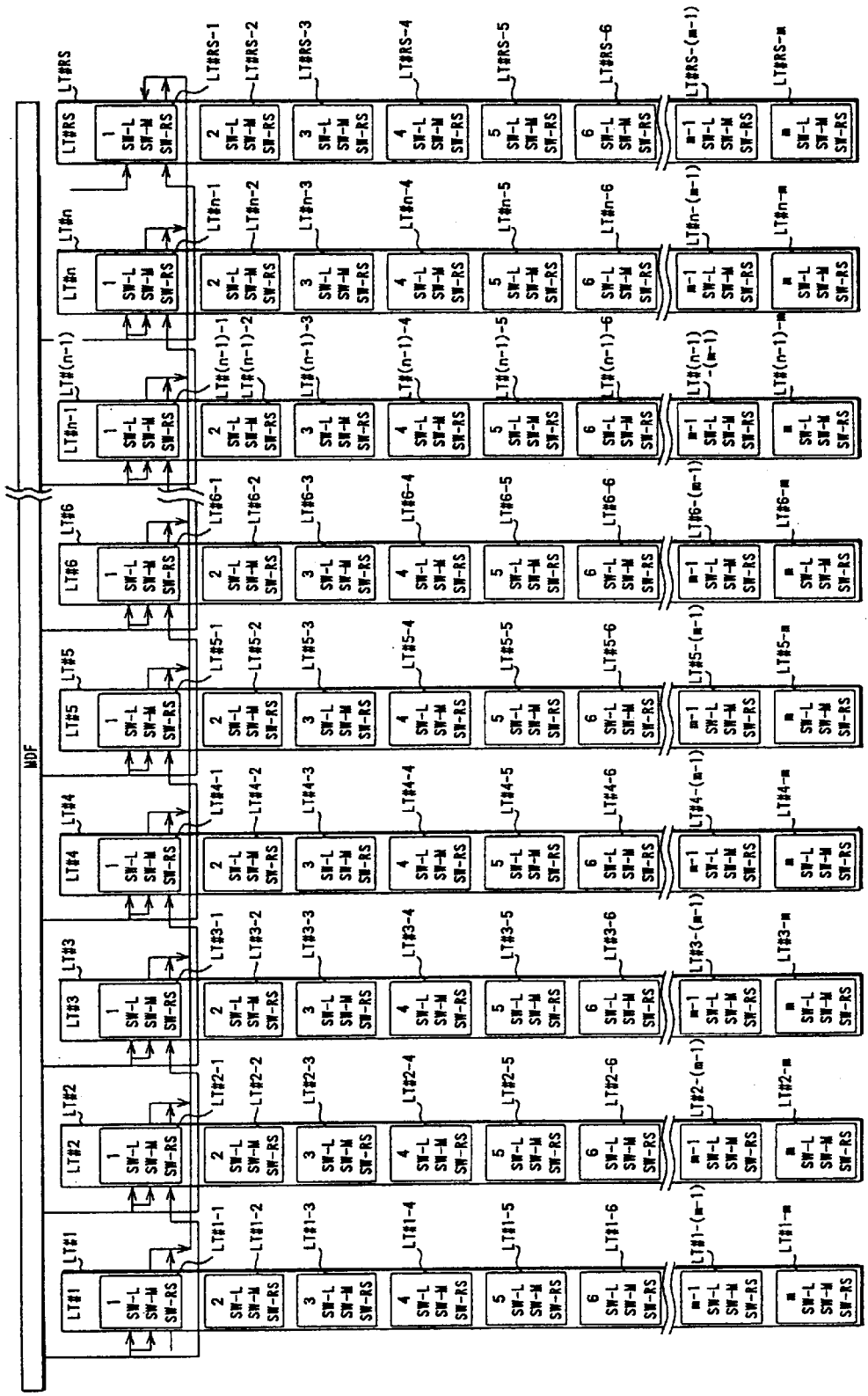
FIG. 20 is a block diagram showing flows of signals when a plurality of channels are used in the subscriber terminating equipment according to the second embodiment of the present invention.

FIG. 20 is a block diagram showing flows of signals when a plurality of channels are used in the subscriber terminating equipment 30, and also a connection scheme similar to that of the subscriber terminating circuit LT#1-1 is applied to the channels 2 to m of the subscriber terminating packages LT#1 to LT#n.

In the following, operation of the subscriber terminating equipment 30 of the second embodiment of the present invention having the construction described above is described with reference to a flowchart of FIG. 21.

(i) Normal Operation

When the subscriber terminating equipment 30 operates normally, in step B1, the SW-L switches 7-1-1 to 7-n-1 of the subscriber terminating circuits LT#1-1 to LT#n-1 of the subscriber terminating packages LT#1 to LT#n shown in FIG. 17 are switched on and the SW-RS switches 6-1-1 to 6-n-1 and the SW-M switches 8-1-1 to 8-n-1 are switched off while the SW-L switch 7-RS-1 of the relief package LT#RS is switched on and the SW-RS switch 6-RS-1 and the SW-M switch 8-RS-1 are switched off.

An electric signal from the subscriber terminal 1-1-1 follows a path indicated by a thick line in FIG. 17. In particular, the electric signal passes through the MDF 2 and the SW-L switch 7-1-1 of the subscriber terminating circuit LT#1-1 and is outputted to the subscriber circuit 34-1-1.

This also applies to the subscriber terminating circuits LT#1-2 to LT#1-m of the other channels 2 to m of the subscriber terminating package LT#1.

Also the other subscriber terminating packages LT#2 to LT#n operate similarly to the subscriber terminating package LT#1.

(ii) When a fault occurs (self relief mode)

Then in step B2, if a fault occurs with the subscriber terminating circuit LT#1-1 of the subscriber terminating package LT#1 shown in FIG. 18, then the control section 33 detects that a fault has occurred with the subscriber terminating circuit LT#1-1.

In this instance, communication is proceeding with the subscriber terminals 1-1-2 to 1-1-m accommodated in the subscriber terminating circuits LT#1-2 to LT#1-m of the subscriber terminating package LT#1.

Then, the control section 33 discriminates whether or not the relief package LT#RS is used by any of the other subscriber terminating packages LT#2 to LT#n (step B3). If the relief package LT#RS is used, then the processing follows the YES route of step B3 and repeats the processing in step B3. In other words, the control section 33 supervises the state of use of the relief package LT#RS.

If the relief package LT#RS is not used in step B3, then the processing follows the NO route and advances to step B4. In step B4, the common section 31 outputs, based on the result of the fault detection by the control section 33, switching signals for switching off the SW-L switch 7-1-1 of the subscriber terminating circuit LT#1-1 of the subscriber terminating package LT#1 and switching on the SW-RS switch 6-RS-1 of the subscriber terminating circuit LT#RS-1 of the relief package LT#RS.

In accordance with the switching signals, the subscriber terminating packages LT#1 to LT#n switch the pertaining switches. Consequently, an electric signal from the subscriber terminal 1-1-1 passes the path indicated by a thick line in FIG. 18. In particular, the electric signal passes through the SW-M switch 8-2-1 of the bypass package LT#2 and the multi-connection line 4-1 and further through the SW-RS switch 6-RS-1 of the subscriber terminating circuit LT#RS-1 of the relief package LT#RS and is outputted to the subscriber circuit 34-RS-1.

Meanwhile, in the other subscriber terminating packages LT#2 to LT#n which do not suffer from a fault, the SW-L switches 7-2-1 to 7-n-1 are on, and normal operation proceeds.

(iii) When a fault occurs (circuit switching mode)

Then in step B5, the SW-L switch 7-1-1 is switched off and the SW-RS switch 6-2-1 of the subscriber terminating circuit LT#2-1 of the subscriber terminating package LT#2, which is allocated as a bypass package for the fault package LT#i, is switched on in accordance with switching signals from the common section 31 shown in FIG. 19.

Then, as seen from a path indicated by thick lines in FIG. 19, the signal from the subscriber terminal 1-1-1 successively passes through the subscriber line 3-1-1, the bypass line 5-1-1, the SW-RS switch 6-2-1 of the subscriber terminating circuit LT#2-1 of the subscriber terminating package LT#2, the multi-connection line 4-1 and the SW-M switch 8-RS-1 and the SW-L switch 7-RS-1 of the subscriber terminating circuit LT#RS-1 of the relief package LT#RS and is outputted to the network interface apparatus 32 through the subscriber circuit 34-RS-1.

Then in step B6, it is discriminated whether or not at least one of the subscriber terminating circuits LT#1-2 to LT#1-m of the subscriber terminating packages LT#i is communicating so that data being communicated may not be instantaneously disconnected at any of the subscriber terminating circuits LT#1-2 to LT#1-m upon switching of the switches.

If no communication is proceeding in step B6, then the processing follows the NO route of step B6 and advances to step B7. In step B7, also the subscriber terminating circuits LT#1-2 to LT#1-m of the subscriber terminating package LT#1 which do not suffer from a fault perform switching to a state similar to that of the subscriber terminating circuit LT#1-1 in step B5 in accordance with switching signals from the common section 31.

In particular, the SW-L switches 7-1-2 to 7-1-m of the subscriber terminating circuits LT#1-2 to LT#1-m of the subscriber terminating package LT#1 are switched off and the SW-RS switches 6-2-2 to 6-2-m of the subscriber terminating circuits LT#2-2 to LT#2-m of the subscriber terminating package LT#2 are switched on while the SW-M switches 8-RS-2 to 8-RS-m and the SW-L switches 7-RS-2 to 7-RS-m of the subscriber terminating circuits LT#RS-2 to LT#RS-m of the relief package LT#RS are switched on. Consequently, the signal from the subscriber terminal 1-1-1 is accommodated into the network interface apparatus 32 from the relief package LT#RS through the subscriber terminating package LT#2.

Then in step B8, it is discriminated whether or not the switching from the fault package LT#1 to the relief package LT#RS is completed. If the switching is not completed, then the processing follows the NO route of step B8 so that the processing beginning with step B6 is repeated thereafter.

On the other hand, if it is discriminated in step B8 that the switching is completed, then the processing follows the YES route of step B8 and advances to step B9, in which replacement of the fault package LT#1 is performed. Then, when the replacement is completed, the subscribers accommodated in the relief package LT#RS-j are switched to the subscriber terminating package LT#1.

In particular, in accordance with switching signals from the common section 31, the SW-M switches 8-1-1 to 8-n-1 of the subscriber terminating circuits LT#1-1 to LT#1-m of the subscriber terminating package LT#1 are switched off and the SW-L switches 7-1-1 to 7-n-1 are switched off, and the SW-M switches 8-2-1 to 8-2-m of the subscriber terminating circuits LT#2-1 to LT#2-m of the subscriber terminating package LT#2 are switched off and the relief switches of the subscriber terminating circuits LT#RS-1 to LT#RS-m of the relief package LT#RS are switched off, thereby restoring such normal operation as illustrated in FIG. 17.

Consequently, with the subscriber terminating equipment 30 of the present embodiment, similar effects to those of the subscriber terminating equipment 30 of the first embodiment are achieved.

It is to be noted that, in this instance, operation of the self relief mode need not necessarily be performed, and operation corresponding to that of the circuit switching mode may be performed when a fault occurs.

Figure 22:
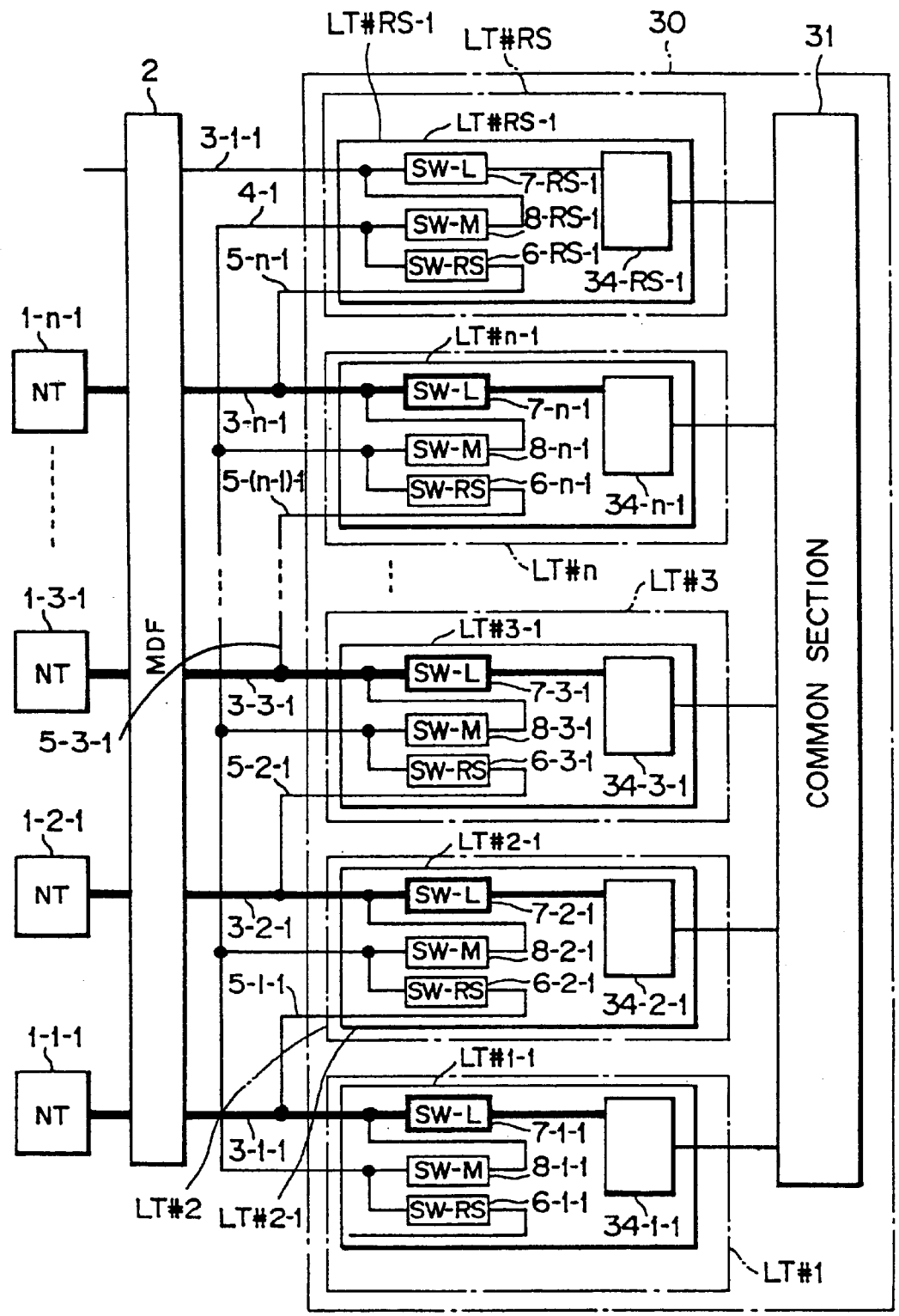
FIG. 22 is a block diagram illustrating operation of a subscriber terminating equipment according to a first modification to the second embodiment of the present invention in normal operation.
Figure 23:
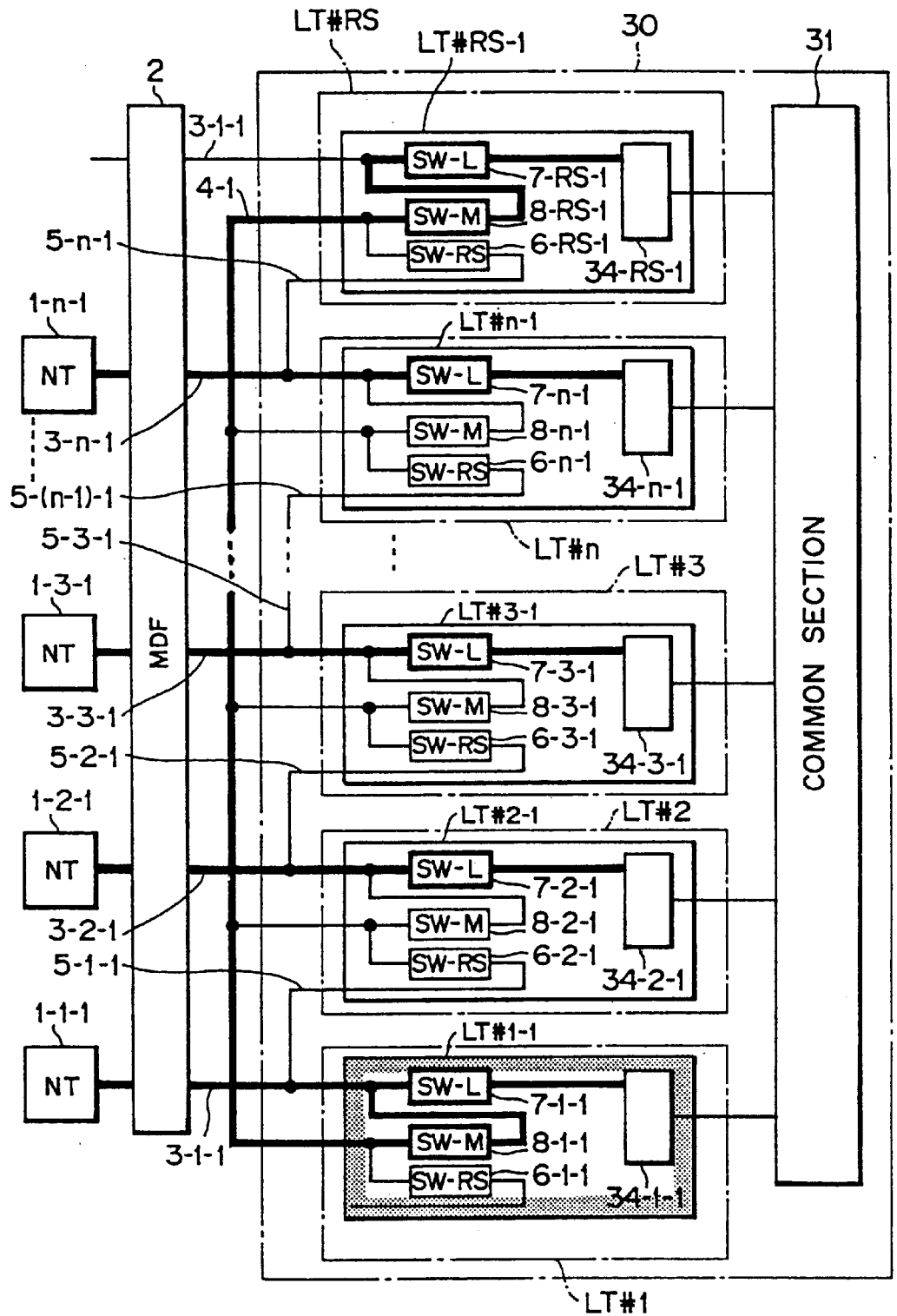
FIG. 23 is a block diagram illustrating operation of the subscriber terminating equipment according to the first modification to the second embodiment of the present invention upon self relief.
Figure 24:
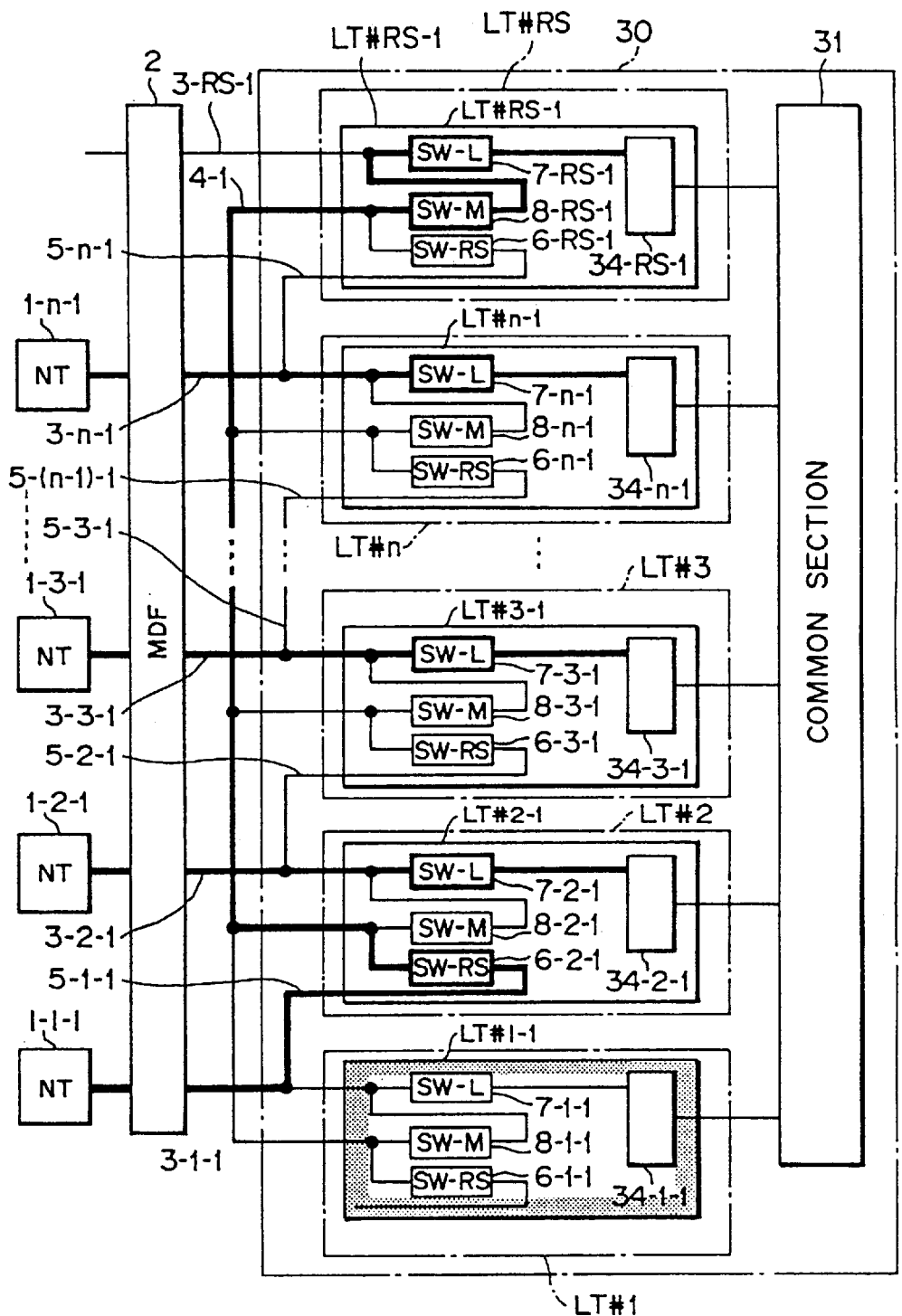
FIG. 24 is a block diagram illustrating operation of the subscriber terminating equipment according to the first modification to the second embodiment of the present invention upon circuit switching.
Figure 25:
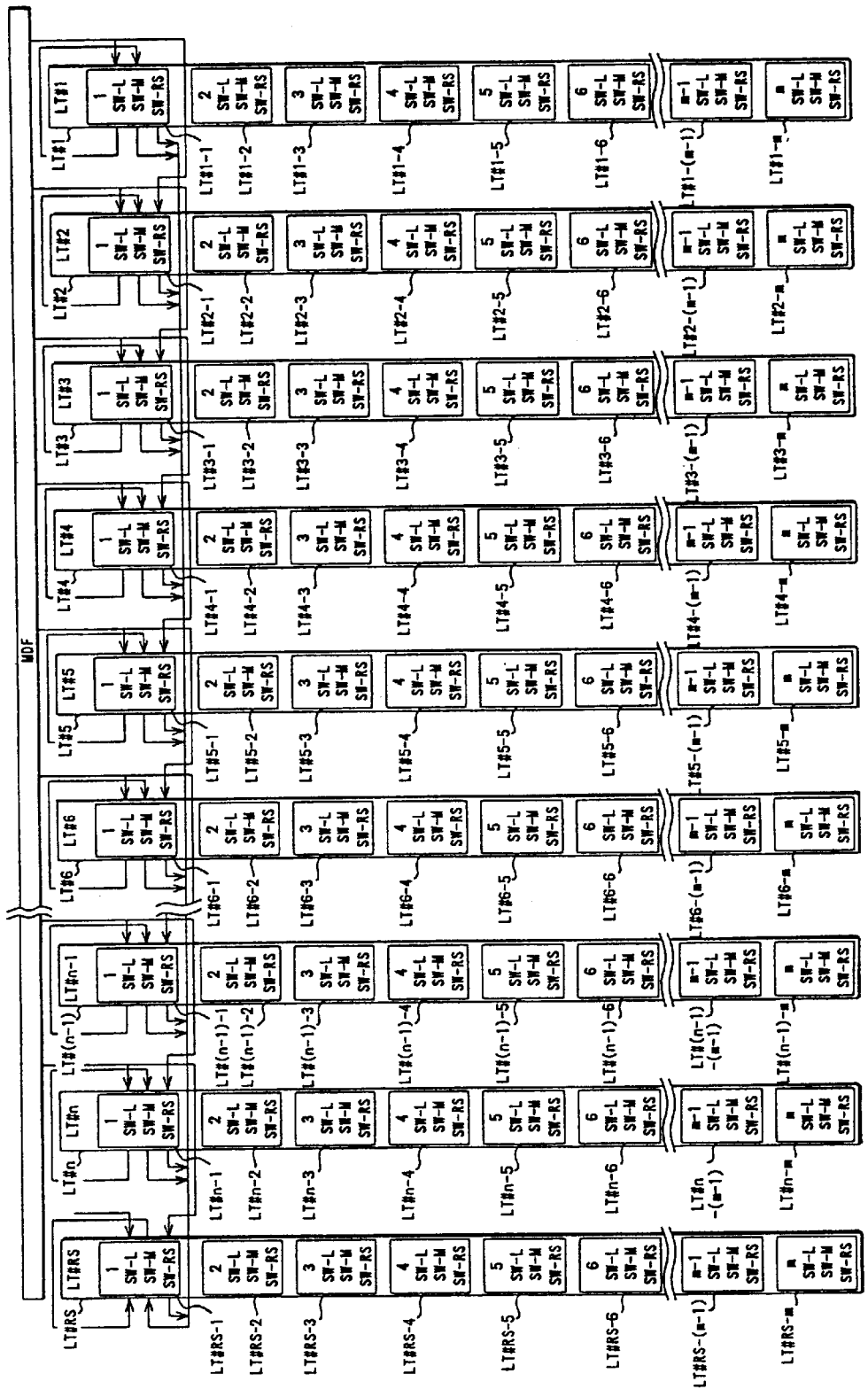
FIG. 25 is a block diagram showing flows of signals when a plurality of channels are used in the subscriber terminating equipment according to the first modification to the second embodiment of the present invention.

(b1) Description of the First Modification to the Second Embodiment of the Present Invention FIGS. 22 to 24 are block diagrams illustrating operation of a subscriber terminating equipment 30 according to a first modification to the second embodiment of the present invention, and FIG. 25 is a block diagram showing flows of signals where a plurality of channels are used in the subscriber terminating equipment 30. As seen from FIGS. 22 to 25, the subscriber terminating equipment 30 of the present modification is similar to but is different from the subscriber terminating equipment 30 of the second embodiment in that the subscriber terminating packages LT#i (i is a natural number from 1 to n) and the relief package LT#RS are arranged in the reverse order.

Figure 21:
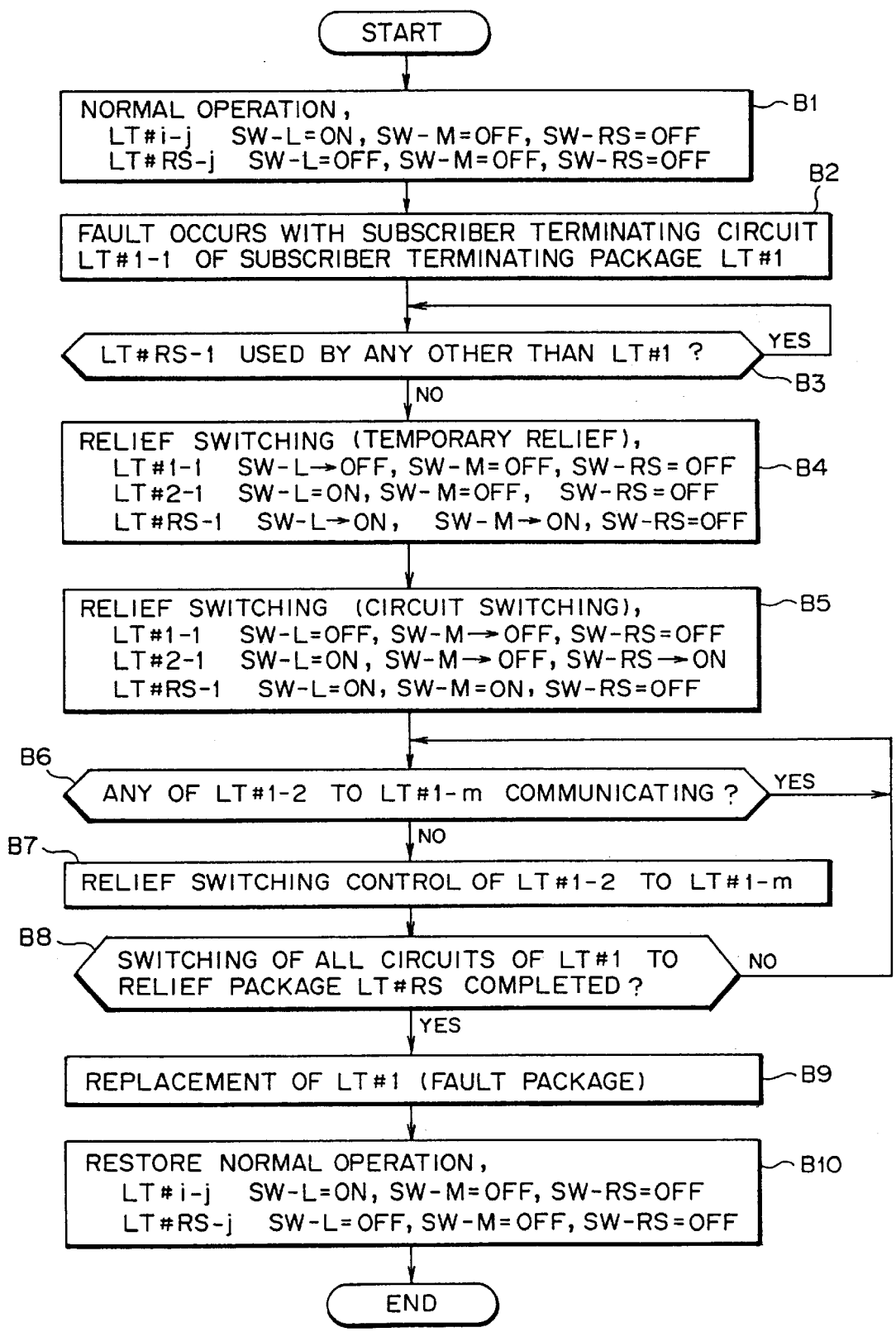
FIG. 21 is a flowchart illustrating operation of the subscriber terminating equipment according to the second embodiment of the present invention.

The subscriber terminating equipment 30 having the construction just described thus operates, as operation thereof when it operates normally and when a fault occurs, in a similar manner to that of the flowchart of FIG. 21 which illustrates operation of the subscriber terminating equipment 30 of the second embodiment.

Consequently, with the subscriber terminating equipment 30 of the present modification, signals are relieved similarly as with the subscriber terminating equipment 30 of the second embodiment.

Figure 26:
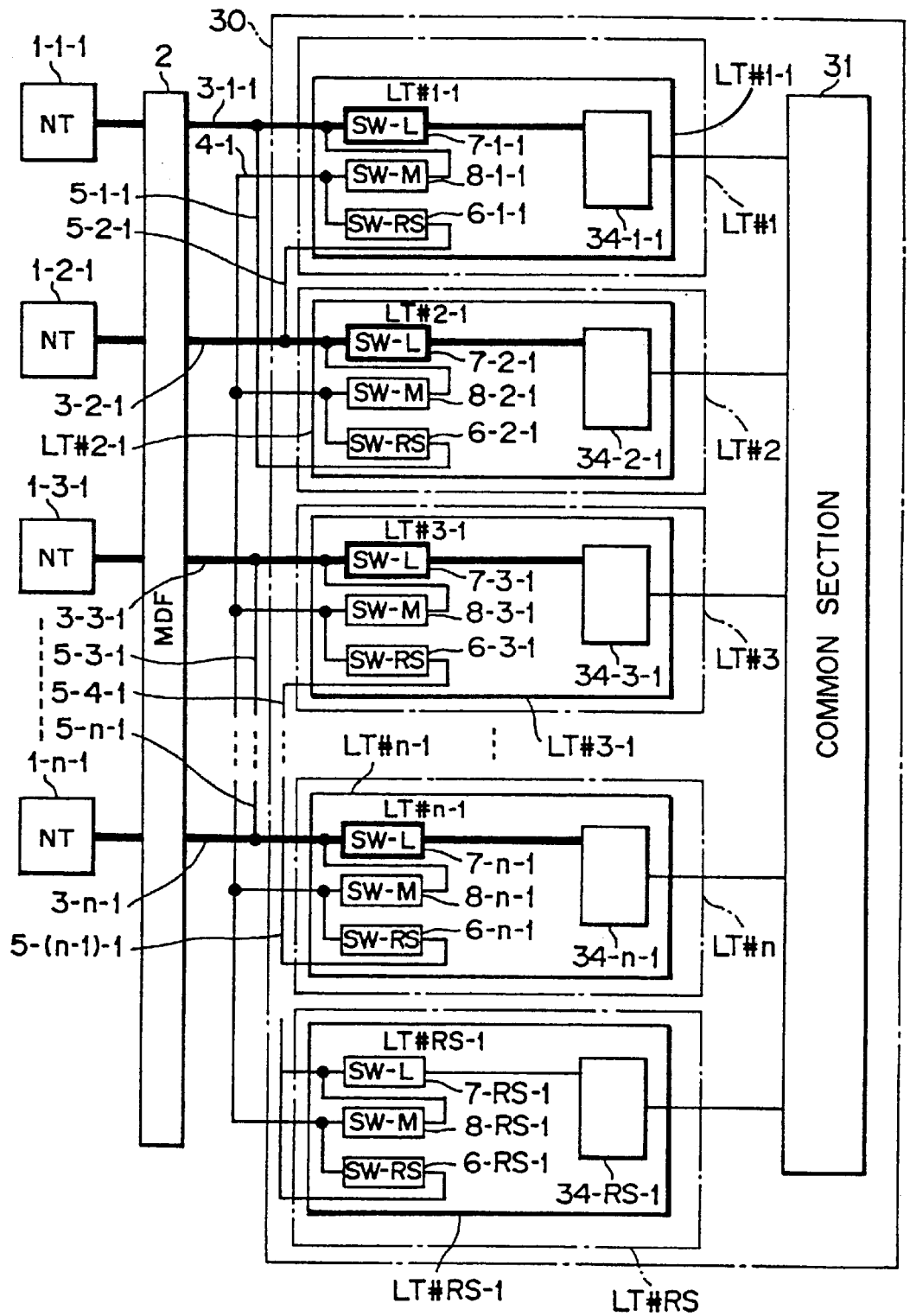
FIG. 26 is a block diagram illustrating operation of a subscriber terminating equipment according to a second modification to the second embodiment of the present invention in normal operation.
Figure 27:
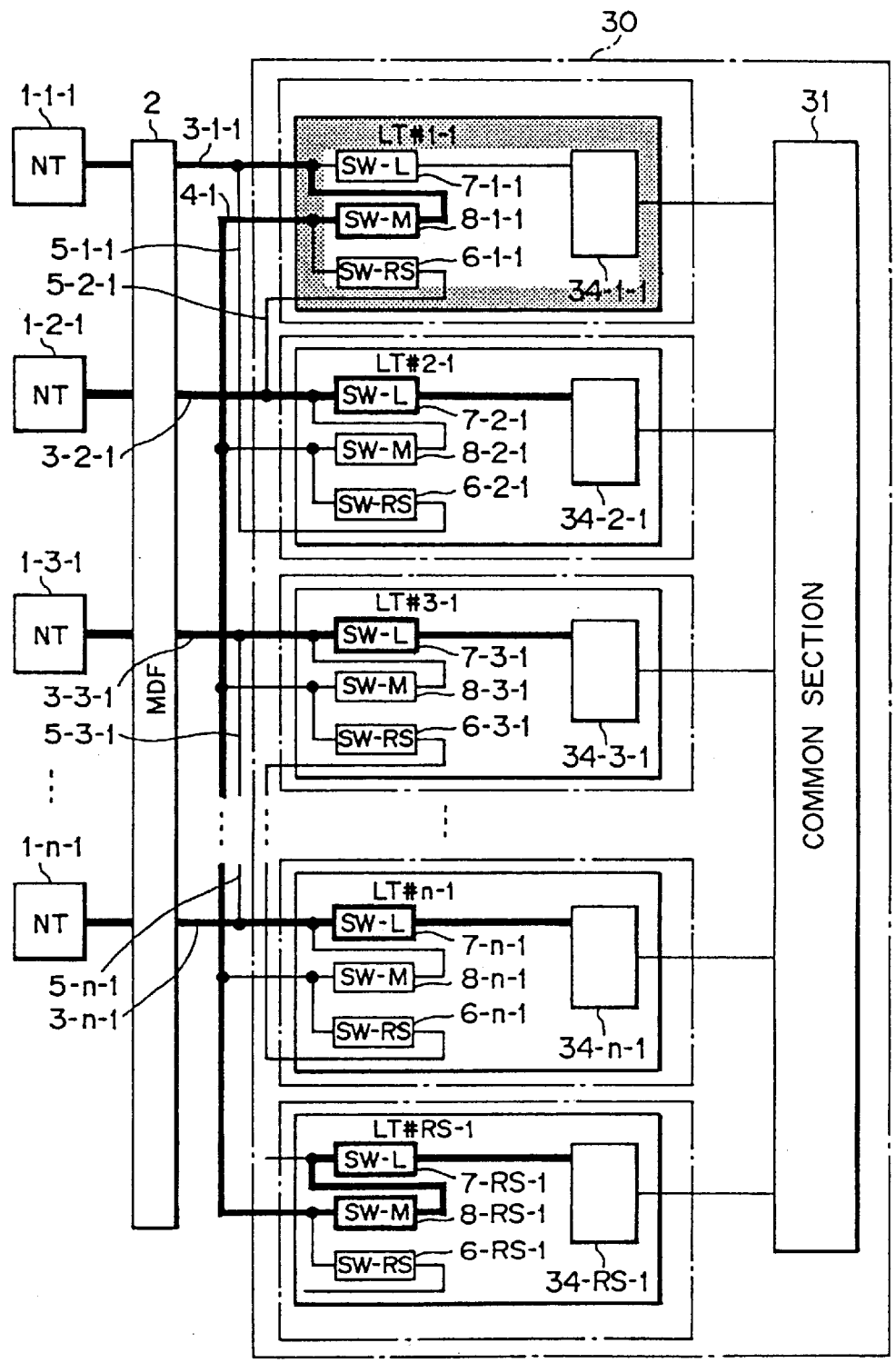
FIG. 27 is a block diagram illustrating operation of the subscriber terminating equipment according to the second modification to the second embodiment upon self relief.
Figure 28:
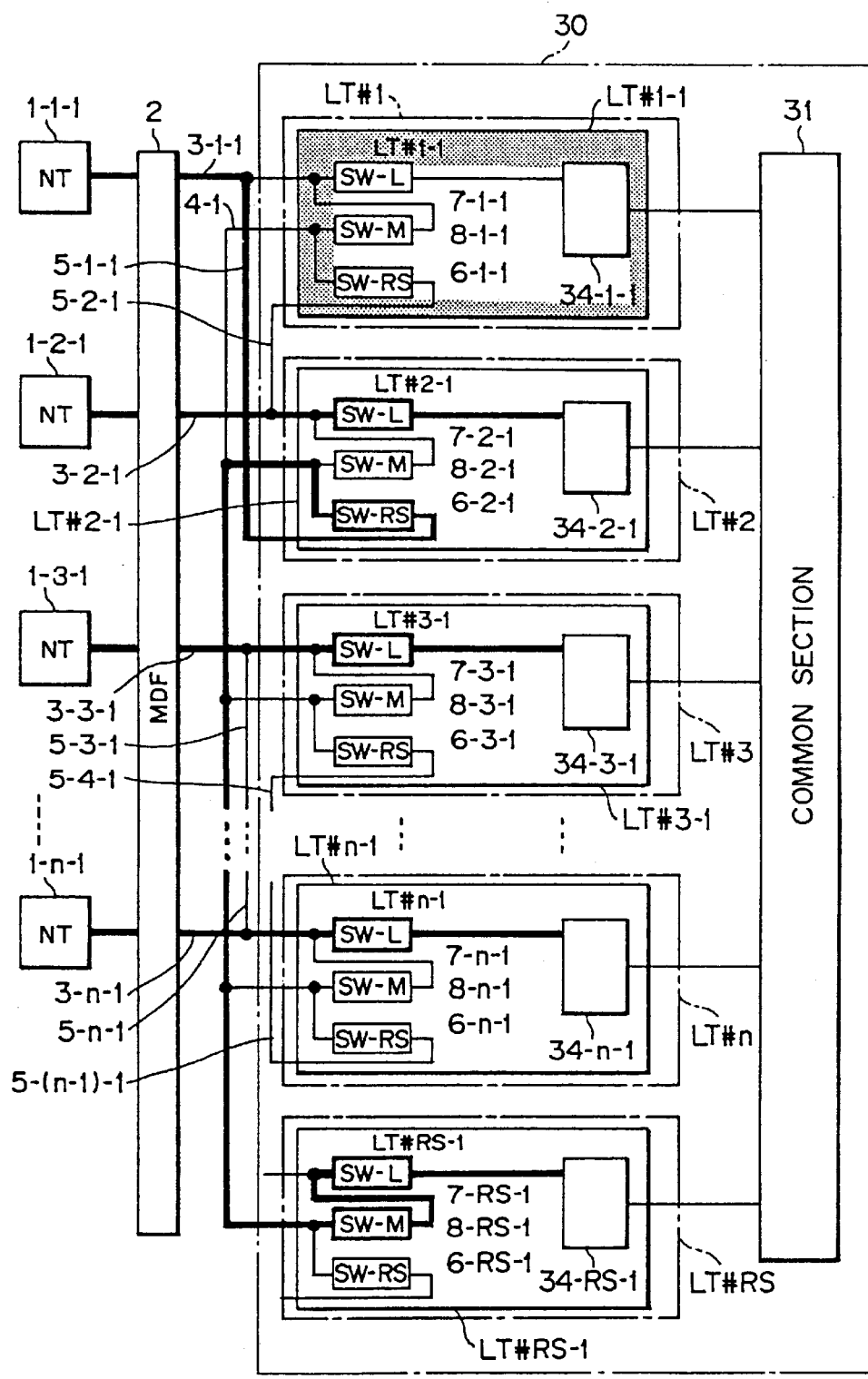
FIG. 28 is a block diagram illustrating operation of the subscriber terminating equipment according to the second modification to the second embodiment upon circuit switching.
Figure 29:
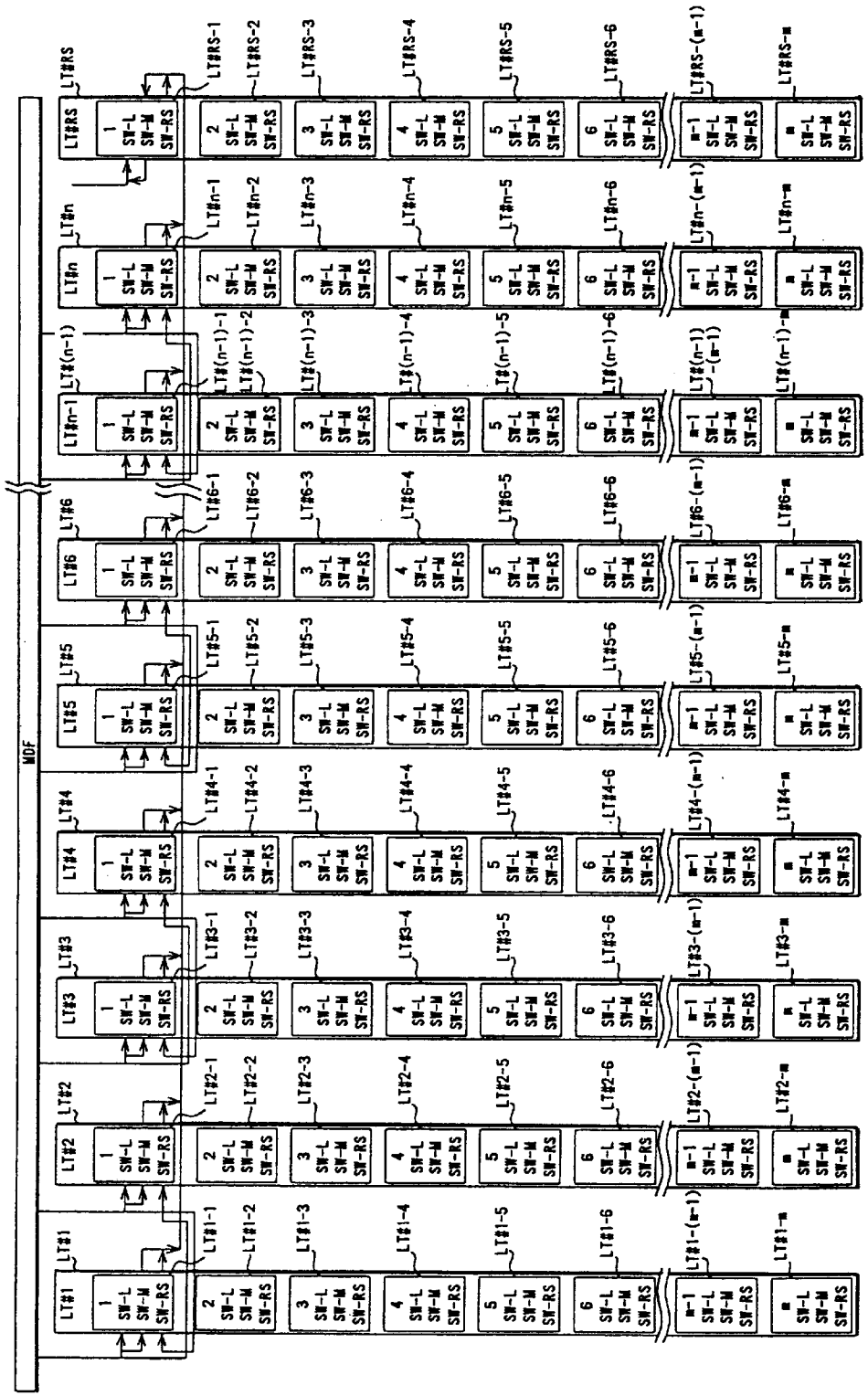
FIG. 29 is a block diagram showing flows of signals when a plurality of channels are used in the subscriber terminating equipment according to the second modification to the second embodiment.

(b2) Description of the Second Modification to the Second Embodiment of the Present Invention FIGS. 26 to 28 are block diagrams illustrating operation of a subscriber terminating equipment 30 according to a second modification to the second embodiment of the present invention, and FIG. 29 is a block diagram showing flows of signals where a plurality of channels are used in the subscriber terminating equipment 30. As seen from FIGS. 26 to 29, the subscriber terminating equipment 30 of the present modification is similar to but is different from the subscriber terminating equipment 30 of the second embodiment in that, in allocation of a bypass package, a pair of subscriber terminating packages LT#i are selected and each allocated as a bypass package for the other subscriber terminating package LT#i relative to each other.

In particular, each of the subscriber terminating package LT#1 and the subscriber terminating package LT#2 has a subscriber terminating function and a function as a bypass package for the other package. Also the other subscriber terminating packages LT#3 to LT#n are allocated as bypass packages similarly such that the subscriber terminating package LT#3 and the subscriber terminating package LT#4 in pair, . . . , and the subscriber terminating package LT#(n-1) and the subscriber terminating package LT#n in pair are individually allocated as bypass packages relative to each other.

From the difference in allocation of the bypass passages in the subscriber terminating equipment 30 of the present modification, the subscriber terminating package LT#i which operates as a bypass package is different from that in the subscriber terminating equipment 30 of the second embodiment. Except this, the subscriber terminating equipment 30 of the present modification operates similarly to the subscriber terminating equipment 30 of the second embodiment in accordance with the flowchart of FIG. 21.

Consequently, with the subscriber terminating equipment 30 of the present modification, signals are relieved similarly as with the subscriber terminating equipment 30 of the second embodiment.

Figure 30:
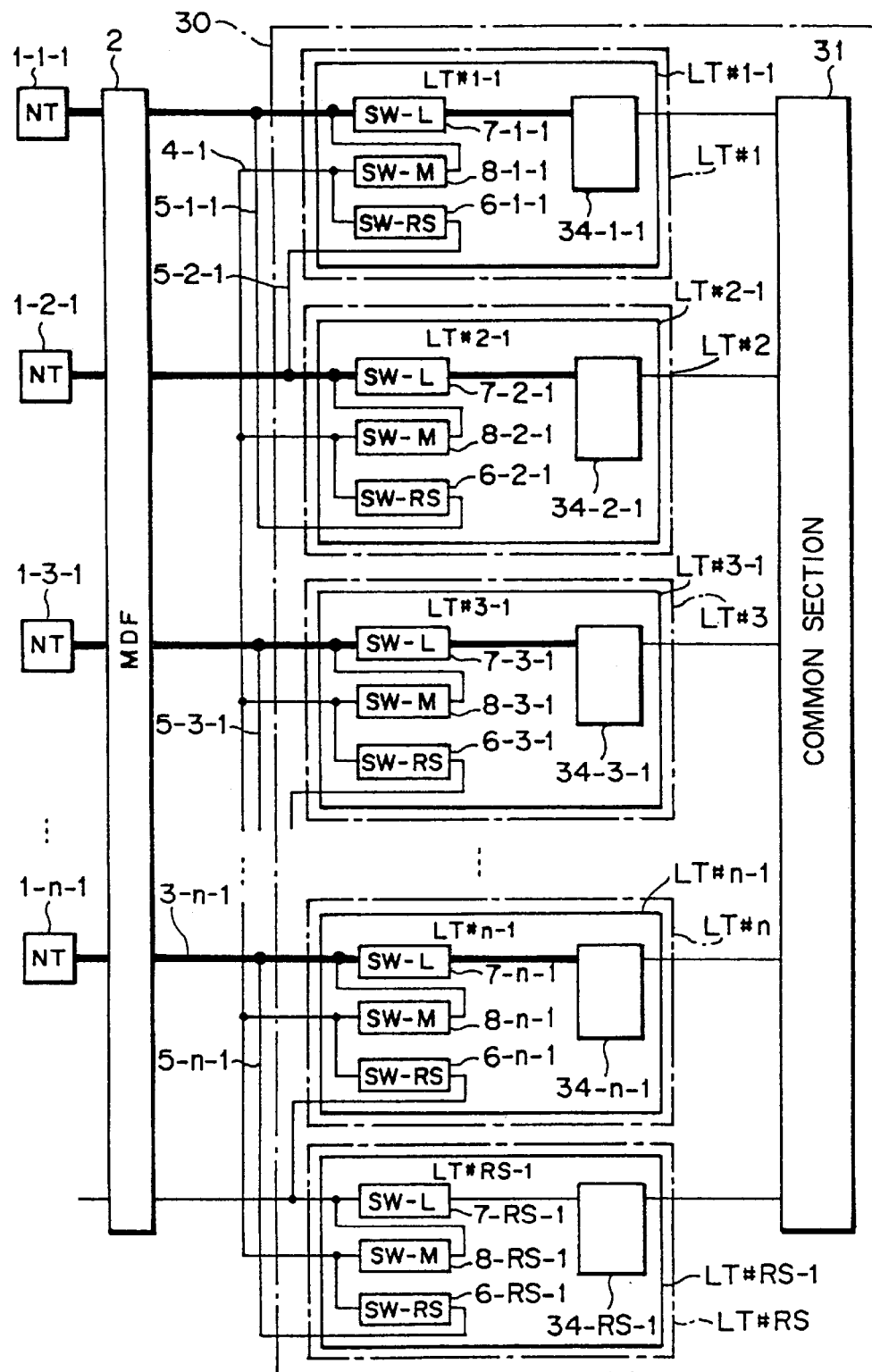
FIG. 30 is a block diagram illustrating operation of a subscriber terminating equipment according to a third modification to the second embodiment of the present invention in normal operation.
Figure 31:
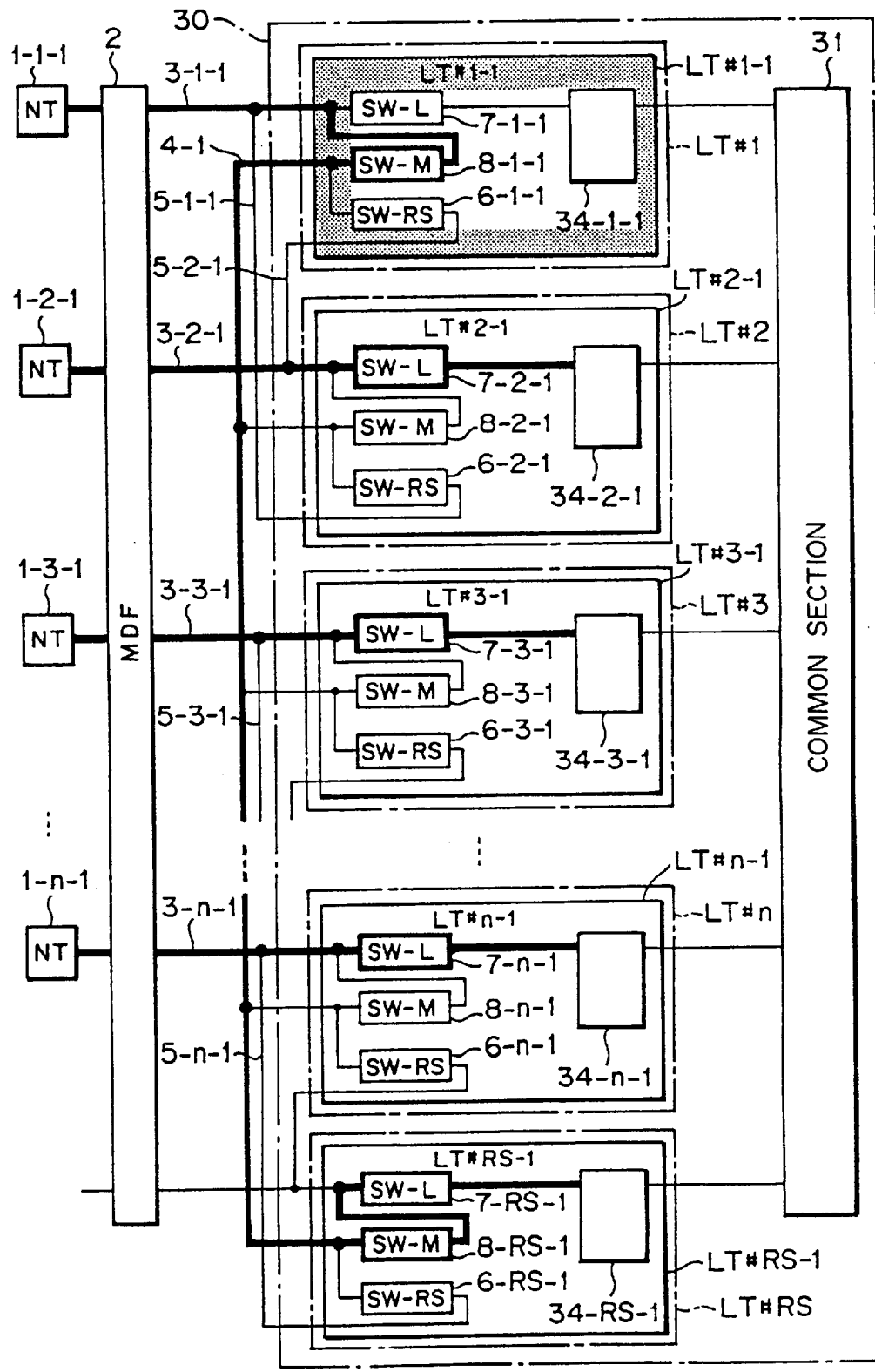
FIG. 31 is a block diagram illustrating operation of the subscriber terminating equipment according to the third modification to the second embodiment of the present invention upon self relief.
Figure 32:
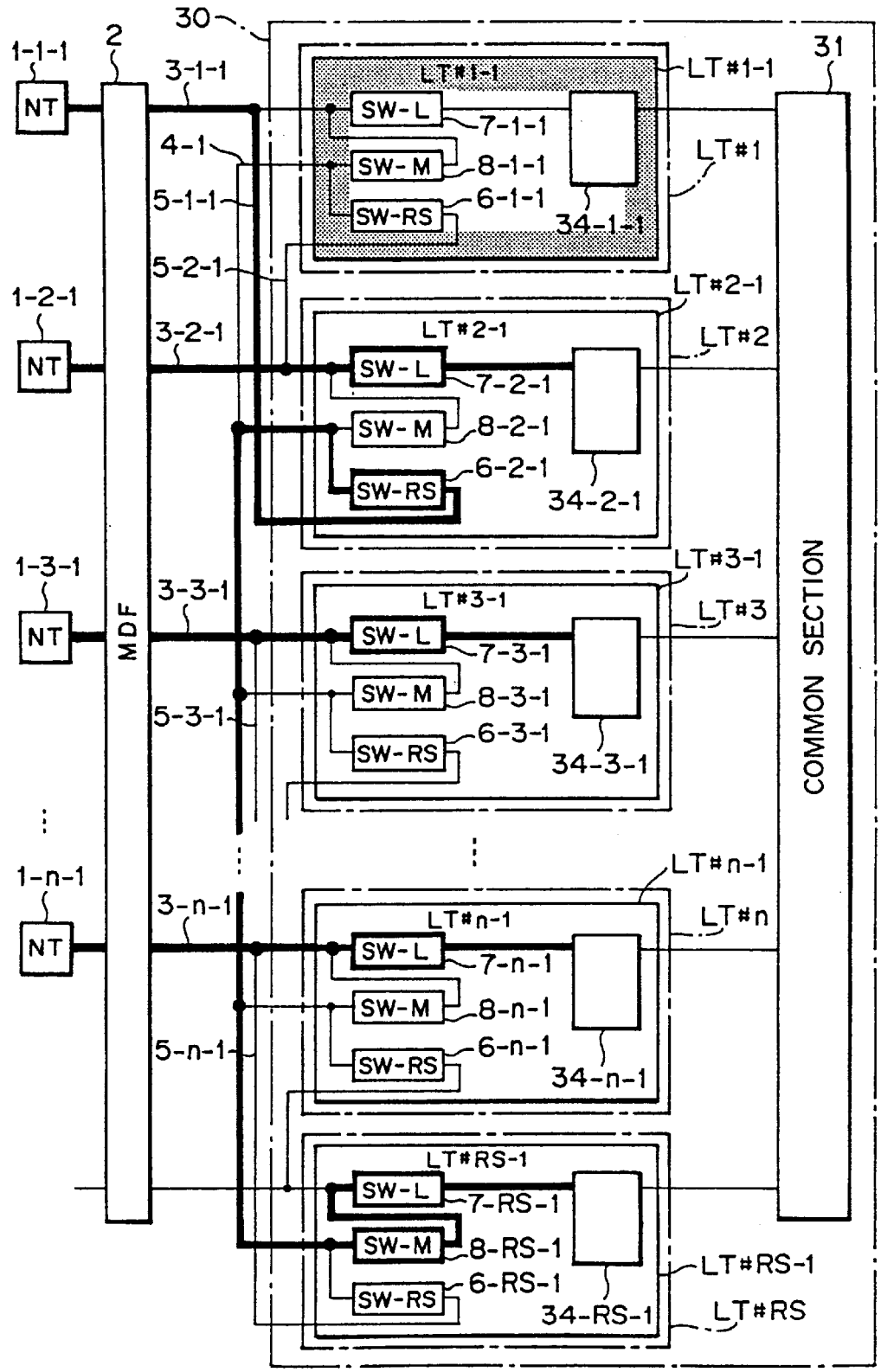
FIG. 32 is a block diagram illustrating operation of the subscriber terminating equipment according to the third modification to the second embodiment of the present invention upon circuit switching.
Figure 33:
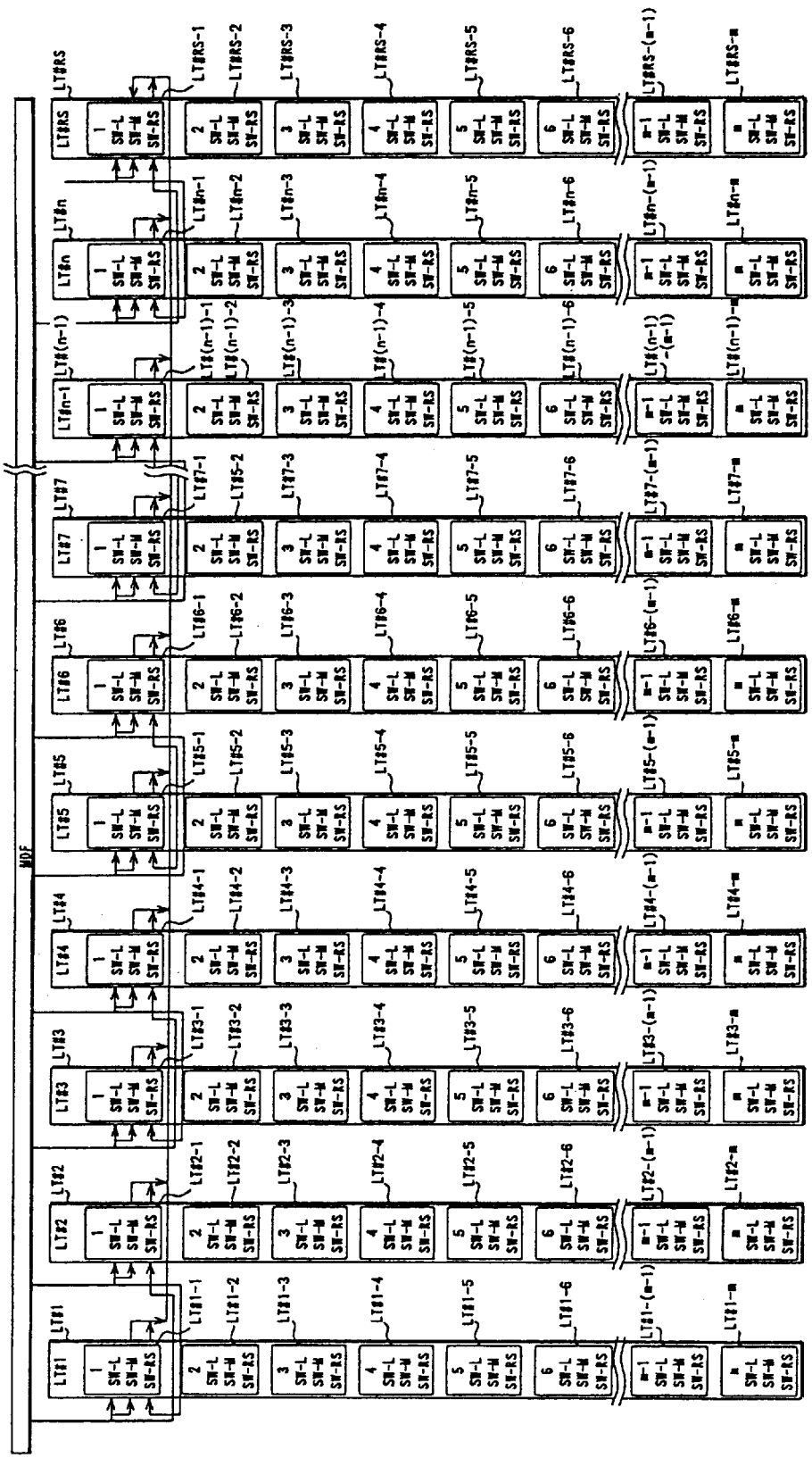
FIG. 33 is a block diagram showing flows of signals when a plurality of channels are used in the subscriber terminating equipment according to the third modification to the second embodiment of the present invention.

(b3) Description of the Third Modification to the Second Embodiment of the Invention FIGS. 30 to 32 are block diagrams illustrating operation of a subscriber terminating equipment 30 according to a third modification to the second embodiment of the present invention, and FIG. 33 is a block diagram showing flows of signals where a plurality of channels are used in the subscriber terminating equipment 30. As seen from FIGS. 30 to 33, the subscriber terminating equipment 30 of the present modification is similar to but is different from the subscriber terminating equipment 30 of the second modification to the second embodiment in that the sum of the number of subscriber terminating packages LT#i in the subscriber terminating equipment 30 and the number of relief packages LT#RS is an even number, that is, the number of subscriber terminating packages LT#i is an odd number.

Thus, since the number of subscriber terminating packages LT#1 to LT#n is an odd number, if they are allocated so as to be paired in a similar manner as in the subscriber terminating equipment 30 of the second modification to the second embodiment, then the nth subscriber terminating package LT#n remains without being paired. Thus, in the present modification, the relief package LT#RS is allocated as a bypass package for the remaining subscriber terminating package LT#n.

More particularly, the SW-RS switch 6-RS-1 of the LT#RS-1 of the relief package LT#RS shown in FIGS. 30 to 32 and the subscriber line 3-n-1 are connected to each other.

Also for the channels 2 to m, the SW-RS switches 6-RS-2 to 6-RS-m of the subscriber terminating circuits LT#RS-2 to LT#RS-m of the relief package LT#RS and the subscriber lines 3-n-2 to 3-n-m (not shown) are connected to each other. As a result, the relief package LT#RS has functions not only as the relief package LT#RS but also as a bypass package for the subscriber terminating package LT#n.

As seen from FIGS. 31 and 32, operation in this instance is similar to that of the subscriber terminating equipment 30 of the second modification to the second embodiment except that, if a fault occurs with the subscriber terminating package LT#n set in pair with the relief package LT#RS, then the SW-M switch 8-RS-1 of the relief package LT#RS is switched on.

Consequently, with the subscriber terminating equipment 30 of the present modification, signals are relieved similarly as with the subscriber terminating equipment 30 of the second embodiment.

Figure 34:
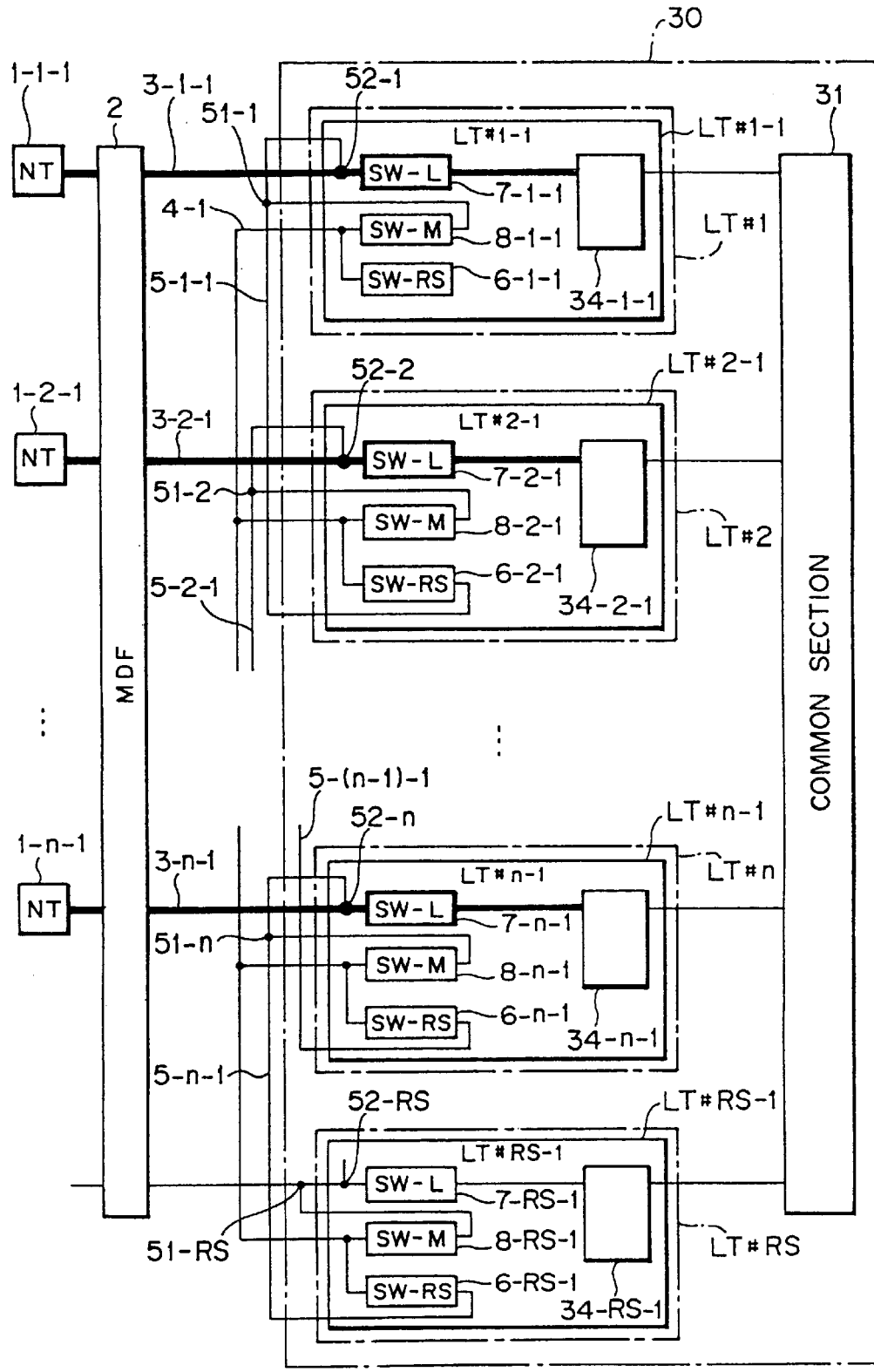
FIG. 34 is a block diagram illustrating operation of a subscriber terminating equipment according to a fourth modification to the second embodiment of the present invention in normal operation.

(b4) Description of the Fourth Modification to the Second Embodiment of the Present Invention FIG. 34 is a block diagram illustrating operation of a subscriber terminating equipment 30 according to a fourth modification to the second embodiment of the present invention. As seen from FIG. 34, the subscriber terminating equipment 30 of the present modification is similar to but is different from the subscriber terminating equipment 30 of the second embodiment in that the L/M points 51-1 to 51-n indicative of connection points between the SW-M switches 8-1-1 to 8-n-1 and the SW-L switches 7-1-1 to 7-n-1 are provided outside while RS/L points 52-1 to 52-n indicative of connection points between the SW-L switches 7-1-1 to 7-n-1 and the SW-RS switch 6-RS-1 of the relief package LT#RS are provided inside the subscriber terminating packages LT#1 to LT#n. However, operation of the subscriber terminating equipment 30 when it operates normally and when a fault occurs is similar that of the flowchart of the subscriber terminating equipment 30 of the second embodiment shown in FIG. 21.

Consequently, with the subscriber terminating equipment 30 of the present modification, signals are relieved similarly as with the subscriber terminating equipment 30 of the second embodiment.

Further, since the RS/L points 52-1 to 52-n and/or the L/M points 51-1 to 51-n can be set inside or outside the subscriber terminating packages LT#1 to LT#n or the relief package LT#RS, they can be set freely taking deterioration in characteristic or reduction in number of parts into consideration.

Figure 35:
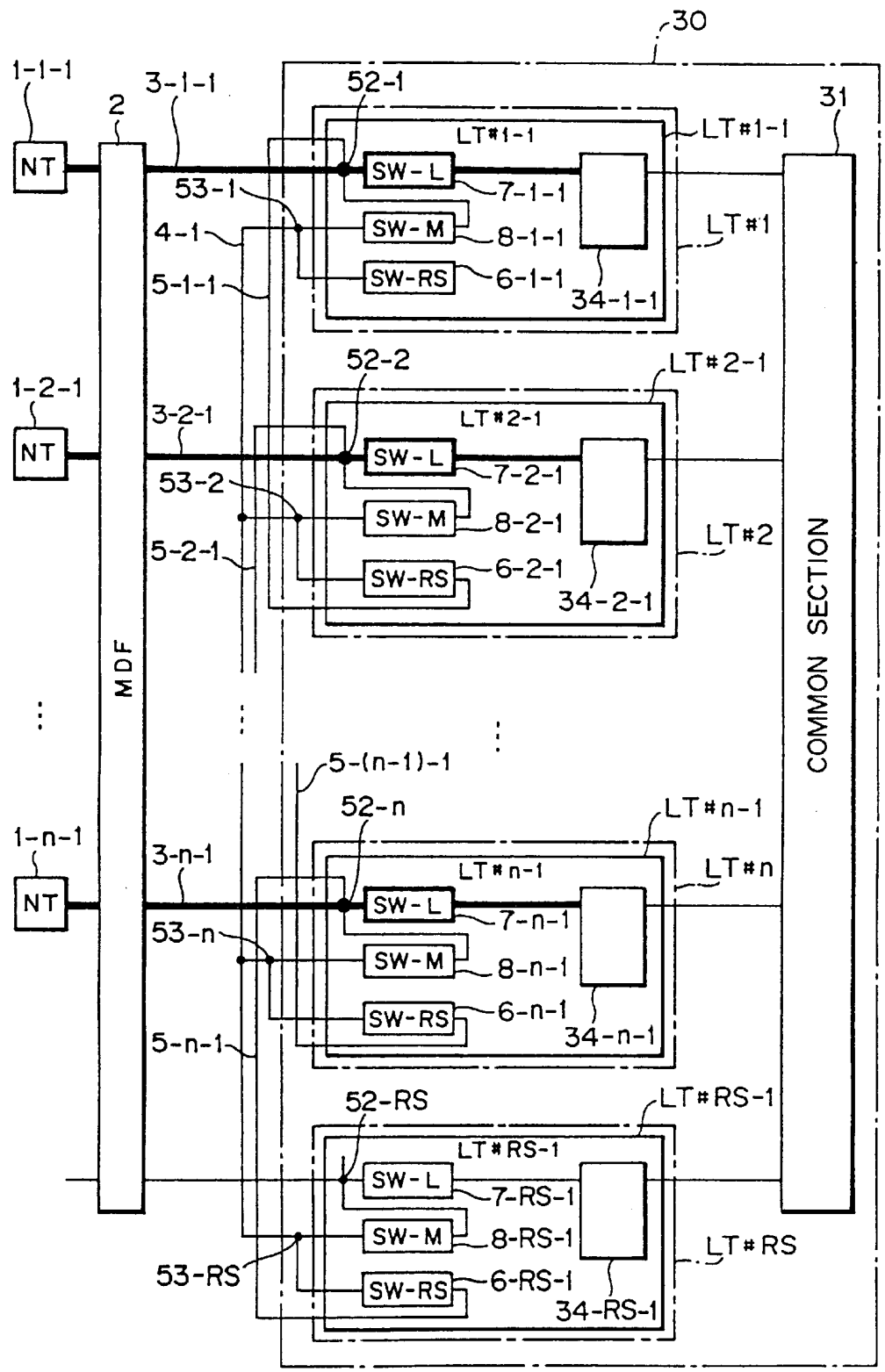
FIG. 35 is a block diagram illustrating operation of a subscriber terminating equipment according to a fifth modification to the second embodiment of the present invention in normal operation.

(b5) Description of the Fifth Modification to the Second Embodiment of the Present Invention FIG. 35 is a block diagram illustrating operation of a subscriber terminating equipment 30 according to a fifth modification to the second embodiment of the present invention. As seen from FIG. 35, the subscriber terminating equipment 30 of the present modification is similar to but is different from the subscriber terminating equipment 30 of the second embodiment in that the RS/L points 52-1 to 52-n and 52-RS are provided outside the subscriber terminating packages LT#1 to LT#n. However, operation of the subscriber terminating equipment 30 when it operates normally and when a fault occurs is similar that of the flowchart of the subscriber terminating equipment 30 of the second embodiment shown in FIG. 21.

Consequently, with the subscriber terminating equipment 30 of the present modification, signals are relieved similarly as with the subscriber terminating equipment 30 of the second embodiment.

(b6) Description of the Sixth Modification to the Second Embodiment of the Present Invention FIG. 36 is a block diagram illustrating operation of a subscriber terminating equipment 30 according to a sixth modification to the second embodiment of the present invention. As seen from FIG. 36, the subscriber terminating equipment 30 of the present modification is similar to but is different from the subscriber terminating equipment 30 of the second embodiment in that the L/M points 51-1 to 51-n and 51-RS are provided outside the subscriber terminating packages LT#1 to LT#n and the relief package LT#RS. However, operation of the subscriber terminating equipment 30 when it operates normally and when a fault occurs is similar that of the flowchart of the subscriber terminating equipment 30 of the second embodiment shown in FIG. 21.

Consequently, with the subscriber terminating equipment 30 of the present modification, signals are relieved similarly as with the subscriber terminating equipment 30 of the second embodiment.

Figure 37:
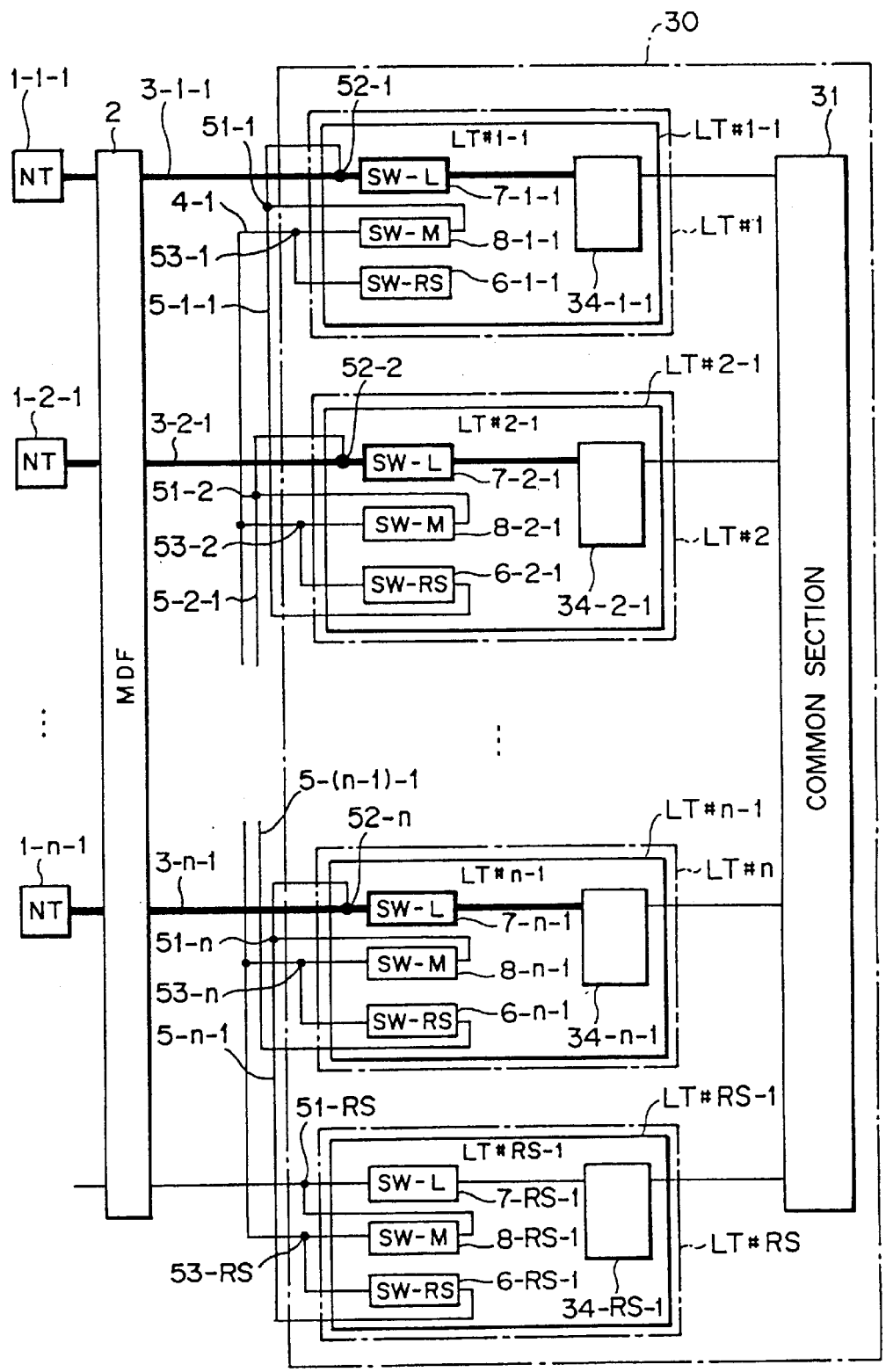
FIG. 37 is a block diagram illustrating operation of a subscriber terminating equipment according to a seventh modification to the second embodiment of the present invention in normal operation.

(b7) Description of the Seventh Modification to the Second Embodiment of the Present Invention FIG. 37 is a block diagram illustrating operation of a subscriber terminating equipment 30 according to a seventh modification to the second embodiment of the present invention. As seen from FIG. 37, the subscriber terminating equipment 30 of the present modification is similar to but is different from the subscriber terminating equipment 30 of the second embodiment in that the L/M points 51-1 to 51-n and the M/RS points 53-1 to 53-n and 53-RS indicative of connection points between the multi-connection line 4-1 and the SW-RS switches 6-1-1 to 6-n-1 are provided outside the subscriber terminating packages LT#1 to LT#n and the relief package LT#RS. Except this, the subscriber terminating equipment 30 has a similar construction and operates similarly to the subscriber terminating equipment 30 of the second embodiment.

Consequently, with the subscriber terminating equipment 30 of the present modification, signals are relieved similarly as with the subscriber terminating equipment 30 of the second embodiment.

Figure 38:
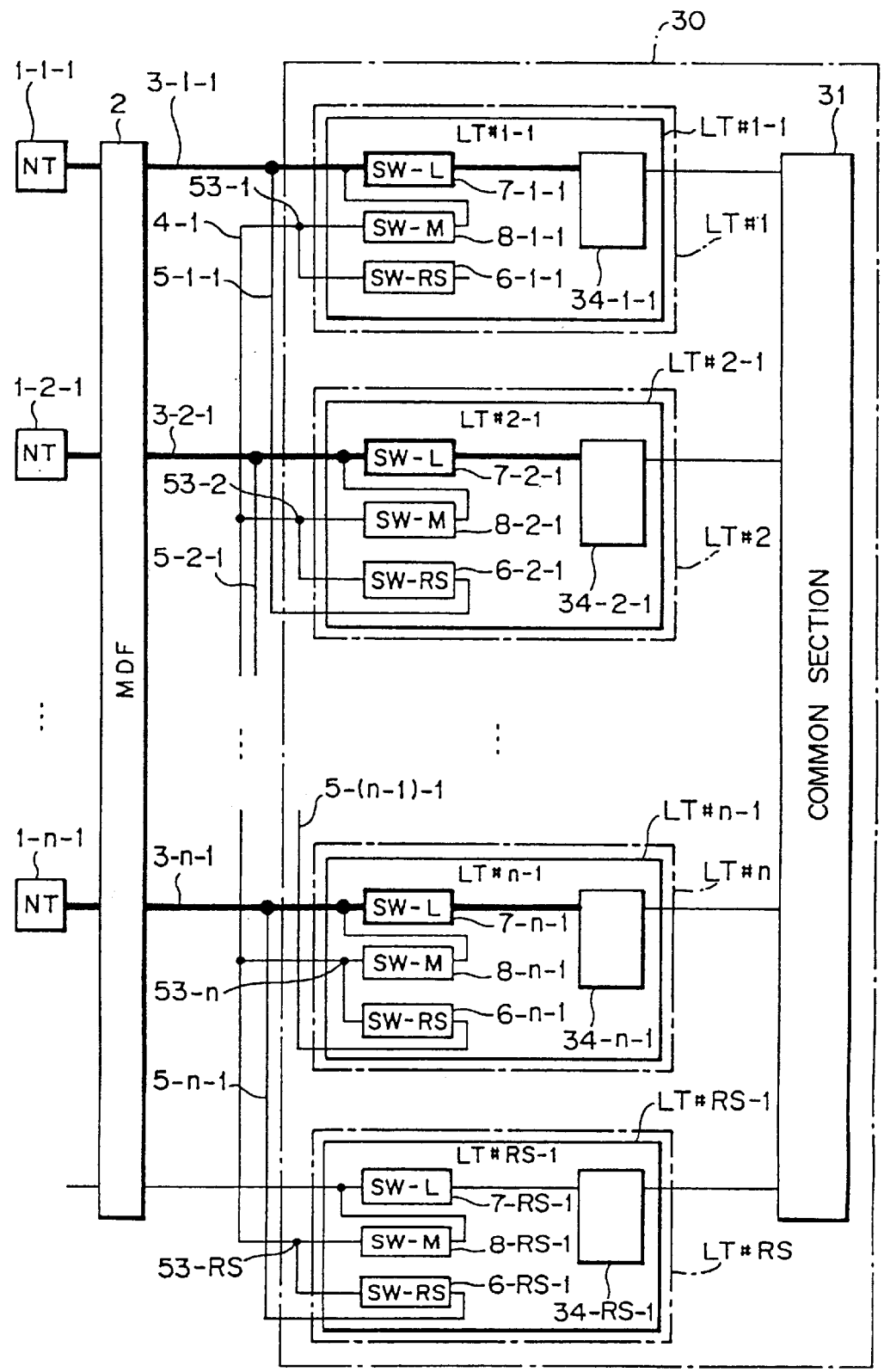
FIG. 38 is a block diagram illustrating operation of a subscriber terminating equipment according to an eighth modification to the second embodiment of the present invention in normal operation.

(b8) Description of the Eight Modification to the Second Embodiment of the Present Invention FIG. 38 is a block diagram illustrating operation of a subscriber terminating equipment 30 according to an eighth modification to the second embodiment of the present invention. As seen from FIG. 38, the subscriber terminating equipment 30 of the present modification is similar to but is different from the subscriber terminating equipment 30 of the second embodiment only in that the M/RS points 53-1 to 53-n and 53-RS are provided outside the subscriber terminating packages LT#1 to LT#n and the relief package LT#RS. The subscriber terminating equipment 30 thus operates similarly to the subscriber terminating equipment 30 of the second embodiment.

Consequently, with the subscriber terminating equipment 30 of the present modification, signals are relieved similarly as with the subscriber terminating equipment 30 of the second embodiment.

Figure 39:
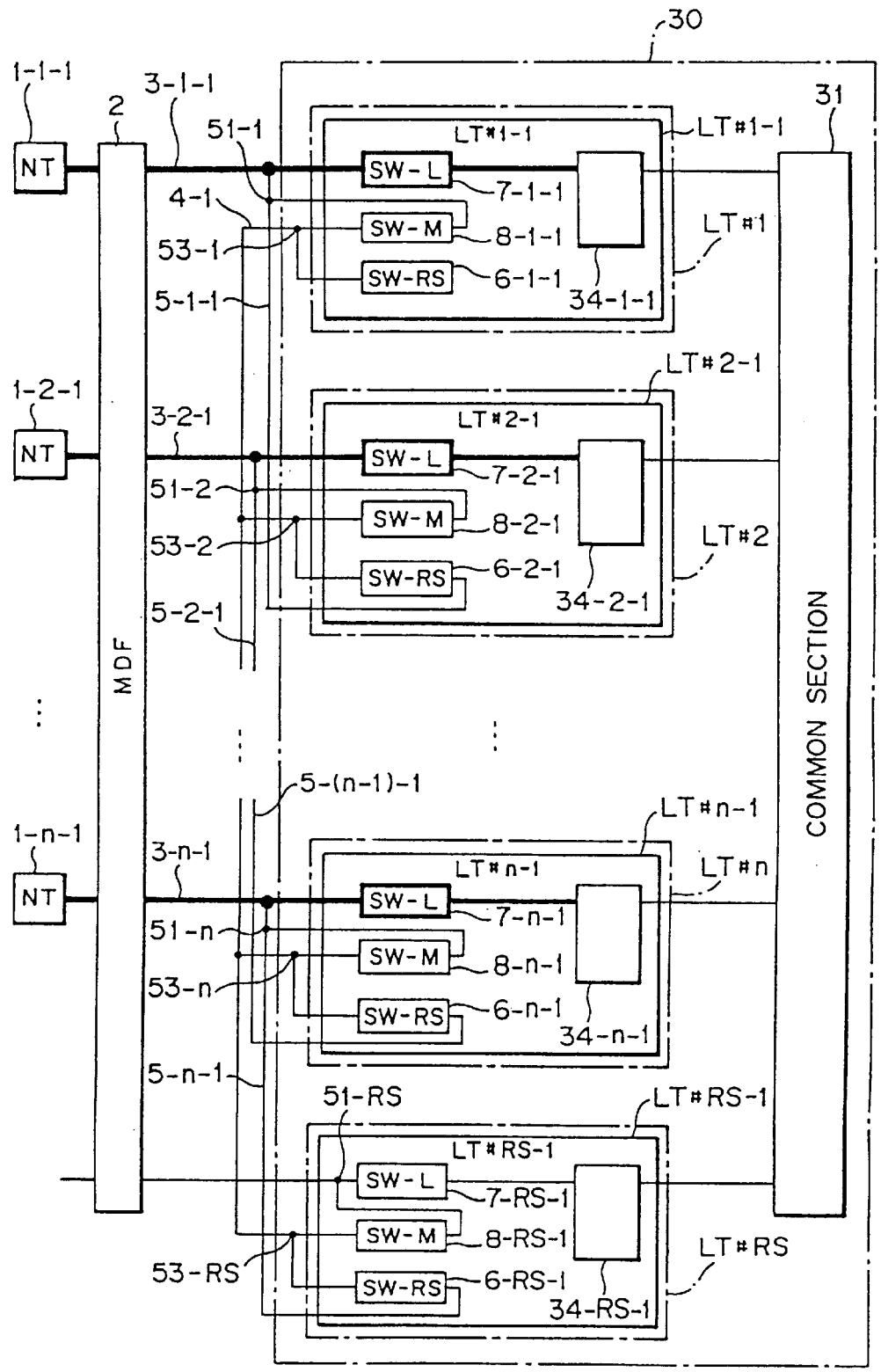
FIG. 39 is a block diagram illustrating operation of a subscriber terminating equipment according to a ninth modification to the second embodiment of the present invention in normal operation.

(b9) Description of the Ninth Modification to the Second Embodiment of the Present Invention FIG. 39 is a block diagram illustrating operation of a subscriber terminating equipment 30 according to a ninth modification to the second embodiment of the present invention. As seen from FIG. 39, the subscriber terminating equipment 30 of the present modification is similar to but is different from the subscriber terminating equipment 30 of the second embodiment only in that the L/M points 51-1 to 51-n and 51-RS and the M/RS points 53-1 to 53-n and 53-RS are provided outside the subscriber terminating packages LT#1 to LT#n and the relief package LT#RS. The subscriber terminating equipment 30 thus operates similarly to the subscriber terminating equipment 30 of the second embodiment.

Consequently, with the subscriber terminating equipment 30 of the present modification, signals are relieved similarly as with the subscriber terminating equipment 30 of the second embodiment.

Figure 40:
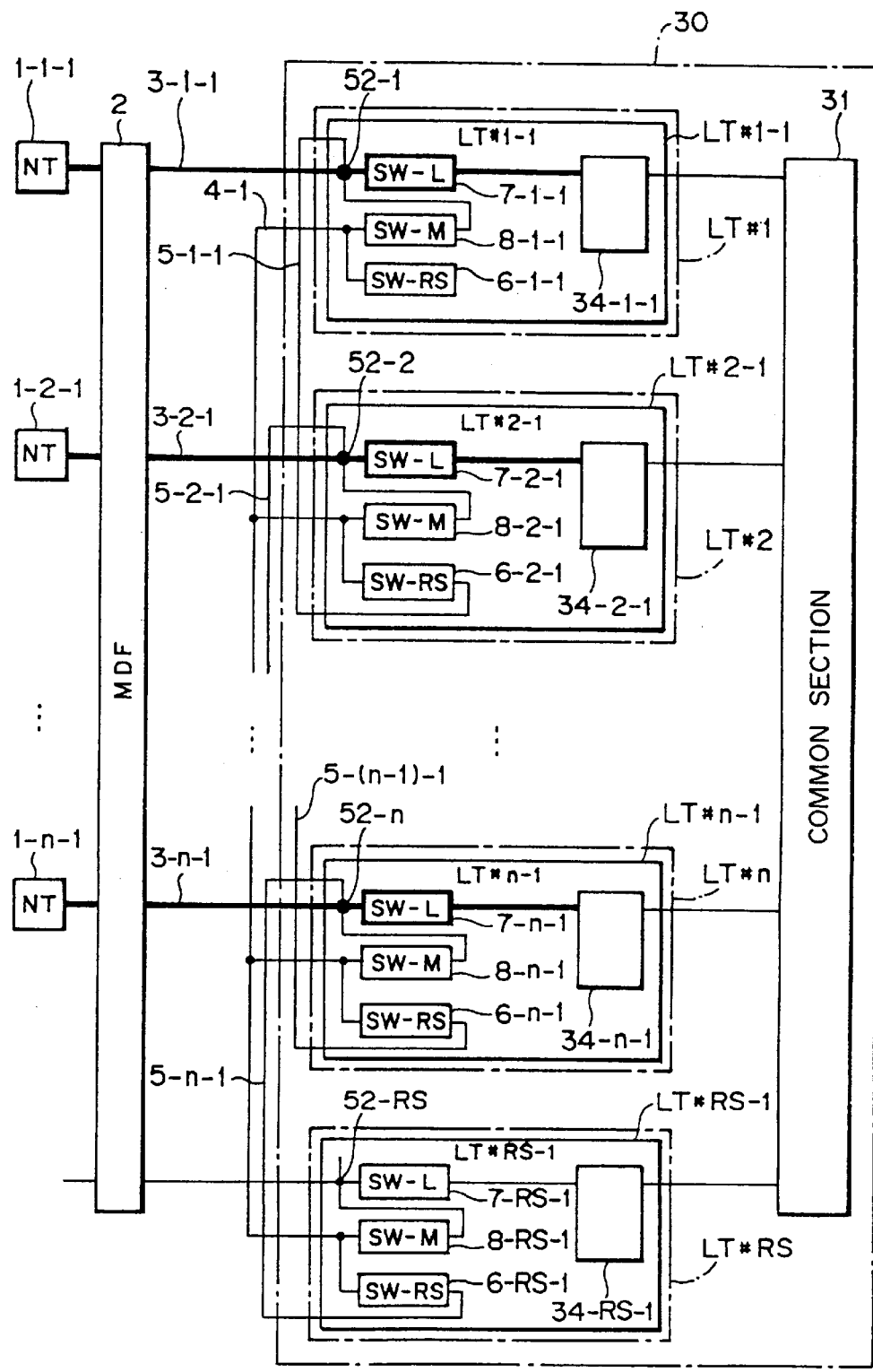
FIG. 40 is a block diagram illustrating operation of a subscriber terminating equipment according to a tenth modification to the second embodiment of the present invention in normal operation.

(b10) Description of the Tenth Modification to the Second Embodiment of the Present Invention FIG. 40 is a block diagram illustrating operation of a subscriber terminating equipment 30 according to a tenth modification to the second embodiment of the present invention. As seen from FIG. 40, the subscriber terminating equipment 30 of the present modification is similar to but is different from the subscriber terminating equipment 30 of the second embodiment only in that the L/RS points 52-1 to 52-n are provided inside the subscriber terminating packages LT#i. The subscriber terminating equipment 30 thus operates similarly to the subscriber terminating equipment 30 of the second embodiment.

Consequently, with the subscriber terminating equipment 30 of the present modification, signals are relieved similarly as with the subscriber terminating equipment 30 of the second embodiment.

Figure 41:
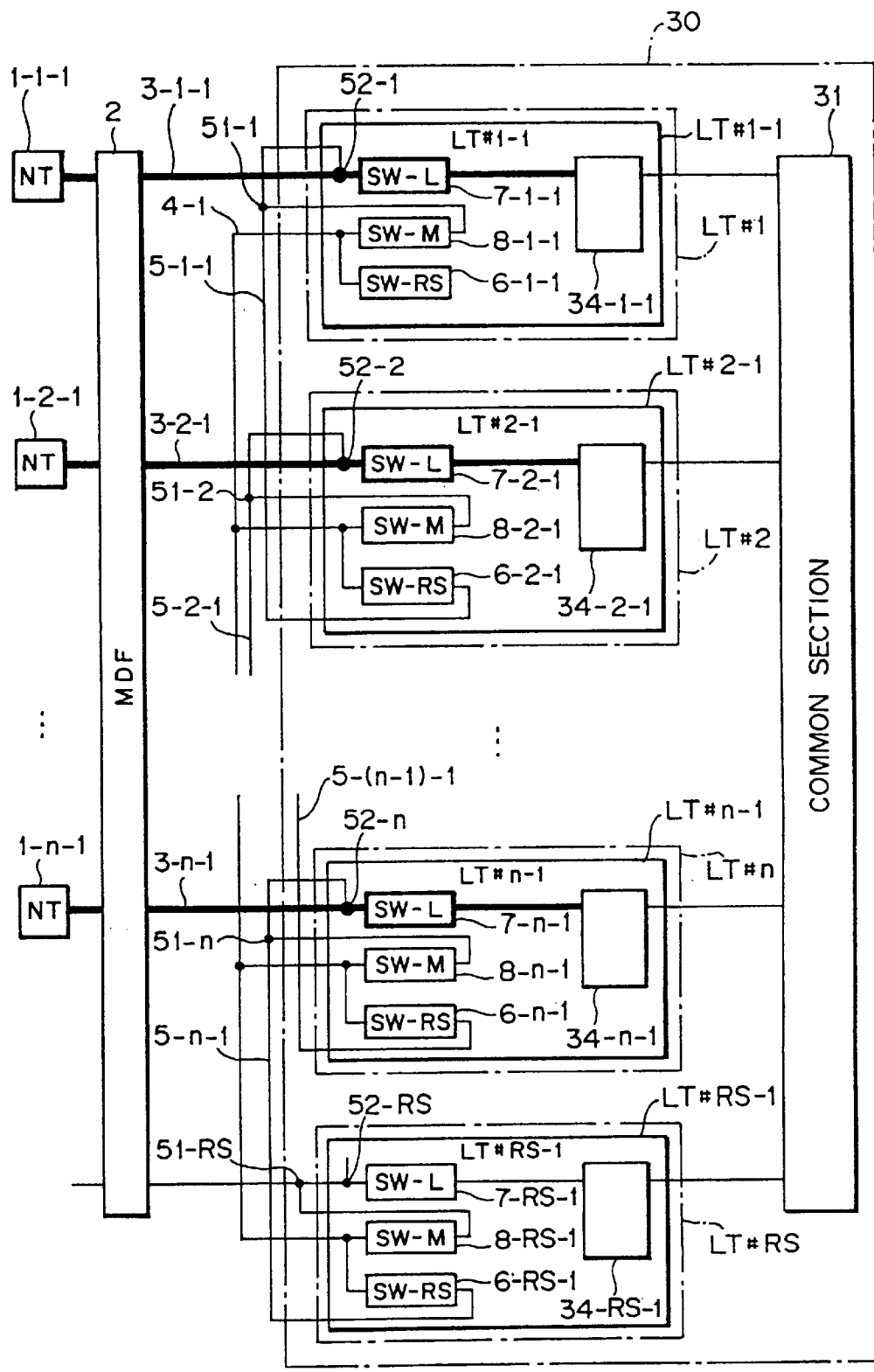
FIG. 41 is a block diagram illustrating operation of a subscriber terminating equipment according to an eleventh modification to the second embodiment of the present invention in normal operation.

(b11) Description of the Eleventh Modification to the Second Embodiment of the Present Invention FIG. 41 is a block diagram illustrating operation of a subscriber terminating equipment 30 according to an eleventh modification to the second embodiment of the present invention. As seen from FIG. 41, the subscriber terminating equipment 30 of the present modification is similar to but is different from the subscriber terminating equipment 30 of the second embodiment shown in FIG. 17 only in that the L/M points 51-1 to 51-n are provided outside the subscriber terminating packages LT#1 to LT#n and the relief package LT#RS and the L/RS points 52-1 to 52-n are provided inside the subscriber terminating packages LT#1 to LT#n. The subscriber terminating equipment 30 thus operates similarly to the subscriber terminating equipment 30 of the second embodiment.

Consequently, with the subscriber terminating equipment 30 of the present modification, signals are relieved similarly as with the subscriber terminating equipment 30 of the second embodiment.

(C) Description of the Third Embodiment of the Present Invention

Figure 42:
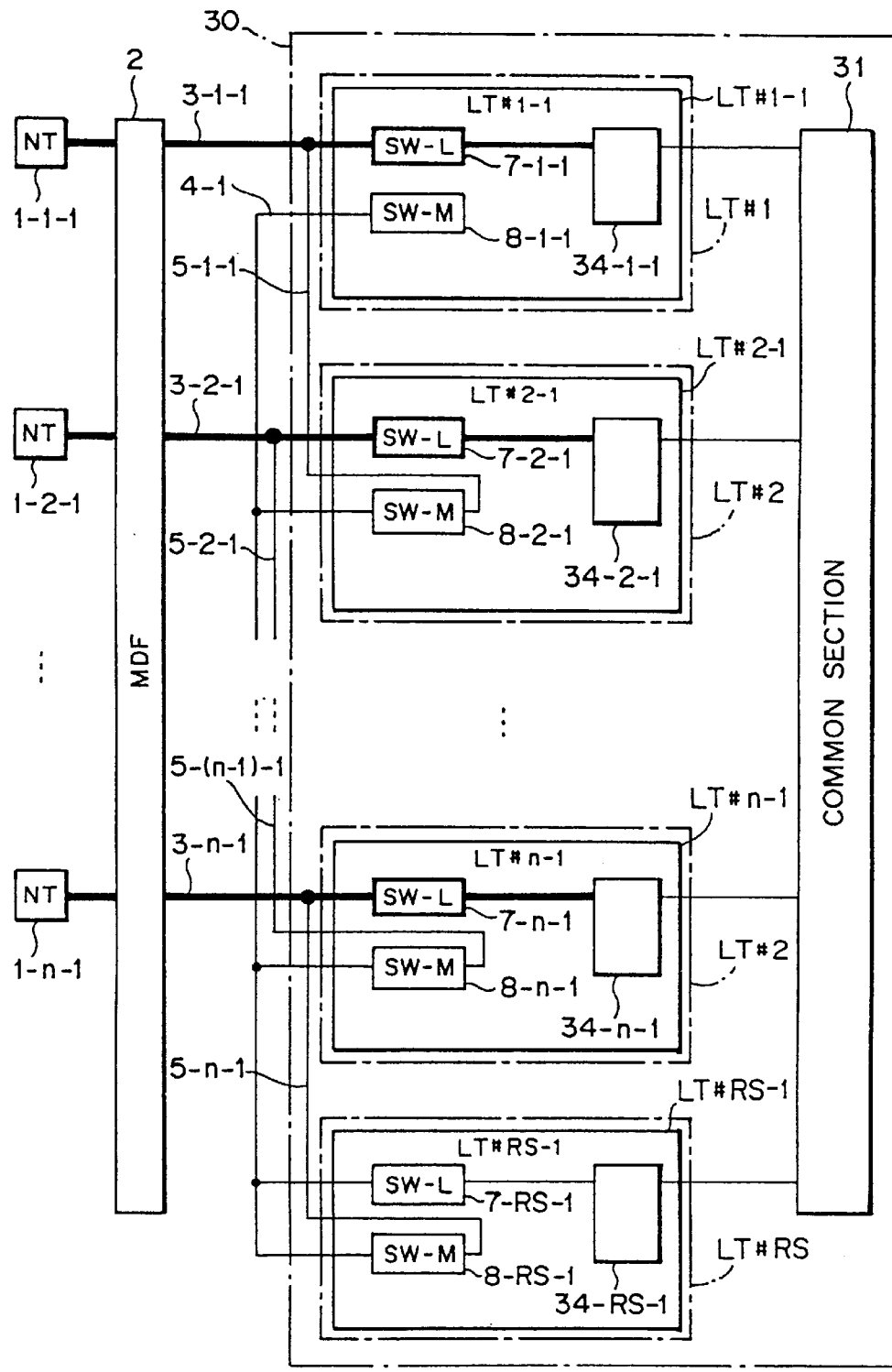
FIG. 42 is a block diagram illustrating operation of a subscriber terminating equipment according to a third embodiment of the present invention in normal operation.

FIG. 42 is a block diagram illustrating operation of a subscriber terminating equipment 30 according to a third embodiment of the present invention. As seen from FIG. 42, the subscriber terminating equipment 30 of the present embodiment is a modification similar to but is different from the subscriber terminating equipment 30 of the first embodiment shown in FIG. 9 in that it does not include those switches which are not used, that is, the relief switches SW-RS of the subscriber terminating packages LT#i and the relief package LT#RS. The subscriber terminating equipment 30 of the present embodiment is further different in that the SW-L switch 7-RS-1 of the relief package LT#RS is connected to the multi-connection line 4-1 so that it may have a function similar to that of the SW-RS switch 6-RS-1 (see FIGS. 9 and 10) of the relief package LT#RS of the subscriber terminating equipment 30 of the first modification to the first embodiment.

The subscriber terminating equipment 30 of the present embodiment is further different in that, when a fault occurs, the operation of the SW-RS switch 6-RS-j in the relief package in the subscriber terminating equipment 30 of the first modification to the first embodiment is performed by the SW-L switch 7-RS-j.

Thus, with the subscriber terminating equipment 30 of the third embodiment of the present invention, similar effects to those of the subscriber terminating equipment 30 of the first modification to the first embodiment are achieved. Further, since those switches which are not used are eliminated, an augmented effect can be anticipated in terms of the cost.

It is to be noted that, in this instance, also in the embodiments and the modifications described above except the second modification to the first embodiment, those switches which are not used can be eliminated similarly as in the present embodiment.

(d) Others

Figure 43B:
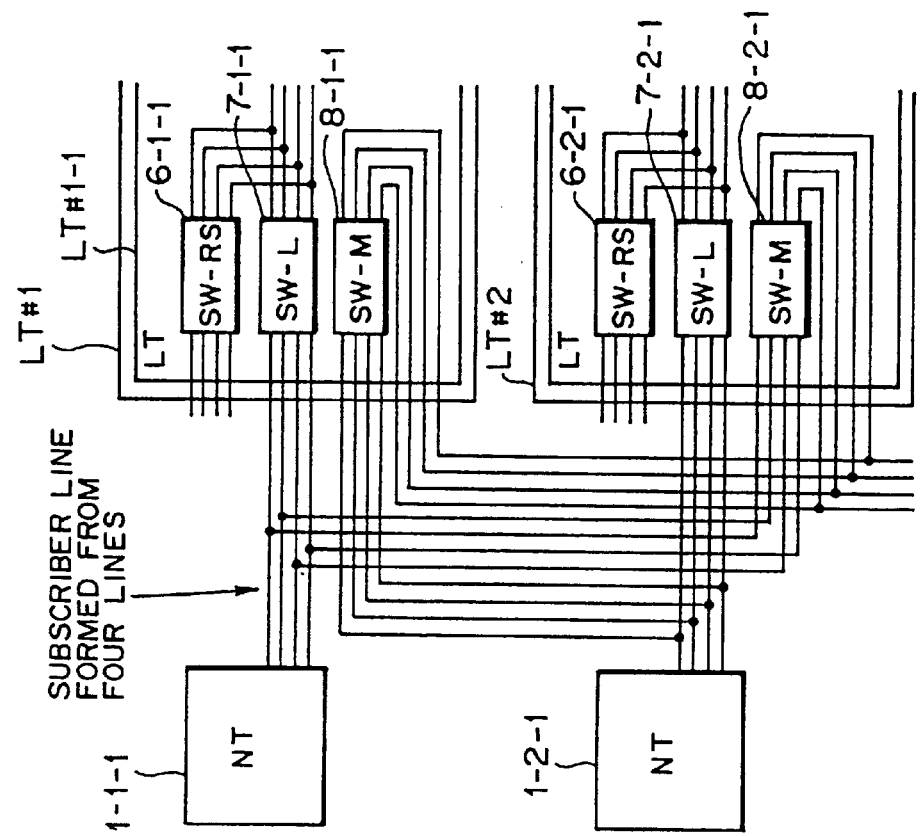
FIG. 43(b) is a block diagram of a subscriber terminating equipment which employs a four-line transmission scheme.
Figure 43A:
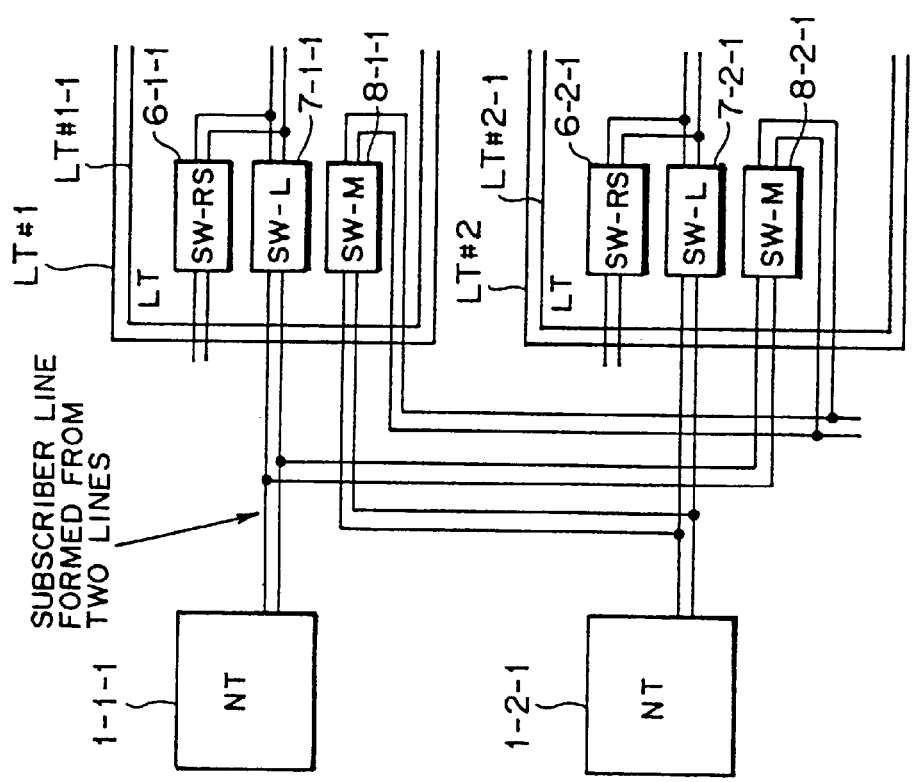
FIG. 43(a) is a block diagram of a subscriber terminating equipment which employs a two-line transmission scheme.
Figure 45:
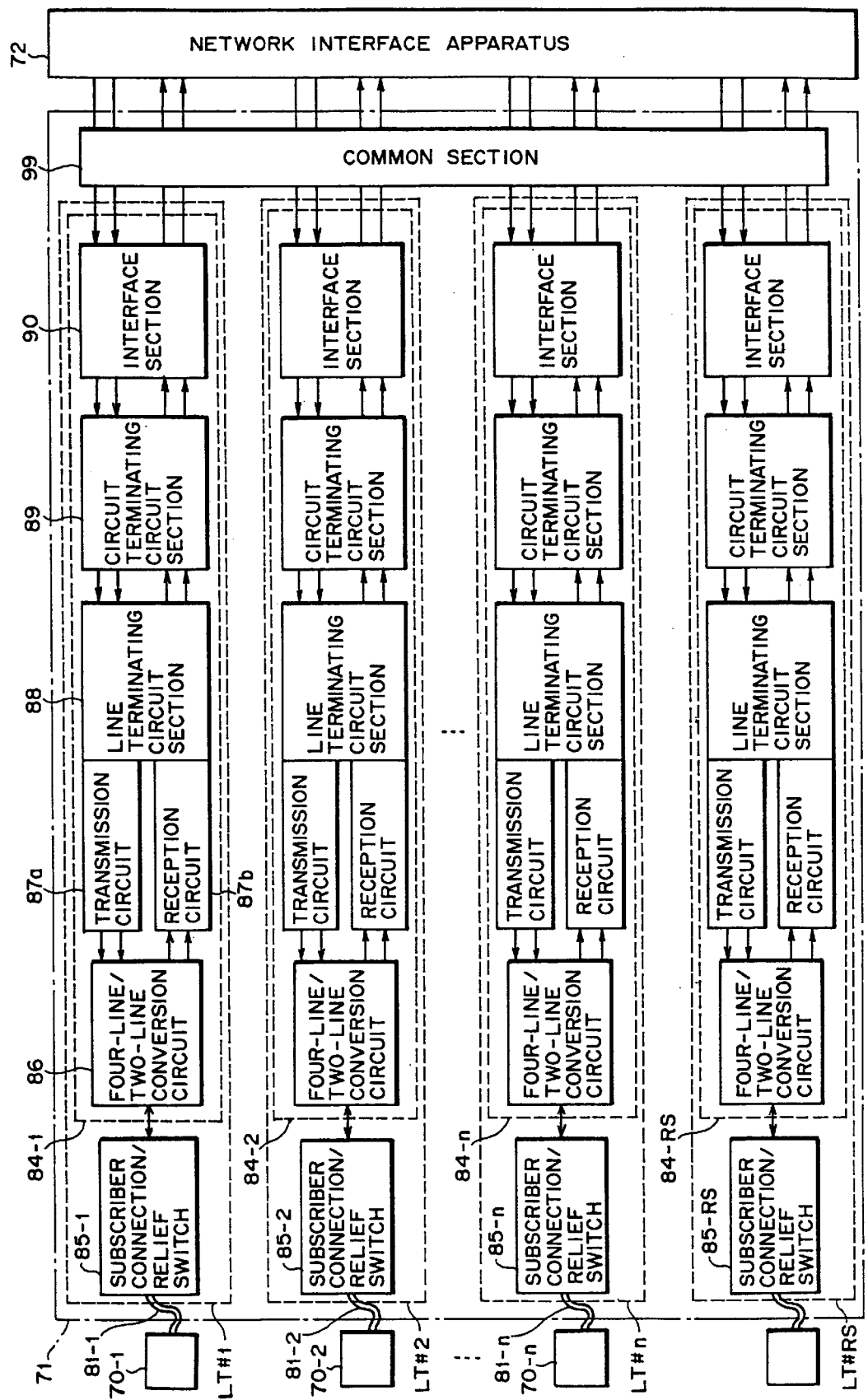
FIG. 45 is a detailed block diagram of a subscriber terminating equipment.
Figure 46:
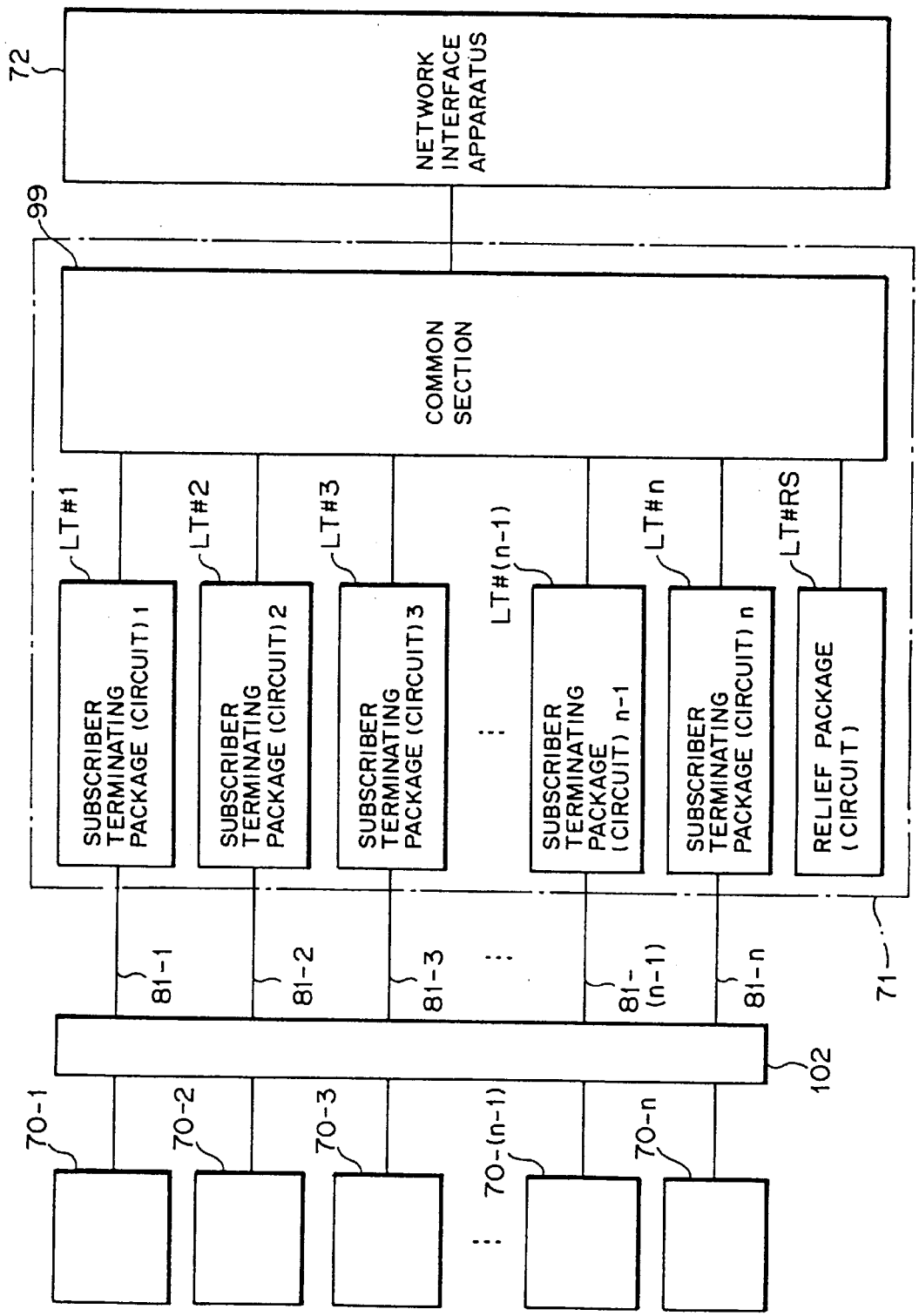
FIG. 46 is a block diagram illustrating operation of the subscriber terminating equipment in normal state.
Figure 47:
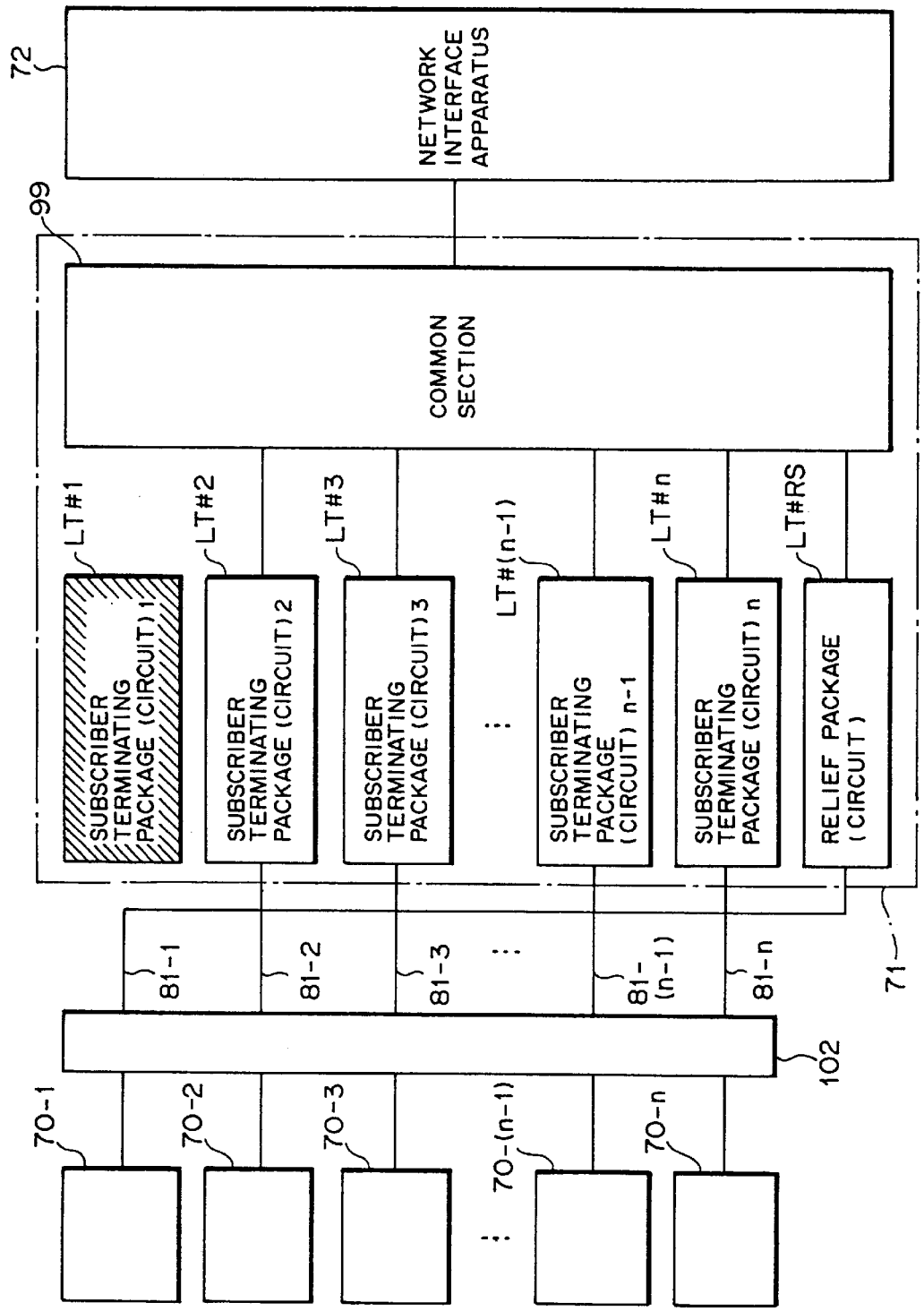
FIG. 47 is a block diagram illustrating operation of the subscriber terminating equipment when a fault occurs.
Figure 48:
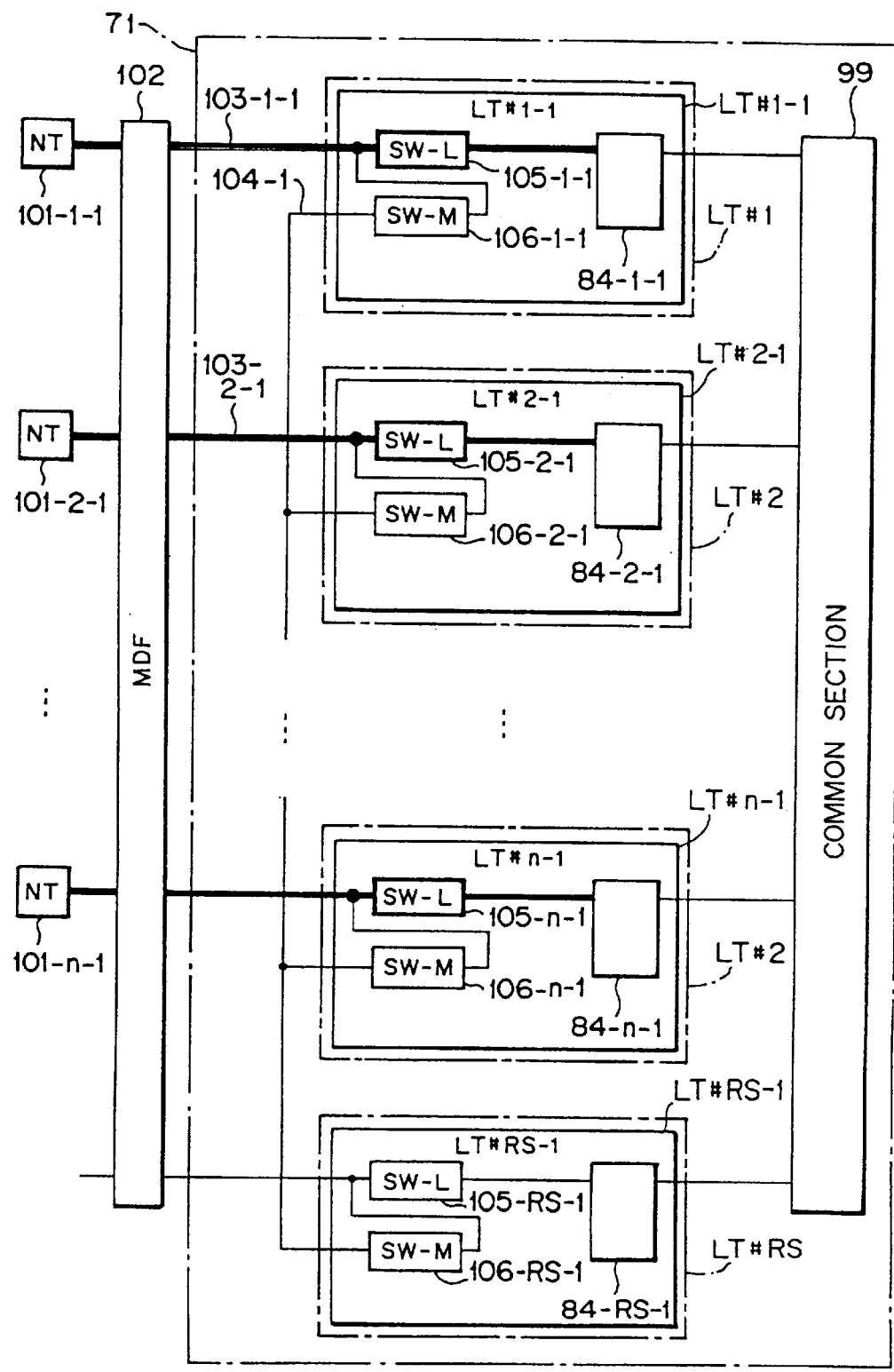
FIG. 48 is a block diagram illustrating operation of the subscriber terminating equipment in normal state according to a first method.

FIG. 43(a) is a block diagram of a subscriber terminating equipment 30 which is designed for two-line transmission, and FIG. 43(b) is a block diagram of another subscriber terminating equipment 30 which is designed for four-line transmission.

In the subscriber terminating equipments 30 of the embodiments described above, each subscriber terminating package and the subscriber terminal 1-i-j communicate with each other using a communication system which employs a two-line type subscriber line, and the subscriber terminal 1-1-1 and the subscriber terminating package LT#1 shown in FIG. 43(a) communicate with each other using a twisted pair wire.

Each subscriber terminating package LT#i and the subscriber terminal 1-i-j can communicate with each other using a communication system which employs a four-line type subscriber wire. In this instance, the subscriber terminal 1-1-1 and the subscriber terminating package LT#1 shown in FIG. 43(b) communicate with each other using two pairs of twisted pair wires. The subscriber terminating equipment 30 shown in FIG. 43(b), however, operates in a substantially similar manner as described above.

Where the four-line transmission is employed, since the number of wiring lines is simply equal to twice that of the two-line transmission and the total wiring line length becomes more than twice, a higher effect than that of the two-line transmission can be achieved.

It is to be noted that the present invention is not limited to the embodiments described above and can be carried out in various forms without departing from the spirit and scope of the present invention.

For example, as regards the allocation of bypass packages in the embodiments described above, it is not limited to such pairing, rightward and leftward allocation methods, but, for example, a package spaced by two package distances may be allocated as a bypass package for each package.

Further, as regards the connection points, various other connection points are possible other than those described above. However, where the connection points are provided outside, there is an advantage that the circuit patterns of the subscriber terminating circuit can be reduced. On the other hand, where the connection points are provided inside, reduction of the number of patterns for the backboards and the number of pins of the connectors can be anticipated. Further, where the connection points are provided outside, if the subscriber terminating packages are incorporated in an equipment which does not have the present function, since connections between the switches become fully open, it is not necessary to take an influence of leakage of a signal in the switches into consideration and the connections can be varied in accordance with an application of the equipment.

Meanwhile, it is anticipated that, as a transmission protocol for use in any of the embodiments described above, the ISDN (Integrated Service Digital Network) system described in the ITU-G.960 or G.961, the ADSL_light or ADSL described in the G.992.1 or G.992.2, or a transmission system called xDSL system such as the HDSL, VDSL, SDSL or HDSL2 which is anticipated to be put into practical use in the future is used. However, the subscriber terminating equipment 30 of the present invention can be applied irrespective of the transmission protocol or the service form.

Further, while the subscriber terminating equipment 30 in any of the embodiments described above includes the single relief package LT#RS, in order to further augment the reliability of the system, two or more such relief packages LT#RS may be provided.

Furthermore, while, in the embodiments described hereinabove, the relief package LT#RS is disposed at an extreme end in the subscriber terminating packages LT#i of the subscriber terminating equipment 30, the location of the relief package LT#RS may be varied freely. For example, if the relief package LT#RS is disposed at the center of the subscriber terminating equipment 30, then since the distances from the subscriber terminating packages LT#i to the relief package LT#RS are reduced, augmentation in transmission characteristic can be anticipated.

Further, while, in the embodiments described above, the network interface apparatus 32 is formed from an exchange or a router, it may be formed from any other apparatus which has a similar function.

What is claimed is:

1. A subscriber terminating equipment which includes a plurality of subscriber terminating packages connected between a plurality of subscriber terminals side and a network interface apparatus side, said network interface apparatus being connected to a network and capable of transferring a signal to a desired destination for accommodating said subscriber terminals, and a relief package having the same construction as that of said plurality of subscriber terminating packages for accommodating the subscriber terminals accommodated in a fault subscriber terminating package which has failed from among said plurality of subscriber terminating packages, comprising:

a multi-connection line disposed in the proximity of said plurality of subscriber terminals and connected to each of said plurality of subscriber terminating packages; and a common section connected to each of said plurality of subscriber terminating packages for outputting switching signals to perform switching of a path between said subscriber terminals and said network interface apparatus;

said plurality of subscriber terminating packages including multi-connection switches connected to said subscriber terminals and said multi-connection line for connecting/disconnecting electric signals between said subscriber terminals and said multi-connection line, subscriber connection switches connected to said subscriber terminals for connecting/disconnecting electric signals between said subscriber terminals and said network interface apparatus in response to connection conditions of said multi-connection switches, and relief switches connected to said subscriber connection switches;

said relief package including a relief switch connected to said multi-connection line for connecting/disconnecting an electric signal between said multi-connection line and said network interface apparatus, a subscriber connection switch connected to said relief switch, and a multi-connection switch provided on a circuit board or a plurality of circuit boards;

said common section selecting a pair of packages including a first subscriber terminating package and a second subscriber terminating package from among said plurality of subscriber terminating packages and allocating, if the first subscriber terminating package fails, the second subscriber terminating package as a bypass subscriber terminating package for performing electric connection between the subscriber terminals and said relief package;

said relief package and said subscriber terminating packages having the same circuit pattern for connection of the three kinds of switches.

2. The subscriber terminating equipment as claimed in claim 1, wherein said common section sets, in normal operation, said subscriber connection switches in said subscriber terminating packages to a connection state and sets the three kinds of switches in said relief package to a disconnection state, but connects, when failure occurs, the subscriber terminals accommodated in the fault package with which the fault has occurred to said network interface apparatus, through said multi-connection line and the bypass subscriber terminating package.

3. The subscriber terminating equipment as claimed in claim 1, wherein said common section sets, when a fault occurs, the subscriber connection switch in the fault subscriber terminating package to a disconnection state, sets the multi-connection switch in the bypass subscriber terminating package to a connection state and sets said relief switch of said relief package to a connection state.

4. The subscriber terminating equipment as claimed in claim 1, wherein said common section allocates, when a fault occurs, one of said subscriber terminating packages which is adjacent the fault subscriber terminating package as the bypass subscriber terminating package, and sets the subscriber connection switch in the fault package to a disconnection state, sets the multi-connection switch in the bypass subscriber terminating package to a connection state and sets the relief switch in said relief package to a connection state.

5. The subscriber terminating equipment as claimed in claim 1, wherein said common section selects one of said subscriber terminating packages which is disposed on the right side of the fault subscriber terminating package and allocates the selected subscriber terminating package as the bypass subscriber terminating package.

6. The subscriber terminating equipment as claimed in claim 3, wherein said common section selects one of said subscriber terminating packages which is disposed on the left side of the fault subscriber terminating package and allocates the selected subscriber terminating package as the bypass package.

7. The subscriber terminating equipment as claimed in claim 3, wherein said common section establishes, when failure occurs, a self relief mode wherein the multi-connection switch in the fault subscriber terminating package is set to a connection state and the subscriber connection switch and the multi-connection switch in said relief package are set to a connection state.

8. The subscriber terminating equipment as claimed in claim 5, wherein said common section establishes, when a fault occurs, a circuit switching mode wherein the three kinds of switches at least in the fault package are set to a disconnection state and the subscriber connection switch and the relief switch in the adjacent subscriber terminating package are set to a disconnection state while said multi-connection switch and said subscriber connection switch in said relief package are set to a connection state.

9. The subscriber terminating equipment as claimed in claim 6, wherein said common section establishes, when a fault occurs, a circuit switching mode wherein the three kinds of switches at least in the fault subscriber terminating package are set to a disconnection state and the subscriber connection switch and the relief switch in the adjacent subscriber terminating package are set to a disconnection state while said multi-connection switch and said subscriber connection switch in said relief package are set to a connection state.

10. The subscriber terminating equipment as claimed in claim 5, wherein said common section establishes, when a fault occurs, a self relief mode wherein the multi-connection switch at least in the fault subscriber terminating package is set to a connection state and the subscriber connection switch in the fault subscriber terminating package is set to a disconnection state while the subscriber connection switch in the adjacent subscriber terminating package is set to a connection state and said multi-connection switch and said subscriber connection switch in said relief package are set to a connection state.

11. The subscriber terminating equipment as claimed in claim 6, wherein said common section establishes, when a fault occurs, a self relief mode wherein the multi-connection switch at least in the fault subscriber terminating package is set to a connection state and the subscriber connection switch in the fault subscriber terminating package is set to a disconnection state while the subscriber connection switch in the adjacent subscriber terminating package is set to a connection state and said multi-connection switch and said subscriber connection switch in said relief package are set to a connection state.

12. The subscriber terminating equipment as claimed in claim 5, wherein said common section establishes, when a fault occurs, a circuit switching mode wherein the three kinds of switches at least in the fault subscriber terminating package are set to a disconnection state and the subscriber connection switch and the relief switch in the adjacent subscriber terminating package are set to a disconnection state while said multi-connection switch in said relief package is set to a connection state.

13. The subscriber terminating equipment as claimed in claim 6, wherein said common section establishes, when a fault occurs, a circuit switching mode wherein the three kinds of switches at least in the fault subscriber terminating package are set to a disconnection state and the subscriber connection switch and the relief switch in the adjacent subscriber terminating package are set to a disconnection state while said multi-connection switch in said relief package is set to a connection state.

14. The subscriber terminating equipment as claimed in claim 1, wherein said packages are formed such that at least ones of L/M points indicative of connection points of said subscriber terminals and said multi-connection switches, M/RS points indicative of connection points between said multi-connection line and said relief switches and RS/L points indicative of connection points between said relief switches and said subscriber connection switches are provided outside said subscriber terminating packages.

15. A subscriber terminating equipment which includes a plurality of subscriber terminating packages connected between a plurality of subscriber terminals side and a network interface apparatus side, said network interface apparatus being connected to a network and capable of transferring a signal to a desired destination for accommodating said subscriber terminals, and a relief package for accommodating the subscriber terminals accommodated in a fault subscriber terminating package which has failed from among said plurality of subscriber terminating packages, comprising:

a multi-connection line disposed in the proximity of said plurality of subscriber terminating packages and connectable to each of said plurality of subscriber terminating packages; and a common section for controlling a plurality of connection/disconnection switches mounted on said plurality of subscriber terminating packages;

said plurality of subscriber terminating packages including multi-connection switches connected to said subscriber terminals and said multi-connection line for connecting/disconnecting electric signals between said subscriber terminals and said multi-connection line, and subscriber connection switches connected to said subscriber terminals and said network interface apparatus for connecting/disconnecting electric signals between said subscriber terminals and said network interface apparatus in response to connection conditions of said multi-connection switches;

said relief package including a relief switch connected to said multi-connection line and said network interface apparatus for connecting/disconnecting said multi-connection line and said network interface apparatus, wherein said relief package and said subscriber terminating packages having the same circuit pattern for connection of the three kinds of switches.

16. The subscriber terminating equipment as claimed in claim 1, wherein said subscriber terminating packages and said subscriber terminals communicate with each other using a communication system which employs a two-line type subscriber line.

17. The subscriber terminating equipment as claimed in claim 1, wherein said subscriber terminating packages and said subscriber terminals communicate with each other using a communication system which employs a four-line type subscriber line.

* * * * *